US012307614B2

(12) United States Patent
Pazmino et al.

(10) Patent No.: US 12,307,614 B2
(45) Date of Patent: May 20, 2025

(54) METHODS FOR SHARING CONTENT AND INTERACTING WITH PHYSICAL DEVICES IN A THREE-DIMENSIONAL ENVIRONMENT

(71) Applicant: Apple Inc., Cupertino, CA (US)

(72) Inventors: Lorena S. Pazmino, San Francisco, CA (US); Vitalii Kramar, Duvall, WA (US); Jonathan R. Dascola, San Francisco, CA (US); Zoey C. Taylor, San Francisco, CA (US); Alejandro A. Rodriguez, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 18/146,234

(22) Filed: Dec. 23, 2022

(65) Prior Publication Data
US 2023/0206572 A1 Jun. 29, 2023

Related U.S. Application Data

(60) Provisional application No. 63/265,969, filed on Dec. 23, 2021.

(51) Int. Cl.
G06T 19/00 (2011.01)
G06F 3/01 (2006.01)
(Continued)

(52) U.S. Cl.
CPC ............ G06T 19/006 (2013.01); G06F 3/013 (2013.01); G06F 3/14 (2013.01); G06T 19/20 (2013.01); G06T 2219/2016 (2013.01)

(58) Field of Classification Search
CPC .................. G06T 19/006; G06T 19/20; G06T 2219/2016; G06F 3/013; G06F 3/14; G06F 3/04883; G06F 3/011
See application file for complete search history.

(56) References Cited

U.S. PATENT DOCUMENTS 6,323,846 B1   11/2001  Westerman et al.
6,570,557 B1   5/2003   Westerman et al.
(Continued)

FOREIGN PATENT DOCUMENTS

EP   2458486 A1   5/2012
EP   2893297 A1   7/2015
(Continued)

OTHER PUBLICATIONS

Ubii: Physical World Interaction Through Augmented Reality, Lin et al., Publisher: IEEE, Date of Publication: May 13, 2016, DOI: 10.1109/TMC.2016.2567378 (Year: 2016).*
(Continued)

Primary Examiner — Daniel F Hajnik
Assistant Examiner — Adeel Bashir
(74) Attorney, Agent, or Firm — Kubota & Basol LLP

(57) ABSTRACT

In some embodiments, a computer system displays a user interface element corresponding to content shared with the computer system for interacting with the shared content in the three-dimensional environment. In some embodiments, a computer system displays one or more virtual control elements in a three-dimensional environment that are selectable to cause one or more corresponding operations involving a physical device to be performed.

39 Claims, 35 Drawing Sheets

(51) Int. Cl.
*G06F 3/14* (2006.01)
*G06T 19/20* (2011.01)

(56) References Cited

U.S. PATENT DOCUMENTS

| | | | |
|---|---|---|---|
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 8,730,156 | B2 | 5/2014 | Weising et al. |
| 9,348,458 | B2 | 5/2016 | Hotelling et al. |
| 9,619,105 | B1 | 4/2017 | Dal Mutto |
| 9,870,130 | B2 | 1/2018 | Schubert et al. |
| 9,933,937 | B2 | 4/2018 | Lemay et al. |
| 10,564,714 | B2 | 2/2020 | Marggraff et al. |
| 10,708,965 | B1 | 7/2020 | Subramanian et al. |
| 11,176,755 | B1 | 11/2021 | Tichenor et al. |
| 11,243,734 | B2 | 2/2022 | Boissière et al. |
| 11,379,033 | B2 | 7/2022 | O'hern et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2010/0293504 | A1 | 11/2010 | Hachiya |
| 2013/0249922 | A1 | 9/2013 | Hachiya |
| 2013/0345975 | A1 | 12/2013 | Vulcano et al. |
| 2014/0002444 | A1 | 1/2014 | Bennett et al. |
| 2014/0267400 | A1 | 9/2014 | Mabbutt et al. |
| 2014/0298273 | A1 | 10/2014 | Blackstone et al. |
| 2014/0375683 | A1 | 12/2014 | Salter et al. |
| 2015/0193982 | A1 | 7/2015 | Mihelich et al. |
| 2015/0205106 | A1 | 7/2015 | Norden |
| 2016/0025971 | A1 | 1/2016 | Crow et al. |
| 2016/0370858 | A1 | 12/2016 | LeppÄnen et al. |
| 2017/0090566 | A1 | 3/2017 | George-svahn et al. |
| 2017/0115728 | A1 | 4/2017 | Park et al. |
| 2017/0154326 | A1 | 6/2017 | Jo et al. |
| 2017/0162177 | A1 | 6/2017 | Lebeck et al. |
| 2017/0169616 | A1 | 6/2017 | Wiley et al. |
| 2018/0077383 | A1 | 3/2018 | Akao et al. |
| 2018/0150204 | A1* | 5/2018 | Macgillivray ...... G06F 3/04815 |
| 2018/0275753 | A1 | 9/2018 | Publicover et al. |
| 2018/0300952 | A1 | 10/2018 | Evans et al. |
| 2018/0350119 | A1 | 12/2018 | Kocharlakota et al. |
| 2019/0279407 | A1 | 9/2019 | Mchugh et al. |
| 2019/0302977 | A1 | 10/2019 | Pendergast et al. |
| 2019/0369569 | A1 | 12/2019 | Olsen et al. |
| 2019/0384406 | A1 | 12/2019 | Smith et al. |
| 2020/0051527 | A1 | 2/2020 | Ngo |
| 2020/0257484 | A1 | 8/2020 | Qian et al. |
| 2020/0319704 | A1 | 10/2020 | Kathuria et al. |
| 2020/0328913 | A1 | 10/2020 | Wyas et al. |
| 2021/0011556 | A1 | 1/2021 | Atlas et al. |
| 2021/0055789 | A1 | 2/2021 | Tsai et al. |
| 2021/0067418 | A1 | 3/2021 | Ely et al. |
| 2021/0096726 | A1 | 4/2021 | Faulkner et al. |
| 2021/0102820 | A1 | 4/2021 | Le et al. |
| 2021/0142552 | A1 | 5/2021 | Kimura et al. |
| 2021/0158624 | A1 | 5/2021 | Moon et al. |
| 2021/0173536 | A1 | 6/2021 | Kondo |
| 2021/0191600 | A1* | 6/2021 | Lemay ............ G06F 3/0485 |
| 2021/0227601 | A1 | 7/2021 | Eom et al. |
| 2021/0312713 | A1 | 10/2021 | Peri et al. |
| 2021/0312717 | A1 | 10/2021 | Mao |
| 2021/0326094 | A1 | 10/2021 | Buerli et al. |
| 2021/0333864 | A1* | 10/2021 | Harvey ............... G06T 19/006 |
| 2021/0358294 | A1 | 11/2021 | Parashar et al. |
| 2021/0365108 | A1 | 11/2021 | Burns et al. |
| 2021/0366440 | A1 | 11/2021 | Burns et al. |
| 2021/0400744 | A1 | 12/2021 | Chen et al. |
| 2021/0405760 | A1 | 12/2021 | Schoen |
| 2022/0124286 | A1 | 4/2022 | Punwani et al. |
| 2022/0179503 | A1 | 6/2022 | Timonen et al. |
| 2022/0239718 | A1 | 7/2022 | Song et al. |
| 2022/0244536 | A1 | 8/2022 | Sha et al. |
| 2022/0253125 | A1 | 8/2022 | Wallen et al. |
| 2022/0287676 | A1 | 9/2022 | Steines et al. |
| 2022/0291808 | A1 | 9/2022 | Stevens et al. |
| 2022/0303680 | A1 | 9/2022 | Ahmed et al. |
| 2023/0094522 | A1 | 3/2023 | Stauber et al. |
| 2023/0100689 | A1 | 3/2023 | Chiu et al. |
| 2023/0120052 | A1 | 4/2023 | Wallen et al. |
| 2023/0176806 | A1 | 6/2023 | Chen et al. |
| 2023/0341932 | A1 | 10/2023 | Silva et al. |
| 2023/0343049 | A1 | 10/2023 | Boesel et al. |
| 2023/0351702 | A1 | 11/2023 | Tan et al. |
| 2023/0353398 | A1 | 11/2023 | White |
| 2024/0103685 | A1 | 3/2024 | Pazmino et al. |
| 2024/0103686 | A1 | 3/2024 | Pazmino et al. |
| 2024/0104870 | A1 | 3/2024 | Fuste Lleixa et al. |
| 2024/0203066 | A1 | 6/2024 | Kawashima et al. |
| 2024/0233288 | A1 | 7/2024 | Stauber et al. |
| 2024/0273838 | A1 | 8/2024 | Palangie et al. |
| 2024/0281109 | A1 | 8/2024 | Manjunath et al. |
| 2024/0361832 | A1 | 10/2024 | Calderone et al. |
| 2024/0361833 | A1 | 10/2024 | Calderone et al. |
| 2025/0005864 | A1 | 1/2025 | Dessero et al. |

FOREIGN PATENT DOCUMENTS

| | | |
|---|---|---|
| EP | 4155867 A1 | 3/2023 |
| WO | 2013/169849 A2 | 11/2013 |
| WO | 2014/105276 A1 | 7/2014 |
| WO | 2018090060 A1 | 5/2018 |
| WO | 2021/061349 A1 | 4/2021 |
| WO | 2022/055821 A1 | 3/2022 |
| WO | 2022/067343 A2 | 3/2022 |
| WO | 2022208797 A1 | 10/2022 |

OTHER PUBLICATIONS

Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/030661, mailed on Nov. 4, 2024, 5 pages.
Non-Final Office Action received for U.S. Appl. No. 18/429,301, mailed on Jun. 12, 2024, 28 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

(56) References Cited

OTHER PUBLICATIONS

Apple, Use Continuity to Connect Your Mac, iPhone, iPad, and Apple Watch, Apple Support, Available online at <https://support.apple.com/en-us/HT204681>, [Retrieved from Internet on Dec. 23, 2022], 4 pages.

Didehkhorshid, et al., Text Input in Virtual Reality Using a Tracked Drawing Tablet, HCII 2020, LNCS 12428, 2020, pp. 314-329.

Edmiston, et al., Touch-Enabled Input Devices for Controlling Virtual Environments, 12th IFAC Symposium on Analysis, Design and Evaluation of Human-Machine Systems, Las Vegas, NV, USA, Aug. 11-15, 2013, pp. 349-356.

Huang, et al., Proxy-Based Security Audit System for Remote Desktop Access, Computer Communications And Networks, ICCCN 2009. Proceedings of 18th International Conference On, IEEE, Piscataway, NJ, USA, Aug. 3, 2009, 5 pages.

Metalnwood, Using a Tablet for Touch Control, with VR Headset On. (Demo Vid), Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Sun, et al., MagicHand: Interact with IoT Devices in Augmented Reality Environment, 2019 IEEE Conference on Virtual Reality and 3D User Interfaces, Osaka, Japan, Mar. 23-27, 2019, [retrieved on Dec. 4, 2020], 6 pages.

Wood, Tyriel, The HoloLens 2 Tour!—Discovering a World of Holograms, YouTube [online]. YouTube, Mar. 23, 2021 [retrieved on Dec. 7, 2023], Retrieved from the Internet: <URL: https://www.youtube.com/watch?v=rMks7sMzPxl>, 2 pages.

Writtenhouse, Sandy, How to Use Live View on Google Maps, Available online at <https://www.lifewire.com/use-live-view-google-maps-5323691>, [Retrieved from Internet on Jun. 27, 2024], Jul. 5, 2022, 6 pages.

\* cited by examiner

METHODS FOR SHARING CONTENT AND INTERACTING WITH PHYSICAL DEVICES IN A THREE-DIMENSIONAL ENVIRONMENT

CROSS-REFERENCE TO RELATED APPLICATIONS

This application claims the benefit of U.S. Provisional Application No. 63/265,969, filed Dec. 23, 2021. The content of which is incorporated herein by reference in its entirety for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a user interface element corresponding to content shared with the computer system for interacting with the shared content in the three-dimensional environment. In some embodiments, a computer system displays one or more virtual control elements in a three-dimensional environment that are selectable to cause one or more corresponding operations involving a physical device to be performed.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
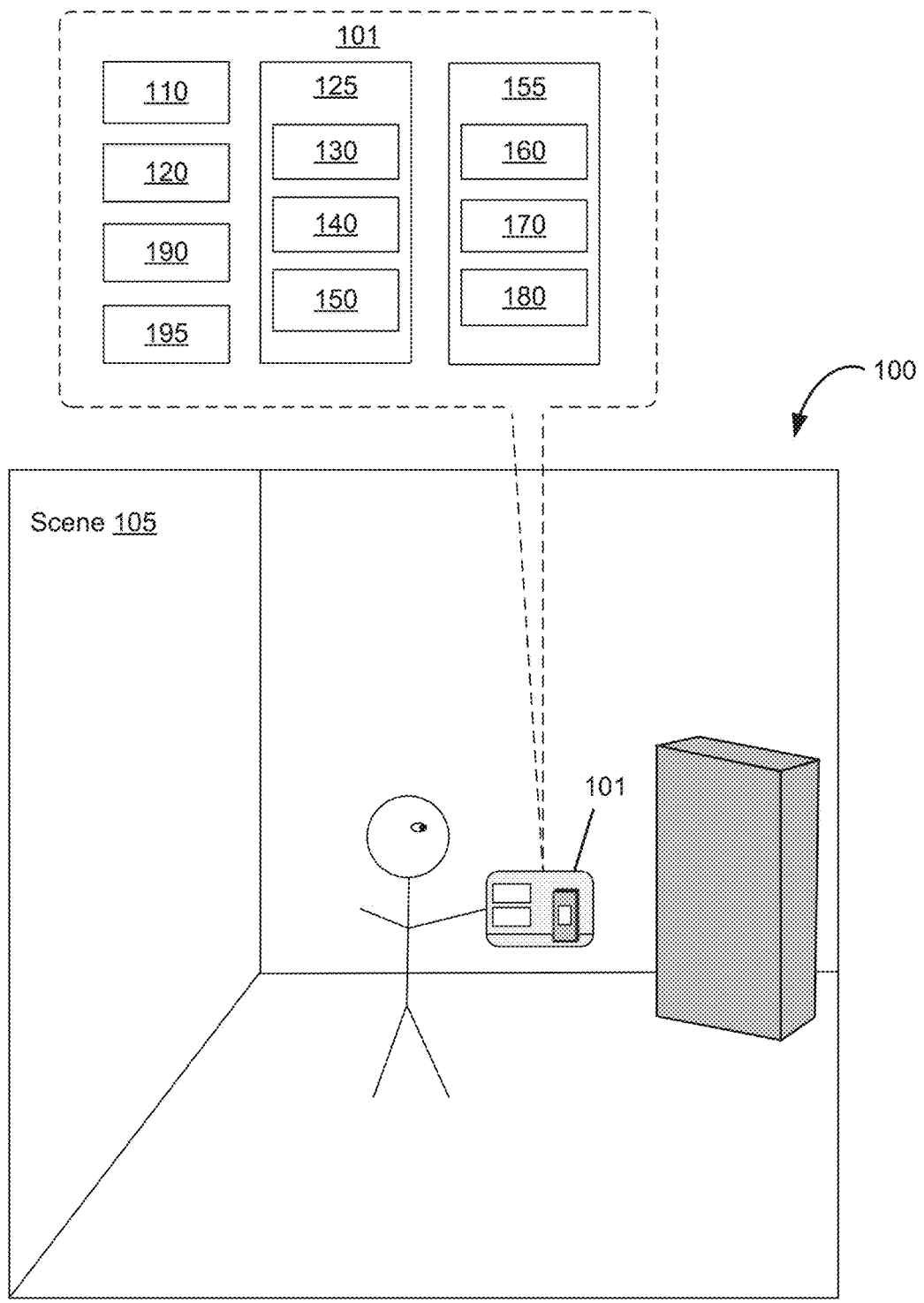
FIG. 1 is a block diagram illustrating an operating environment of a computer system for providing XR experiences in accordance with some embodiments.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system displays a three-dimensional environment having one or more virtual objects. In some embodiments, in response to detecting an indication of a request to share content with the computer system, the computer system displays a user interface element corresponding to the content in the three-dimensional environment. In some embodiments, the user interface element is viewpoint locked in the three-dimensional environment. In some embodiments, the computer system displays an object corresponding to the content in accordance with a determination that an operation relative to the content has been completed. In some embodiments, the object corresponding to the content is world locked in the three-dimensional environment.

In some embodiments, a computer system displays a three-dimensional environment including one or more representations of one or more physical devices in a physical environment. In some embodiments, in response to detecting attention of the user directed to the one or more representations of the one or more physical devices, the computer system displays one or more virtual control elements associated with the one or more physical devices in the three-dimensional environment. In some embodiments, the one or more virtual control elements are world locked with respect to the one or more representations of the one or more physical devices in the three-dimensional environment. In some embodiments, the one or more virtual control elements are selectable to cause one or more corresponding actions involving the one or more physical devices to be performed.

FIGS. 1-6 provide a description of example computer systems for providing XR experiences to users (such as described below with respect to methods 800 and/or 1000). FIGS. 7A-7F illustrate example techniques for interacting with notifications of shared content in a three-dimensional environment, in accordance with some embodiments. FIGS. 8A-8L is a flow diagram of methods of interacting with notifications of shared content in a three-dimensional environment, in accordance with various embodiments. The user interfaces in FIGS. 7A-7F are used to illustrate the processes in FIGS. 8A-8L. FIGS. 9A-9E illustrate example techniques for interacting with one or more virtual control elements associated with a physical device in a three-dimensional environment, in accordance with some embodiments. FIGS. 10A-10F is a flow diagram of methods of interacting with one or more virtual control elements associated with a physical device in a three-dimensional environment, in accordance with various embodiments. The user interfaces in FIGS. 9A-9E are used to illustrate the processes in FIGS. 10A-10F.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
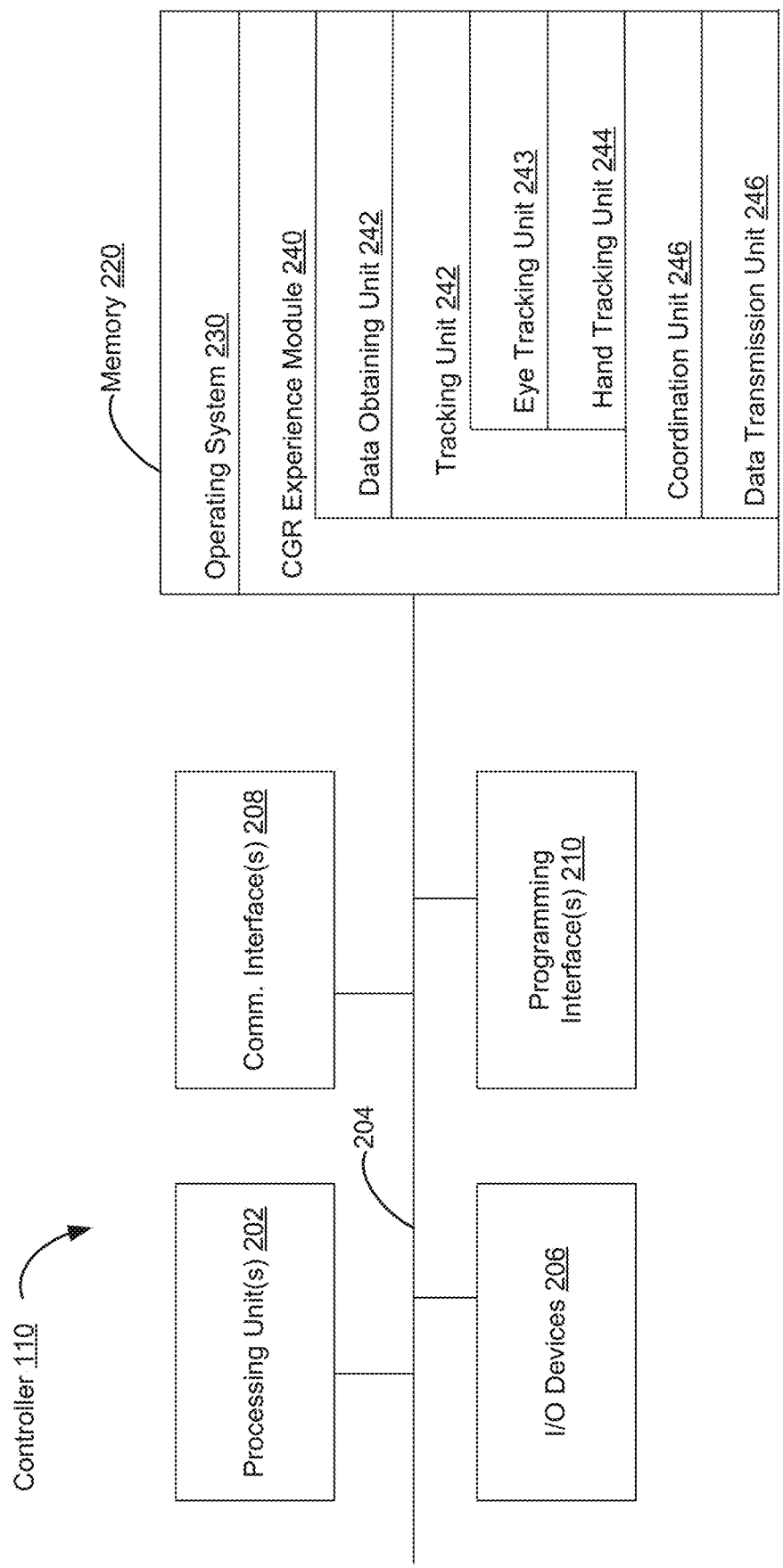
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
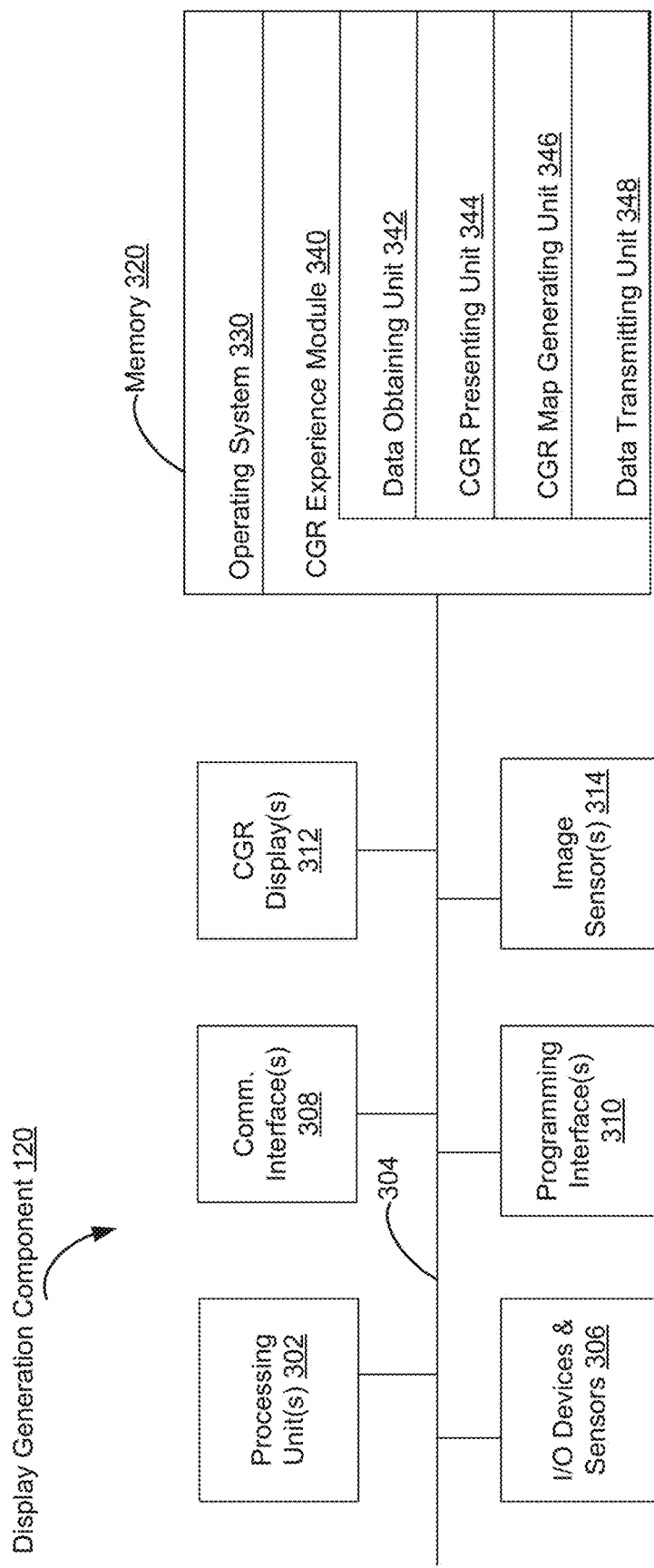
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
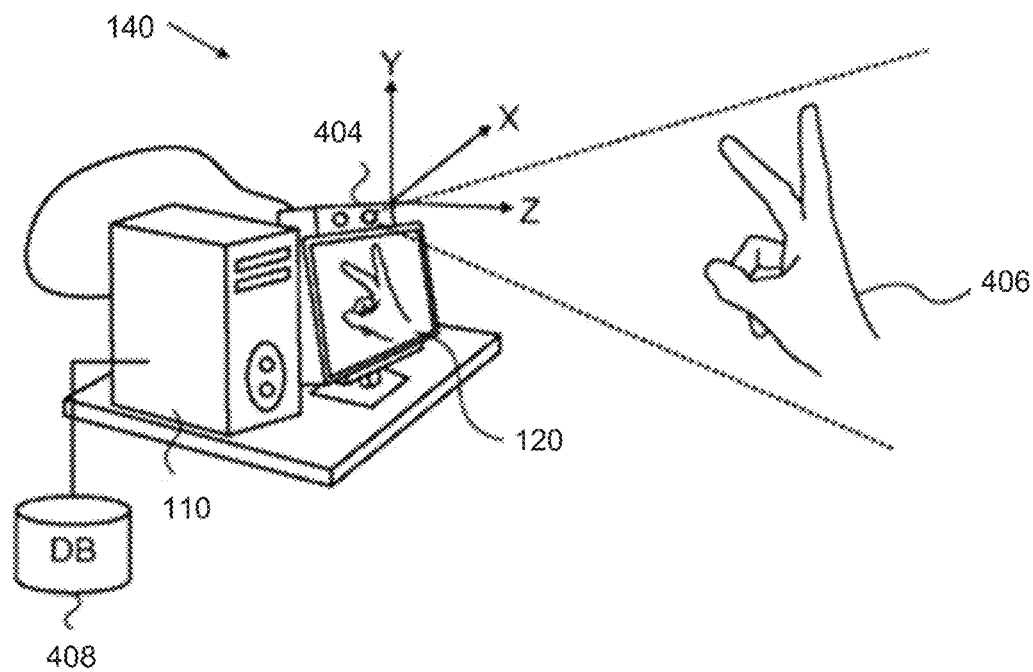
FIG. 4 is a block diagram illustrating a hand tracking unit of a computer system that is configured to capture gesture inputs of the user in accordance with some embodiments.
Figure 4:
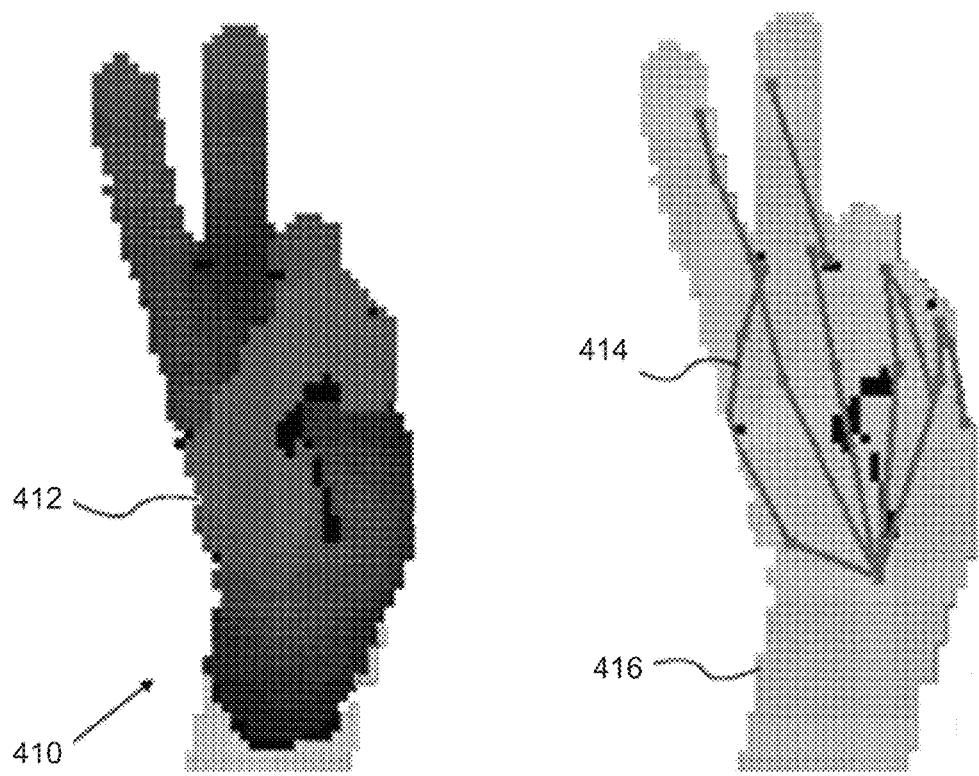

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
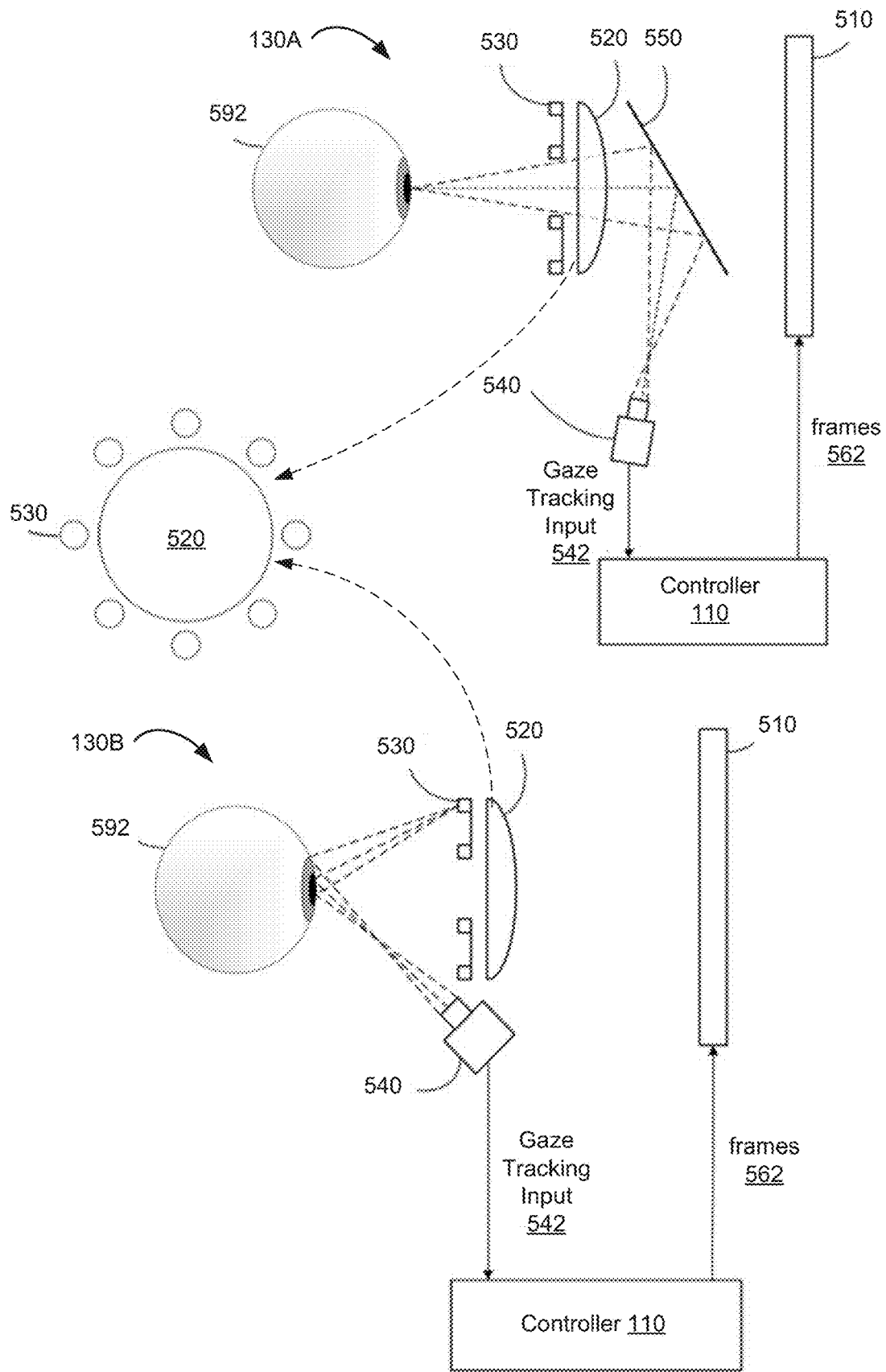
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
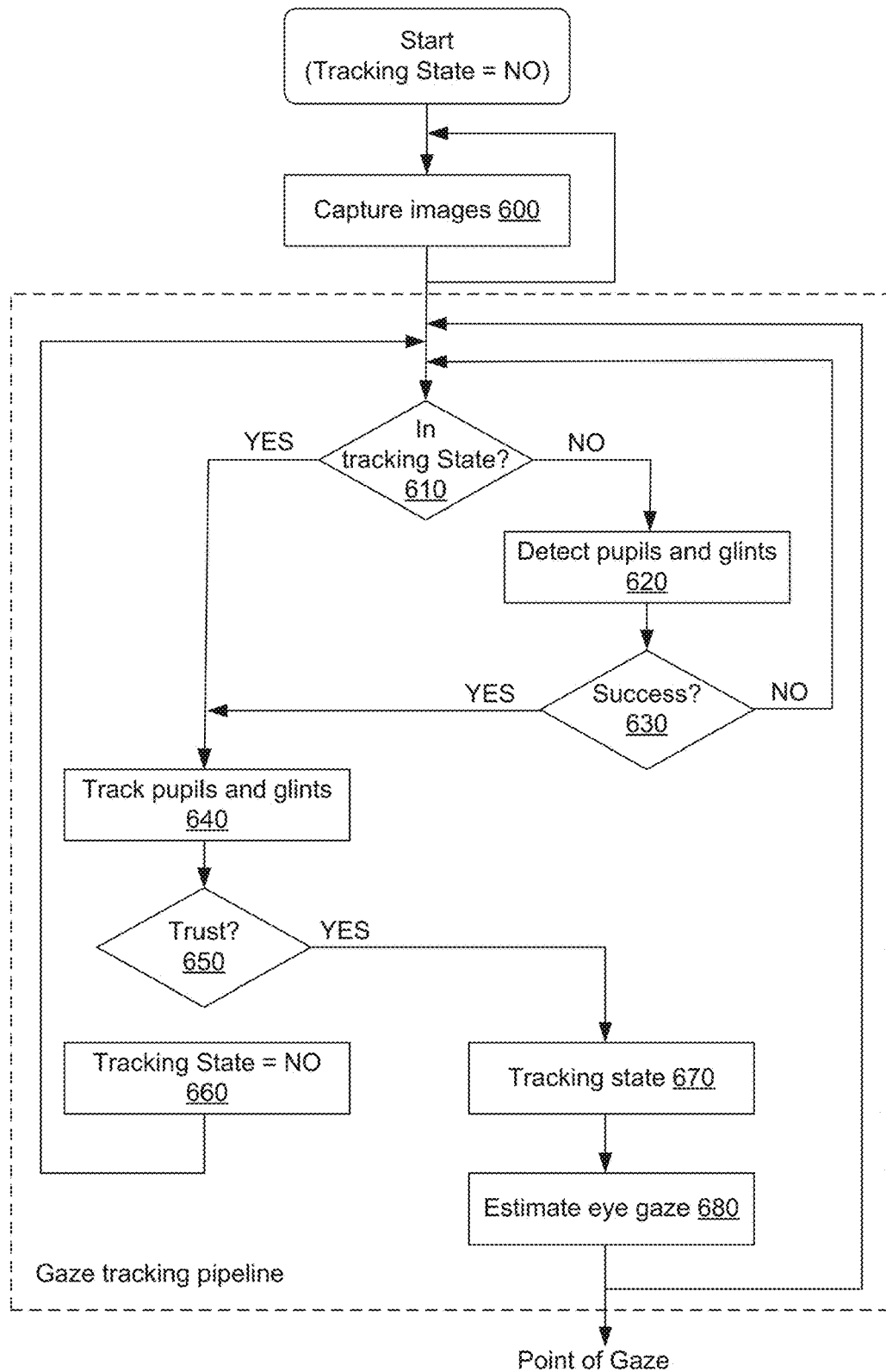
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or more cameras.

FIGS. 7A-7F illustrate examples of a computer system receiving content that is shared with the computer system in a three-dimensional environment in accordance with some embodiments.

Figure 7A:
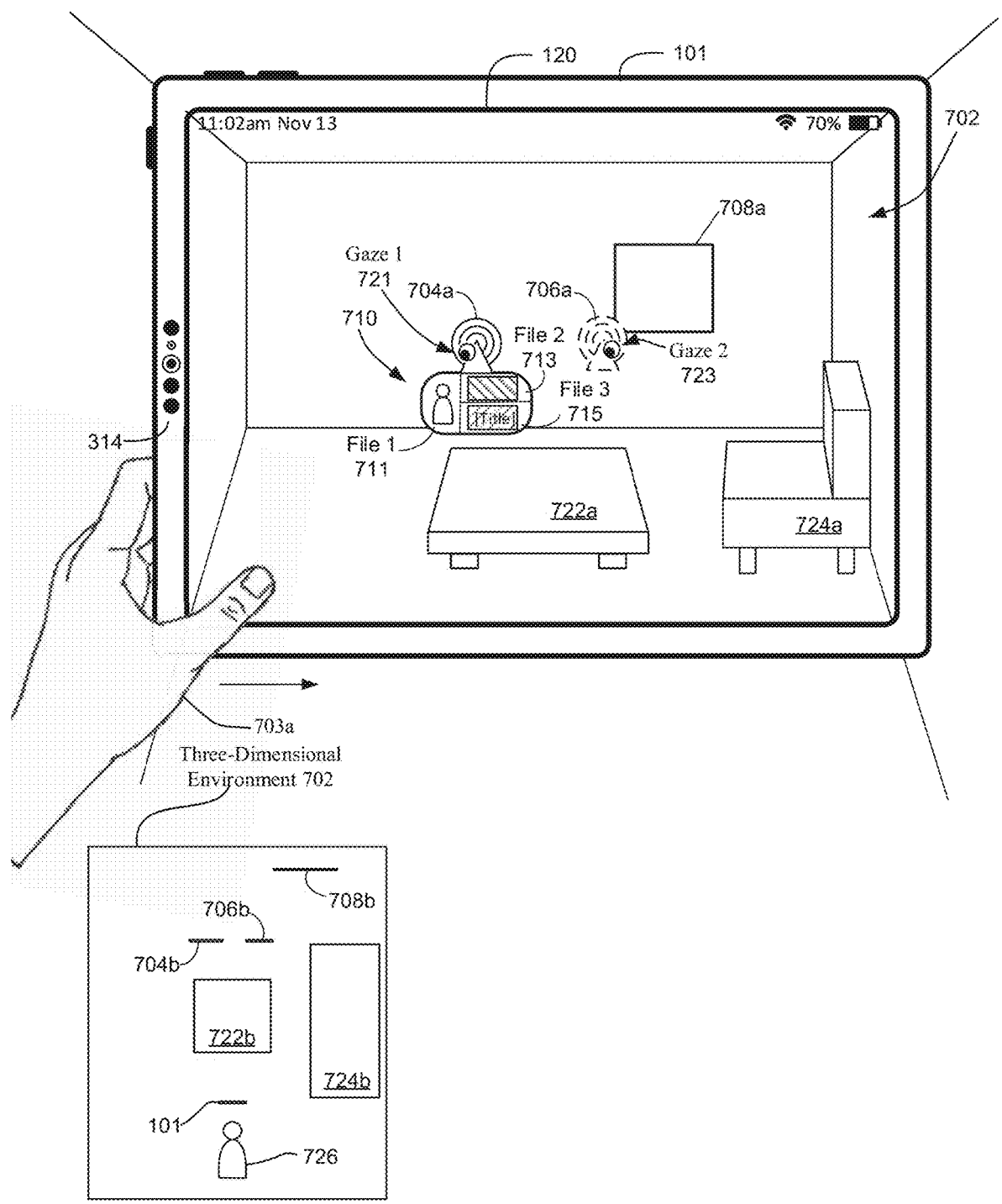
FIGS. 7A-7F illustrate examples of a computer system receiving content that is shared with the computer system in a three-dimensional environment in accordance with some embodiments.

FIG. 7A illustrates a computer system (e.g., an electronic device) 101 displaying, via a display generation component (e.g., display generation component 120 of FIG. 1), a three-dimensional environment 702 from a viewpoint of the user 726 illustrated in the overhead view (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702. For example, three-dimensional environment 702 includes a representation 722a of a coffee table (corresponding to table 722b in the overhead view), which is optionally a representation of a physical coffee table in the physical environment, and three-dimensional environment 702 includes a representation 724a of sofa (corresponding to sofa 724b in the overhead view), which is optionally a representation of a physical sofa in the physical environment.

In FIG. 7A, three-dimensional environment 702 also includes user interface elements 704a (corresponding to element 704b in the overhead view) and 706a (corresponding to element 706b in the overhead view), and virtual object 708a (corresponding to object 708b in the overhead view). User interface elements 704a and 706a are optionally at a same distance from the viewpoint of user 726, and virtual object 708a is optionally at a larger distance from the viewpoint of user 726 than user interface elements 704a and 706a. In some embodiments, user interface elements 704a and 706a correspond to notifications of content that has been shared with the computer system 101. For example, user interface elements 704a and 706a are notifications of shared content that are displayed in three-dimensional environment 702 in response to computer system 101 detecting indications of requests to share content with computer system 101. In some embodiments, the content corresponding to user interface elements 704a and 706a are shared with computer system 101 by a second computer system (e.g., a second electronic device, such as a mobile device, a desktop computer, a laptop, or a tablet) configured to communicate with computer system 101. In some embodiments, virtual object 708a is one or more of a user interface of an application containing content (e.g., a web browser application, a messenger application, or a quick look window displaying or containing content), a three-dimensional object (e.g., a virtual clock, a virtual ball, a virtual car, etc.) or any other element displayed by computer system 101 that is not included in the physical environment of computer system 101. It should be understood that while multiple user interface elements 706a and 708a are illustrated in FIGS. 7A-7F, such user interface elements need not be displayed by computer system 101 concurrently; rather, in some embodiments, computer system 101 independently displays the user interface elements illustrated and described in response to detecting separate indications corresponding to requests to share content with computer system 101 independently.

In some embodiments, user interface elements corresponding to content shared with computer system 101 are displayed in three-dimensional environment 702 with a preview of the content when a respective sender of the content corresponding to the request to share content with the computer system 101 is recognized by the computer system 101. As shown in FIG. 7A, the content corresponding to user interface element 704a is optionally shared by a respective sender that is recognized by computer system 101. For example, a second computer system that is configured to communicate with computer system 101 and is known by computer system 101 (e.g., a user profile, phone number and/or email address associated with the second computer system is stored and/or accessible at computer system 101 (e.g., as a known contact)). Accordingly, user interface element 704a is displayed in three-dimensional environment 702 with preview 710. In some embodiments, the preview 710 of the content includes at least a portion (e.g., a representation of) the content shared with computer system 101. The content corresponding to user interface element 706a is optionally shared by a respective sender that is not recognized by computer system 101. For example, a second computer system that is configured to communicate with computer system 101, but is not known by computer system 101 (e.g., a user profile, phone number and/or email address associated with the second computer system is not stored and/or accessible at computer system 101 (e.g., no known contact exists at computer system 101)). Accordingly, user interface element 706a is not displayed in three-dimensional environment 702 with a preview, as shown in FIG. 7A.

In some embodiments, the content shared with computer system 101 can include multiple items of content (e.g., multiple files corresponding to individual items of content) concurrently shared with computer system 101. In some embodiments, the multiple items of content include various types of content. For example, the content shared with computer system 101 optionally includes a first content item ("File 1") 711, a second content item ("File 2") 713, and a third content item ("File 3") 715. As described above, in some embodiments, the content corresponding to user interface element 704a was shared by a respective sender that is recognized by computer system 101, and user interface element 704a is thus displayed with preview 710. In some embodiments, when the content shared with computer system 101 includes multiple items of content, the preview 710 of the content includes at least a portion of (e.g., a representation of) a plurality of or each of the items of content. For example, as shown in FIG. 7A, the preview 710 includes a representation of the first content item 711, which is optionally a contact, a representation of the second content item 713, which is optionally a photograph, and a representation of the third content item 715, which is optionally a song. In some embodiments, the representations of the content items included in the preview 710 include information and/or details corresponding to the content items. For example, the representation of the first content item 711 optionally includes a contact identifier corresponding to the contact (e.g., a portion of a contact photograph or avatar, initials of a name of the contact, a portion of the name of the contact, etc.) shared with computer system 101. The representation of the second content item 713 optionally includes a portion of the photograph shared with computer system 101. The representation of the third content item 715 optionally includes a song identifier corresponding to the song (e.g., a portion of artwork corresponding to the song, a title of the song, an album to which the song is a part, etc.) shared with computer system 101.

In some embodiments, user interface elements corresponding to content shared with computer system 101 are displayed in three-dimensional environment 702 without ceasing display of other virtual objects in three-dimensional environment 702 (e.g., that were displayed prior to receiving the indication corresponding to the request to share the content with the computer system 101). As mentioned above, the three-dimensional environment 702 optionally includes virtual object 708a. In some embodiments, virtual object 708a was displayed in three-dimensional environment 702 prior to the computer system 101 detecting an indication corresponding to a request to share content with computer system 101. As shown in FIG. 7A, in some embodiments, the computer system 101 maintains display of virtual object 708a when the user interface elements 704a and/or 706a are displayed in three-dimensional environment 702. For example, the user interface elements 704a and/or 706a are displayed in three-dimensional environment 702 irrespective of a state and/or location of virtual object 708a in three-dimensional environment 702. The user may thus (e.g., continue to) interact with virtual object 708a despite user interface elements 704a and/or 706a being displayed in three-dimensional environment 702. In some embodiments, detection of one or more respective notification events (e.g., notification events corresponding to applications running and/or stored at computer system 101, notification events corresponding to an incoming message or email message and/or notification events corresponding to an incoming phone call), different from the indications corresponding to a request to share content with computer system 101, causes computer system 101 to cease display of virtual object 708a in three-dimensional environment 702 when it displays one or more corresponding indications for those respective notification events. In some embodiments, computer system 101 maintains display of the user interface elements 704a and/or 706a in response to detecting the one or more respective notification events.

In some embodiments, user interface elements corresponding to content shared with computer system 101 are displayed in three-dimensional environment 702 at a predetermined portion (e.g., center) of the field of view of the three-dimensional environment from the viewpoint of the user 726 (e.g., prior to receiving input interacting with the user interface elements, which will be described later, in three-dimensional environment 702). As shown in FIG. 7A, in response to detecting an indication corresponding to a request to share content with computer system 101, computer system 101 optionally displays user interface elements 704a and/or 706a, respectively, in a center of the user's field of view of three-dimensional environment 702. In some embodiments, the user interface elements 704a and/or 706a are displayed in three-dimensional environment 702 based on a respective portion of the user 726. For example, the user interface elements 704a and/or 706a are displayed in three-dimensional environment 702 based on the user's head (e.g., or a portion thereof) position and/or orientation, such as a particular distance (e.g., 1, 3, 5, 10, 20, 50, 100, 500, 1000 or 5000 cm) from a center of the user's head (e.g., and thus at the center of the user's viewpoint, as discussed above).

In some embodiments, a location of the user interface element corresponding to content shared with computer system 101 in three-dimensional environment 702 changes in response to detecting a change of the user's viewpoint of the three-dimensional environment 702. For example, as discussed below, a change of the user's viewpoint of the three-dimensional environment 702 causes the computer system 101 to display the user interface element corresponding to the content at a new location in the three-dimensional environment 702 that is at, for example, a center of the field of view of the three-dimensional environment 702 from the updated viewpoint of the user. Thus, in some embodiments, user interface elements 704a and/or 706a are viewpoint-locked until particular input that is described in more detail below is directed to user interface elements 704a and/or 706a. In some embodiments, when the computer system 101 detects attention of the user is directed to the user interface element in the three-dimensional environment 702, the computer system 101 displays the user interface element at a greater level of prominence, as discussed below.

In FIG. 7A, hand 703a is providing movement input directed to computer system 101 corresponding to a change of the user's viewpoint of three-dimensional environment 702 (e.g., and/or a change of the viewpoint of a portion of the physical environment that is visible via display generation component 120 of computer system 101). From FIGS. 7A-7B, hand 703a is optionally providing input for moving computer system 101 rightward in the physical environment surrounding the computer system 101. In some embodiments, the input for changing the viewpoint of the user 726 corresponds to a movement of the head of the user 726 in the physical environment (e.g., a movement of the head-mounted display worn by the user 726 in the physical environment). In some embodiments, computer system 101 detects hand 703a move computer system 101 (e.g., and display generation component 120) to a new respective location in the physical environment.

Additionally, in FIG. 7A, attention (e.g., a gaze of the user 726) is directed to the user interface elements 704a and/or 706a, respectively. For example, from FIGS. 7A-7B, a first gaze ("Gaze 1") 721 is directed to user interface element 704a, and a second gaze ("Gaze 2") 723 is directed to user interface element 706a. It should be understood that while multiple gaze points are illustrated in FIGS. 7A-7F, such gaze points need not be detected by computer system 101 concurrently; rather, in some embodiments, computer system 101 independently responds to the gaze points illustrated and described in response to detecting such gaze points independently.

Figure 7B:
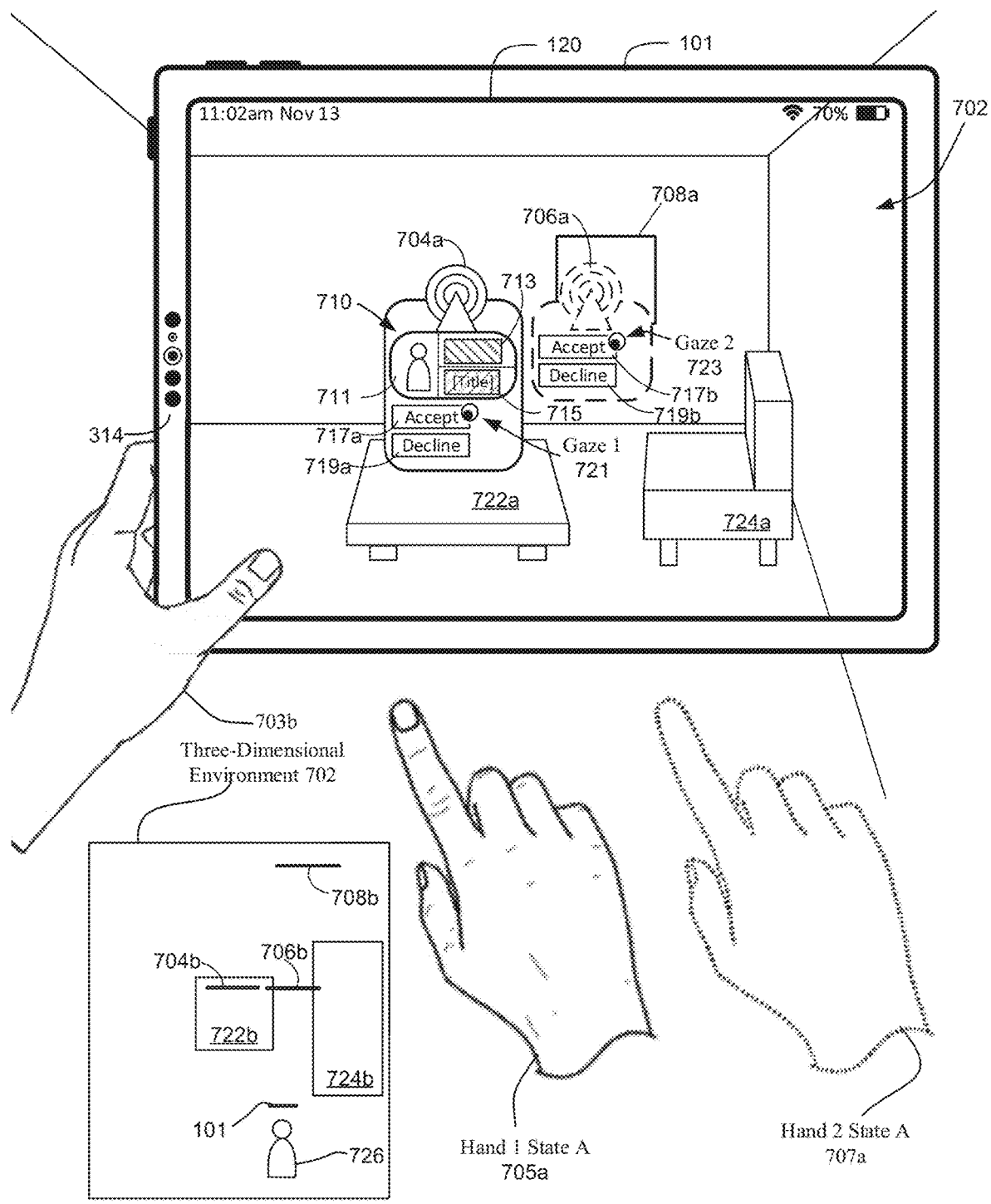

In response to the change of the user's viewpoint of three-dimensional environment 702 detected in FIG. 7A, computer system 101 optionally updates the portion of the three-dimensional environment 702 that is displayed accordingly, and moves user interface elements 704a and 706a in three-dimensional environment 702 accordingly, as shown in FIG. 7B. For example, the user interface elements 704a and/or 706a are displayed at a new location in three-dimensional environment 702 that corresponds to a center of the field of view of the three-dimensional environment 702 from the new viewpoint of the user 726. In some embodiments, the computer system 101 updates display of the user interface elements 704a and/or 706a as the viewpoint of the user 726 changes. For example, in FIG. 7A, as the hand 703a of the user moves rightward in the physical environment to change the viewpoint of the user 726, computer system 101 optionally animates movement of the user interface elements 704a and/or 706a, such that the user interface elements 704a and/or 706a are maintained in the center of the field of view of the three-dimensional environment 702 from the changing viewpoint of user 726.

Further, in some embodiments, in response to the gaze directed to the user interface elements 704a and/or 706a, respectively, detected in FIG. 7A, computer system 101 displays the user interface elements 704a and 706a each at a greater level of prominence, as shown in FIG. 7B. For example, a size of the user interface elements 704a and/or 706a, respectively, is increased in three-dimensional environment 702, as shown in the overhead view in FIG. 7B. Additionally or alternatively, a distance between he user interface elements 704a and/or 706a, respectively, and the viewpoint of the user 726 optionally decreases, as shown in the overhead view in FIG. 7B. In some embodiments, computer system 101 controls the size of the user interface elements 704a and 706a in three-dimensional environment 702 based on the distance of the user interface elements from the viewpoint of user 726 to avoid objects consuming a large portion of the field of view of user 726 from their current viewpoint. Thus, in some embodiments, the user interface elements 704a and 704b are associated with appropriate or optimal sizes for their current distance from the viewpoint of user 726, and computer system 101 automatically changes the sizes of user interface elements 704a and 706a to conform with their appropriate or optimal sizes.

In some embodiments, in response to detecting the gaze directed to the user interface elements 704a and/or 706a, respectively, the computer system 101 displays one or more options for accepting or denying the request to share content with the computer system 101. For example, as shown in FIG. 7B, the one or more options include an accept option 717a/717b and a decline option 719a/719ba. As shown, the accept option 717a and the decline option 719a are optionally displayed with (e.g., above, below, to a side of, or within) a portion of the user interface element 704a, and/or the accept option 717b and the decline option 719b are optionally displayed with a portion of the user interface element 706a. In some embodiments, as discussed in more detail below, selection of the accept option 717a of the user interface element 704a causes the content (e.g., the first content item 711, the second content item 713, and the third content item 715) corresponding to the user interface element 704a and shared with the computer system 101 to be downloaded to (e.g., stored and/or accessible at) the computer system 101, and/or selection of the accept option 717b of the user interface element 706a causes the content corresponding to the user interface element 706a and shared with the computer system 101 to be downloaded to the computer system 101. In some embodiments, selection of the decline option 719a of the user interface element 704a causes the content corresponding to user interface element 704a and shared with the computer system 101 to forgo being downloaded to the computer system 101, and/or selection of the decline option 719b of the user interface element 706a causes the content corresponding to user interface element 706a and shared with computer system 101 to forgo being downloaded to the computer system 101. In some embodiments, selection of the decline option 719a causes the computer system 101 to cease displaying the user interface element 704a, and/or selection of the decline option 719b causes the computer system 101 to cease displaying the user interface element 706a in three-dimensional environment 702.

In some embodiments, the content shared with computer system 101 can be interacted with (e.g., viewed, played, opened, etc.) in three-dimensional environment 702 without requiring the content be downloaded to the computer system 101. For example, in response to detecting a respective input directed to the content (e.g., corresponding to a selection of one of the representations of the first content item 711, the second content item 713, and/or the third content item 715), the computer system 101 performs a respective operation involving the content. For example, the computer system 101 displays a full representation of the selected content item, initiates playback of video or audio associated with the selected content item, or initiates sending a message to or producing an outgoing phone call to a contact associated with the selected content item. In some embodiments, after performing the respective operation involving the content, the computer system 101 closes (e.g., the representation of) the selected content item and/or redisplays the one or more options for accepting or denying the request to share the content with the computer system 101 (e.g., the accept option 717a/717b and/or the decline option 719a/719b).

As mentioned above, in some embodiments, computer system 101 downloads (e.g., stores data and/or files corresponding to) the content shared with computer system 101 in response to a selection of the one or more options to accept the request to share the content in the three-dimensional environment 702. For example, in FIG. 7B, hand 705a (e.g., in Hand State A) is providing a selection input directed to accept option 717a associated with user interface element 704a, and hand 707a (e.g., in Hand State A) is providing a selection input directed to accept option 717b associated with user interface element 706a. In some embodiments, the selection inputs from hands 705a and/or 707a are air gesture inputs. For example, from FIGS. 7B-7C, computer system 101 detects hand 705a move away from the body of the user 726 and provide a pinch or tap directed to the accept option 717 associated with user interface element 704a, and computer system 101 optionally detects hand 707a move away from the body of the user 726 and provide a pinch or tap directed to the accept option 717 associated with user interface element 706a. It should be understood that while multiple hands and corresponding inputs are illustrated in FIGS. 7A-7F, such hands and inputs need not be detected by computer system 101 concurrently; rather, in some embodiments, computer system 101 independently responds to the hands and/or inputs illustrated and described in response to detecting such hands and/or inputs independently.

Figure 7C:
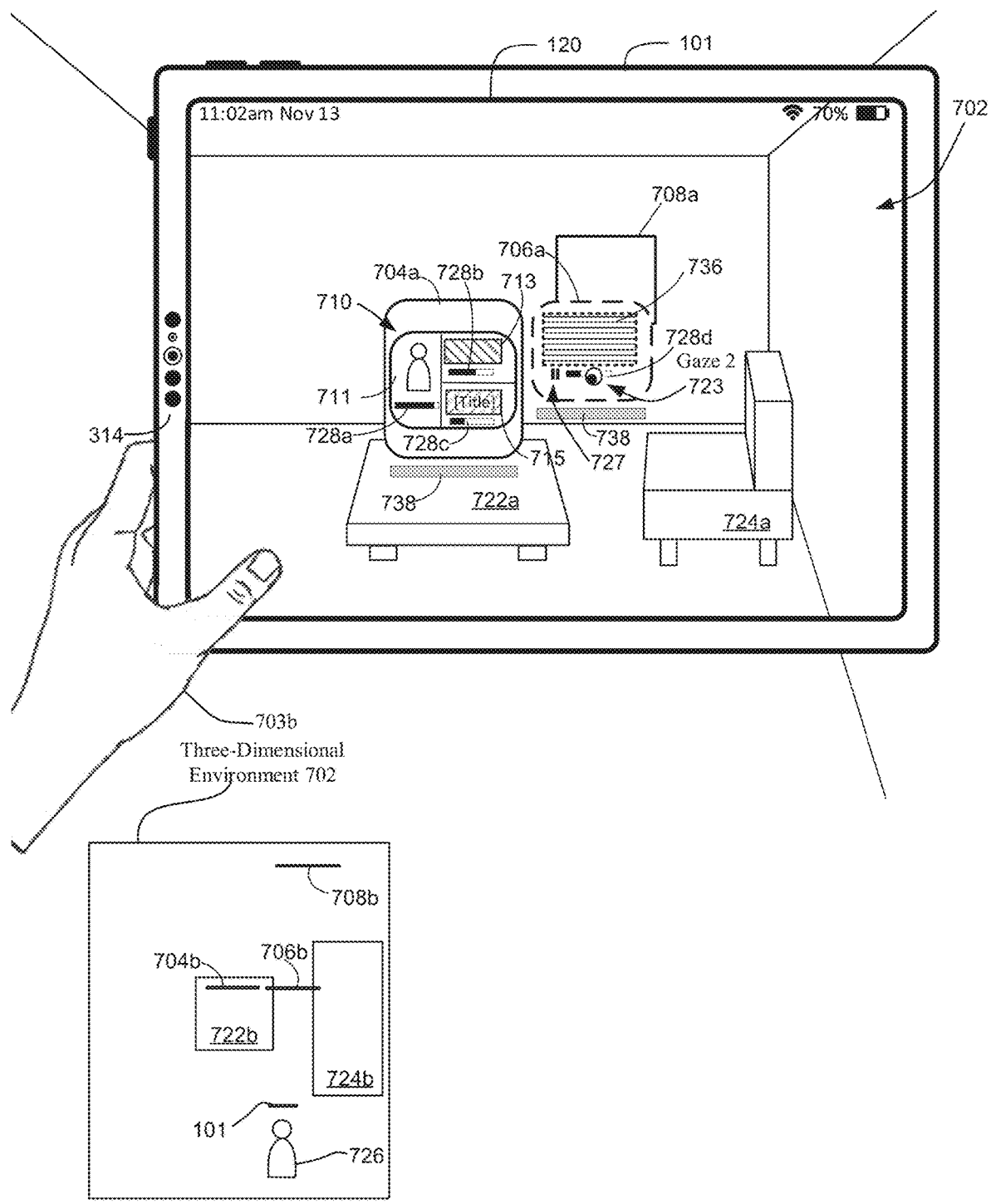

In response to the selection of the accept options 717a and/or 717b detected in FIG. 7B, the computer system 101 optionally begins downloading the shared content corresponding to the user interface elements 704a and/or 706a, respectively, as shown in FIG. 7C. In some embodiments, when the content corresponding to the user interface elements 704a and/or 706a begin downloading to the computer system 101, the computer system 101 displays one or more visual indicators of a download progress of the content in three-dimensional environment 702. For example, as shown in FIG. 7C, one or more download progress bars are displayed for the content corresponding to the user interface elements 704a and/or 706a. In some embodiments, the one or more download progress bars are displayed with the representations of the content items (e.g., below each representation). As shown in FIG. 7C, the representation of the first content item 711 is optionally displayed with the download progress bar 728a, the representation of the second content item 713 is optionally displayed with the download progress bar 728b, and the representation of the third content item 715 is optionally displayed with the download progress bar 728c. As shown in FIG. 7C, in response to the selection of the accept option 717b associated with user interface element 706a detected in FIG. 7B, a representation of the content 736 corresponding to the user interface element 706a is optionally displayed in three-dimensional environment 702. The representation of the content 736 is optionally displayed with download progress bar 728d in user interface element 706a.

In some embodiments, the download of the content corresponding to a respective user interface element can be paused in three-dimensional environment 702. For example, while the content corresponding to a respective user interface element is downloading to computer system 101, in response to detecting attention (e.g., gaze) directed to a portion of user interface element 706a, computer system 101 displays a selectable option for pausing the download of the content. As shown in FIG. 7C, in response to detecting gaze 723 directed to the download progress bar 728d, computer system 101 optionally displays pause option 727 in three-dimensional environment 702. In some embodiments, the pause option 727 is displayed in a portion of the user interface element 706a (e.g., adjacent to the download progress bar 728d). In some embodiments, selection of the pause option 727 causes computer system 101 to cease downloading the content 736. In some embodiments, a subsequent selection of the pause option 727 causes computer system 101 to resume downloading the content 736.

In some embodiments, after the user interface elements 704a and/or 706a begin downloading the content corresponding to the user interface elements 704a and/or 706a, computer system 101 causes the user interface elements 704a and/or 706a to become world-locked in three-dimensional environment 702. As shown in FIG. 7C, the user interface elements 704a and/or 706a may be displayed, respectively, with a handle or grabber bar 738 signifying that the user interface elements 704a and/or 706a are displayed in three-dimensional environment 702 relative to three-dimensional environment 702, and no longer relative to the viewpoint of user 726. For example, in response to detecting a change in the user's viewpoint (e.g., as discussed with reference to FIGS. 7A-7B), the computer system 101 forgoes moving the user interface elements 704a and/or 706a to a new location in three-dimensional environment 702 (e.g., that corresponds to a center of the field of view of the three-dimensional environment 702). In some embodiments, the handle or grabber bar 738 of the user interface elements 704a and/or 706a, respectively, is selectable (e.g., via selection input provided by a hand of the user 726) to initiate movement of each of the user interface elements 704a and 706a in three-dimensional environment 702.

Figure 7D:
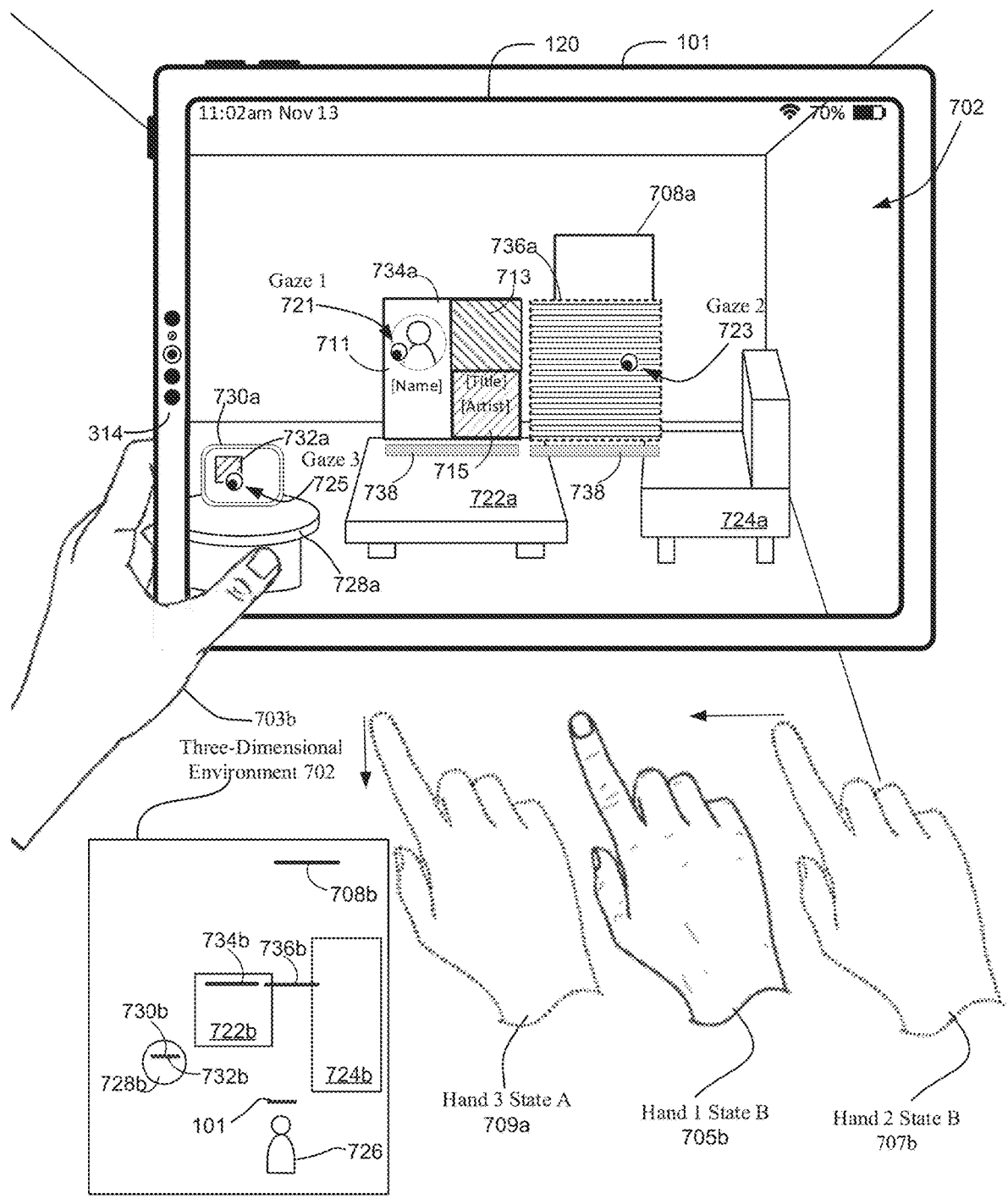

In FIG. 7D, after the content corresponding to the user interface elements 704a and/or 706a is downloaded to computer system 101, computer system 101 displays virtual objects 734a and/or 736a corresponding to the content in three-dimensional environment 702. In some embodiments, computer system 101 replaces display of user interface elements 704a and 706a with virtual objects 734a (e.g., corresponding to object 734b in the overhead view) and 736a (e.g., corresponding to object 736b in the overhead view), respectively, in three-dimensional environment 702. Additionally, in some embodiments, virtual objects 734a and/or 736a are displayed with a grabber or handlebar 738, respectively, that is selectable to initiate movement of virtual object 734a or virtual object 736a in three-dimensional environment 702. As shown in FIG. 7D, virtual object 734a optionally includes the representations of the first content item 711, the second content item 713, and the third content item 715 that were downloaded to computer system 101. Virtual object 736a optionally includes the representation of the content 736a that was downloaded to computer system 101. In some embodiments, the representations of the content displayed in virtual objects 734a and/or 736a include greater and/or additional portions of the content than that previously displayed in user interface elements 704a and/or 706a, respectively, in three-dimensional environment 702. For example, as shown in FIG. 7D, the representation of the first content item 711 includes a greater portion of the contact information (e.g., the name of the contact) corresponding to the first content item. The representation of the second content item 713 optionally includes a greater portion of the photograph corresponding to the second content item, and the representation of the third content item 715 optionally includes a greater portion of the song information (e.g., song artist) corresponding to the third content item. Likewise, the representation of the content displayed in virtual object 736a includes a greater portion (e.g., or all) of the photograph corresponding to the content.

In some embodiments, multiple content items are displayed in a virtual object in a predetermined arrangement (e.g., predetermined by computer system 101). For example, as shown in FIG. 7D, virtual object 734a includes multiple (e.g., representations of) content items that are arranged in a grid-like arrangement. The representation of the first content item 711 is optionally displayed at a first size in virtual object 734a, and the representation of the second content item 713 and the representation of the third content item 715 are optionally displayed at a second size, smaller than the first size, in virtual object 734a. Additionally, in FIG. 7D, the representation of the second content item 713 is displayed adjacent to a first portion (e.g., a first half) of the representation of the first content item 711, and the representation of the third content item is displayed adjacent to a second portion (e.g., a second half) of the representation of the first content item 711, where the representation of the second content item 713 is displayed atop the representation of the third content item 715. It should be understood that the arrangement of the representations of content items 711-715 in virtual object 734a is exemplary and that alternate arrangements, including alternate sizes of the representations of the content items, are possible (e.g., depending on the number of content items). For example, if virtual object 734a were to contain two content items, computer system 101 would display the representations of the two content items in a side-by-side arrangement within virtual object 734a. Additionally or alternatively, if virtual object 734a were to contain four content items, computer system 101 would optionally display the representations of the four content items in a 2×2 grid arrangement within virtual object 734a.

In some embodiments, content items of different types are displayed in different objects in three-dimensional environment 702 after the content items are downloaded to computer system 101. For example, as mentioned above, the content corresponding to user interface element 706a in FIG. 7C is or includes a photograph and is thus a first type of content. In FIG. 7D, after the content corresponding to user interface element 706a downloads to computer system 101, the photographic content is displayed in virtual object 736a. In some embodiments, virtual object 736a is of a first type that corresponds to the first type of content. For example, the virtual object 736a is a window of a photo editing application that is displaying the photograph in three-dimensional environment 702. Likewise, as mentioned above, the second content item 713 optionally is or includes a photograph, and thus the second content item 713 would be displayed in a virtual object of the first type in three-dimensional environment 702. As described in more detail below, in situations in which multiple content items are displayed in a respective virtual object (e.g., such as virtual object 734a), an individual content item of the multiple content items can be removed from the respective virtual object to cause the computer system 101 to display the individual content item in a second virtual object of a respective type that corresponds to a type of the individual content item. Additionally, in some embodiments, an individual content item of the multiple content items can be selected in the respective virtual object to cause the computer system 101 to visually emphasize the individual content item in the respective virtual object, as described below.

In some embodiments, the physical environment surrounding the computer system 101 includes a second computer system (e.g., a second electronic device) that is configured to communicate with computer system 101. In some such embodiments, a representation of the second computer system is displayed in three-dimensional environment 702 or is otherwise visible via display generation component 120 of the computer system 101. For example, in FIG. 7D, a representation of the second computer system 730a (e.g., corresponding to computer system 730b in the overhead view) is visible in three-dimensional environment 702. The representation of the second computer system 730a is optionally visible atop a representation 728a of a round table (corresponding to table 728b in the overhead view), which is optionally a representation of a physical round table on which the second computer system is placed in the physical environment. In some embodiments, the representation of the second computer system 730a is associated with a respective content item 732a in three-dimensional environment 702. For example, a representation of the respective content item 732a is displayed via a display device of the second computer system 730a. In some embodiments, as discussed below, content (e.g., data and/or files corresponding to the content) can be shared between the computer system 101 and the second computer system 730a in the physical environment by interacting with representations of the content in three-dimensional environment 702.

In FIG. 7D, hand 705b (e.g., in Hand State B) is providing selection input directed to the representation of the first content item 711 in virtual object 734a. For example, from FIGS. 7D-7E, computer system 101 detects hand 705b move away from the body of the user 726 and provide a pinch or tap directed to the representation of the first content item 711 in virtual object 734a while the gaze 721 of the user 726 is directed to the representation of the first content item 711. Additionally, in FIG. 7D, hand 707b (e.g., in Hand State B) is providing movement input directed to virtual object 736a (e.g., or grabber bar 738 associated with virtual object 736a), and hand 709a (e.g., in Hand State A) is providing movement input directed to the representation of the respective content item 732a. Hand 707b is optionally providing input for moving virtual object 736a in the direction of the representation of the second computer system 730a in three-dimensional environment 702, and hand 709a is optionally providing input for moving the representation of the respective content item 732a closer to the viewpoint of user 726 in three-dimensional environment 702. In some embodiments, such movement inputs include the hand of the user moving relative to the body of the user 726 while the hand is in a pinch hand shape (e.g., while the thumb and tip of the index finger of the hand are touching) and while the gaze is directed to the object. For example, from FIGS. 7D-7E, computer system 101 optionally detects hand 707b move leftward relative to the body of the user 726 while in the pinch hand shape and while the gaze 723 is directed to virtual object 736a, and computer system 101 optionally detects hand 709a move toward the body of the user 726 while in the pinch hand shape and while the gaze 725 is directed to the representation of the respective content item 732a.

Figure 7E:
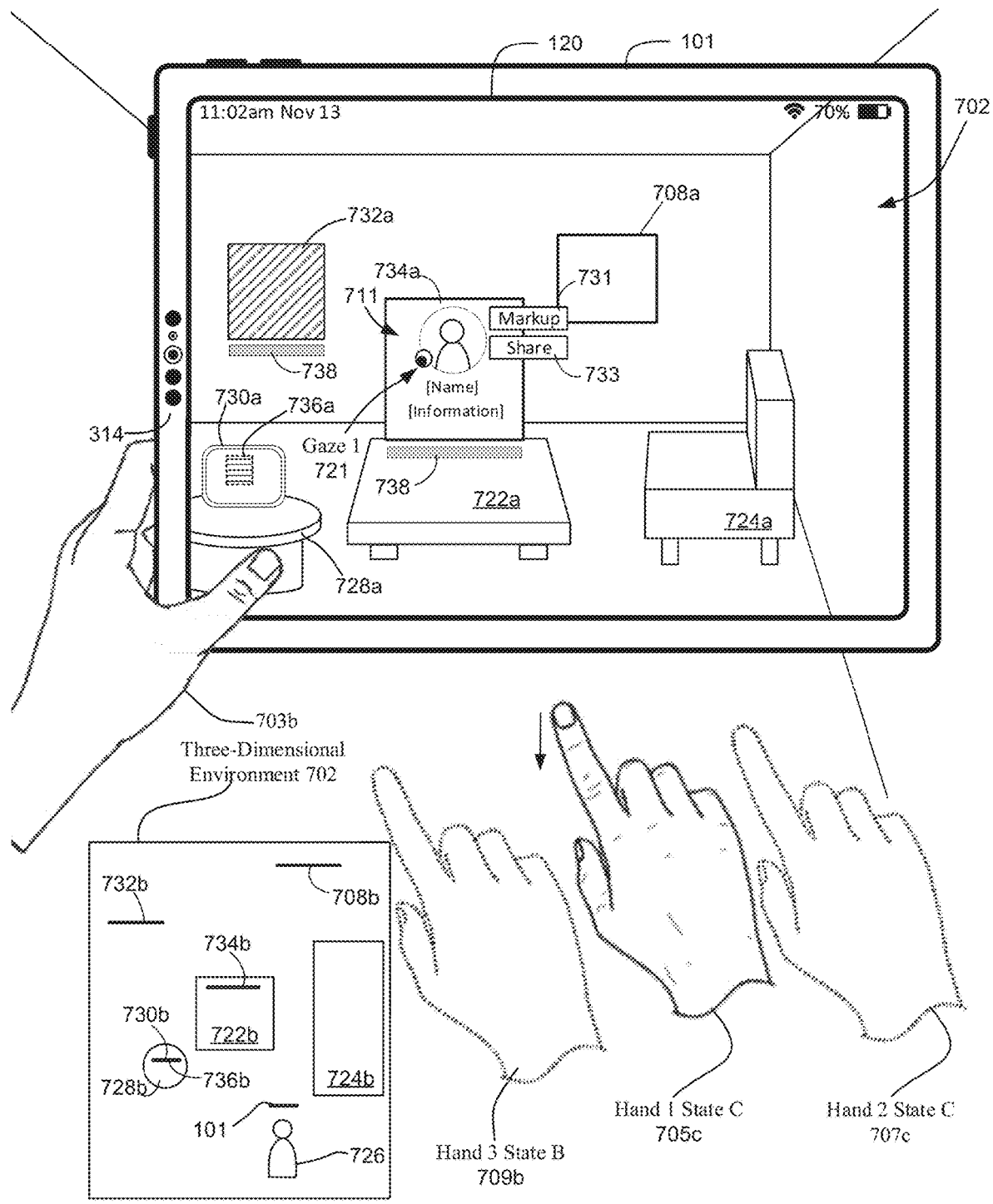

In FIG. 7E, in response to detecting selection of the representation of the first content item 711 in virtual object 734a, computer system 101 visually emphasizes the representation of the first content item 711 in virtual object 734a in three-dimensional environment 702. For example, the representation of the first content item 711 is expanded and/or enlarged within virtual object 734a to correspond to a size of virtual object 734a, and the representations of the second content item 713 and the third content item 715 cease to be displayed in virtual object 734a. Additionally, the representation of the first content item 711 includes additional portions of the contact corresponding to the first content item (e.g., additional contact information, such as contact number, email address, home/business address, etc.). In some embodiments, in response to detecting selection of the representation of the first content item 711 in virtual object 734a, computer system 101 displays one or more control options associated with the first content item in three-dimensional environment 702. For example, in FIG. 7E, the one or more control options include a markup option 731 and a share option 733. In some embodiments, the markup option 731 is selectable to initiate a process to markup (e.g., edit, delete, etc.) the (e.g., representation of) the first content item 711. For example, the markup option 731 is selectable to initiate a process to modify one or more details of the contact. In some embodiments, the share option 733 is selectable to initiate a process to share (e.g., send a copy of, transfer, etc.) the (e.g., representation of) the first content item 711. For example, the share option 733 is selectable to initiate a process to share the contact with a second computer system or second electronic device that is configured to receive data from the computer system 101 (e.g., such as second computer system 730a).

Further, in FIG. 7E, in response to detecting movement of virtual object 736a to a location of the representation of the second computer system 730a, computer system 101 shares the content corresponding to virtual object 736a with the second computer system 730a. For example, as shown, after computer system 101 shares the content with the second computer system 730a, virtual object 736a is displayed (e.g., is visible via) the display device of the second computer system 730a that is visible in three-dimensional environment 702. In some embodiments, computer system 101 ceases to display virtual object 736a in three-dimensional environment 702. In some embodiments, computer system 101 maintains display of virtual object 736a (e.g., at a location near (e.g., above) the representation of the second computer system 730a) in three-dimensional environment 702. In some such embodiments, a copy of virtual object 736a is displayed (e.g., is visible via) the display device of the second computer system 730a that is visible in three-dimensional environment 702.

In response to detecting movement of the representation of the respective content item 732a away from the representation of the second computer system 730a, computer system 101 receives the respective content item from the second computer system 101. For example, as shown, after the respective content item is received by (e.g., is shared with) the computer system 101, computer system 101 displays the representation of the respective content item 732a as a new object in three-dimensional environment 702. Accordingly, the representation of the respective content item 732a is optionally displayed with a grabber or handlebar 738 that is selectable to initiate movement of the representation of the respective content item 732a in three-dimensional environment 702.

In some embodiments, movement of a representation of a content item that is displayed in a virtual object away from the virtual object in three-dimensional environment 702 causes computer system 101 to display the representation of the content item as a new object in three-dimensional environment 702. In FIG. 7E, hand 705c (e.g., in Hand State C) is providing movement input directed to the representation of the first content item 711. Hand 705c is optionally providing input for moving the representation of the first content item 711 toward the viewpoint of user 726 and away from virtual object 734a in three-dimensional environment 702. In some embodiments, such movement input includes the hand of the user moving toward the body of the user 726 while the hand is in a pinch hand shape (e.g., while the thumb and tip of the index finger of the hand are touching) while the gaze of the user is directed to the object. For example, from FIGS. 7E-7F, computer system 101 optionally detects hand 705c move toward the body of the user 726 while in the pinch hand shape and while the gaze 721 is directed to the representation of the first content item 711.

Figure 7F:
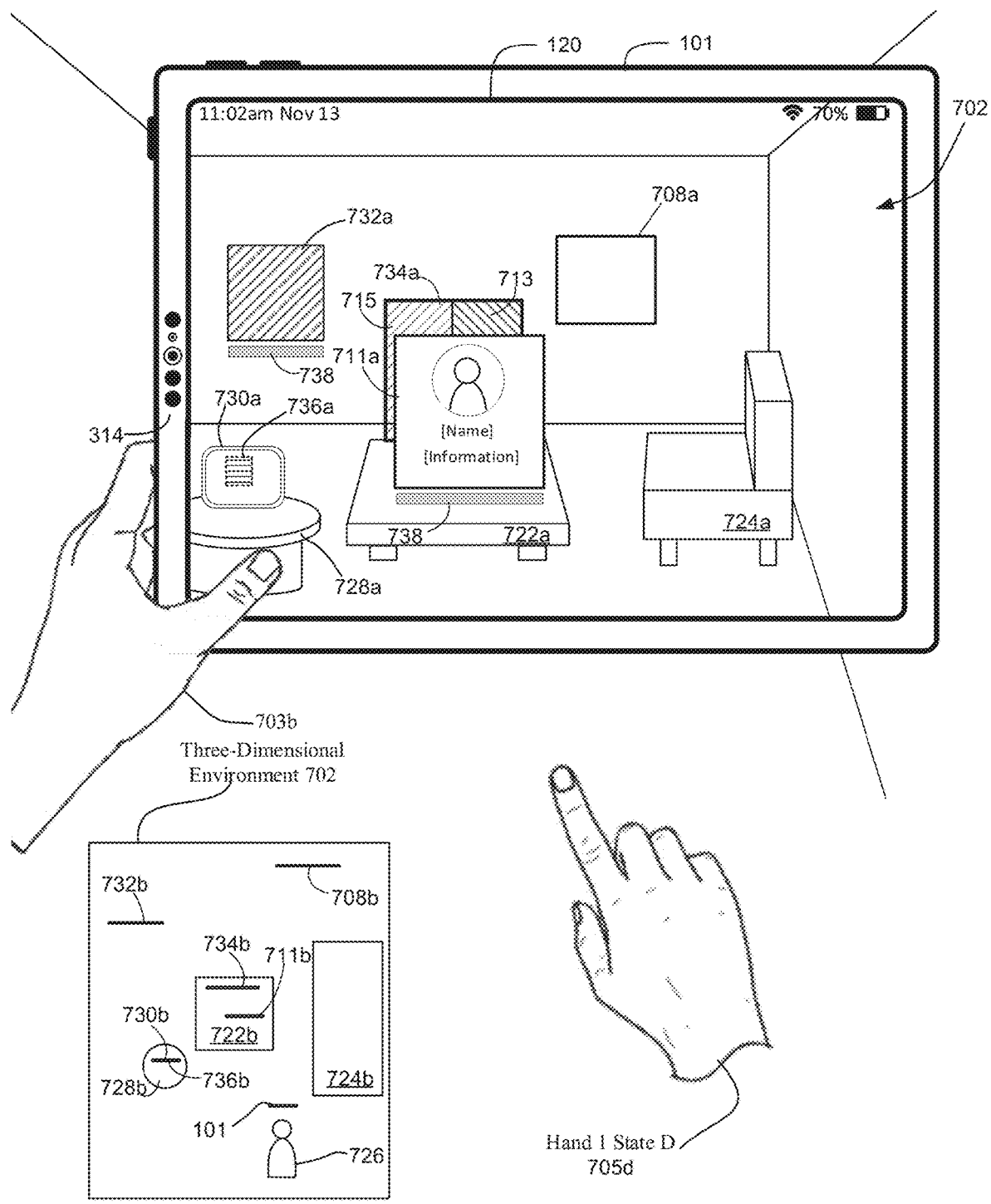
Figure 8A:
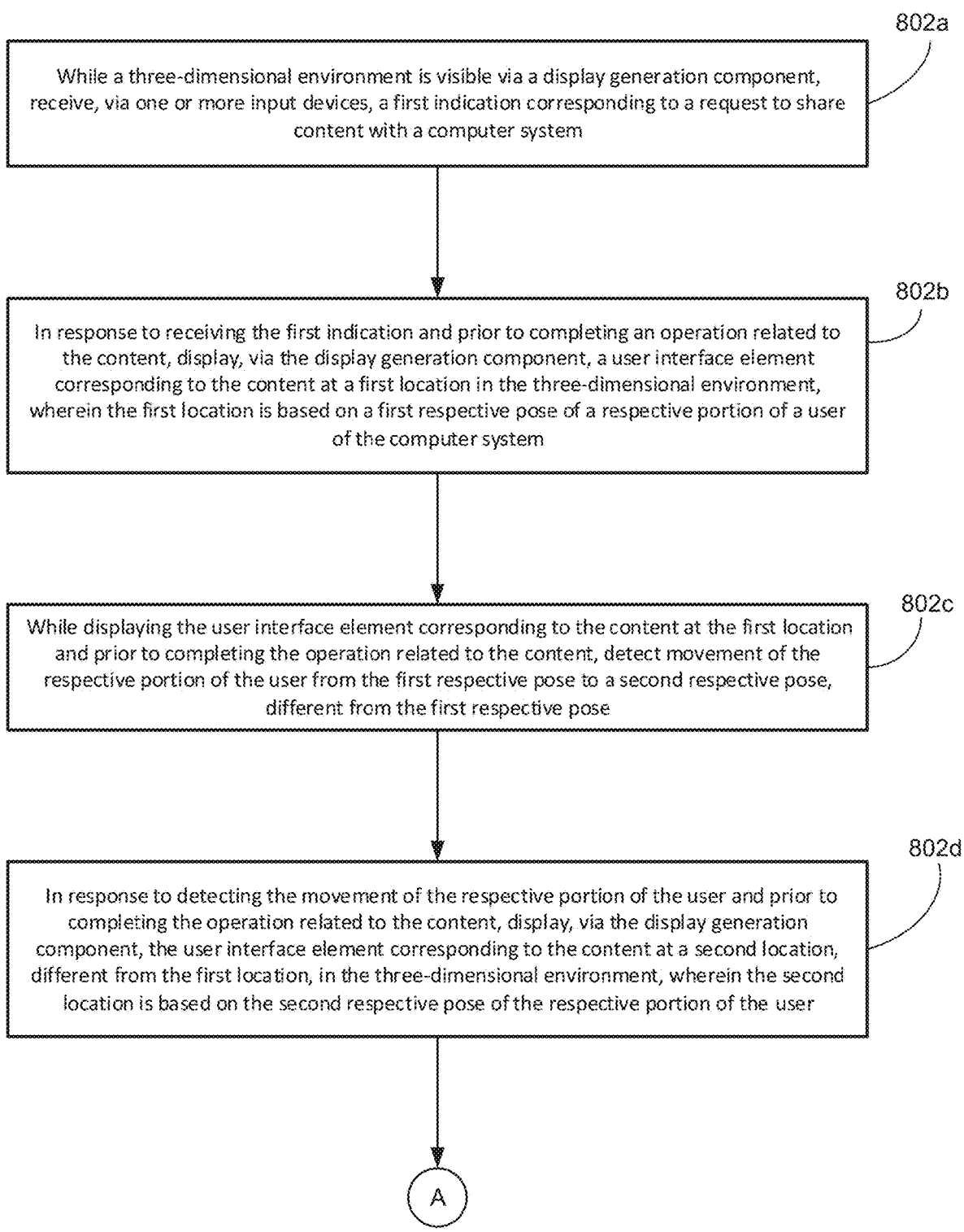
FIGS. 8A-8L is a flowchart illustrating a method of receiving content that is shared with a computer system in a three-dimensional environment in accordance with some embodiments.
Figure 8B:
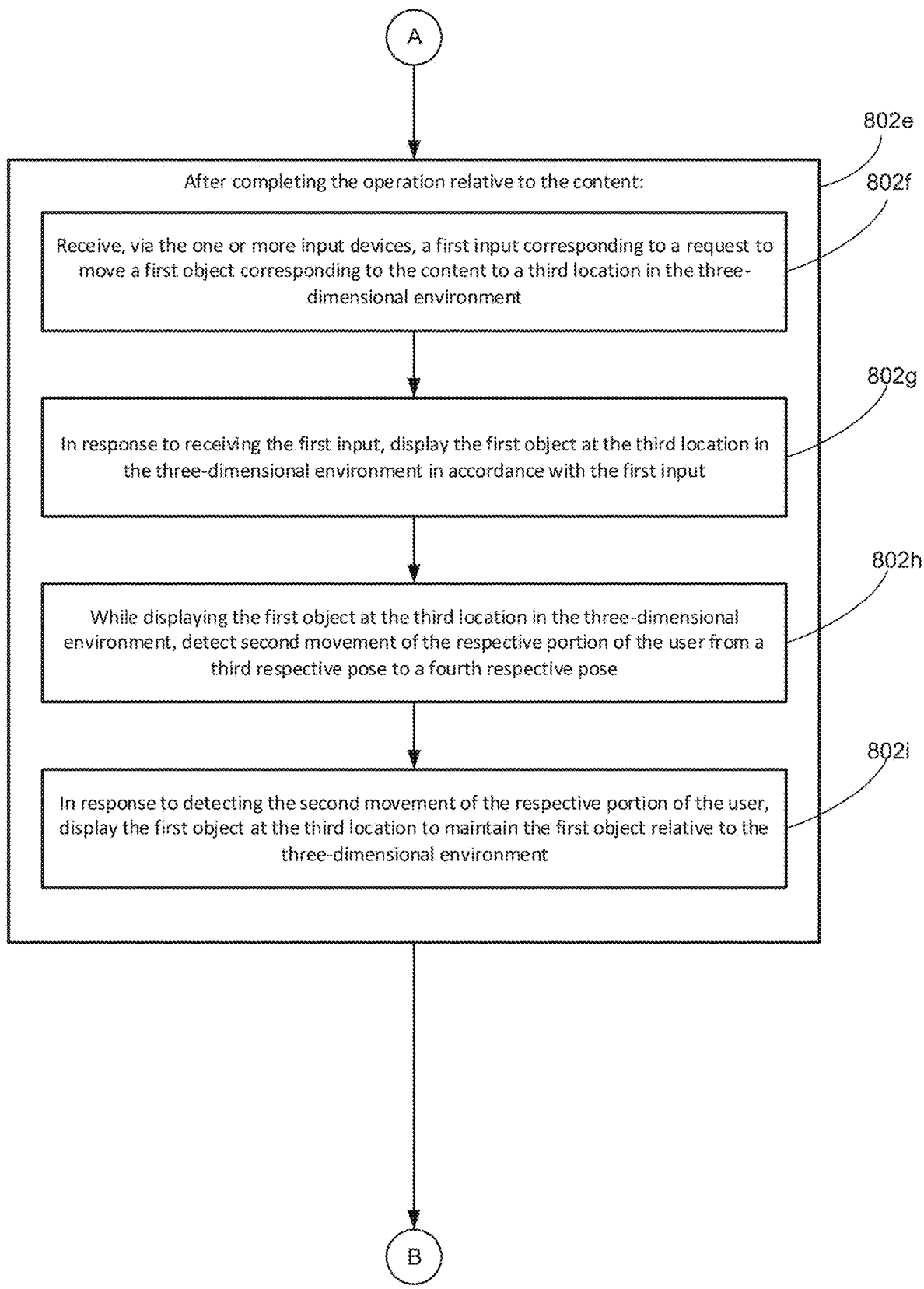
Figure 8C:
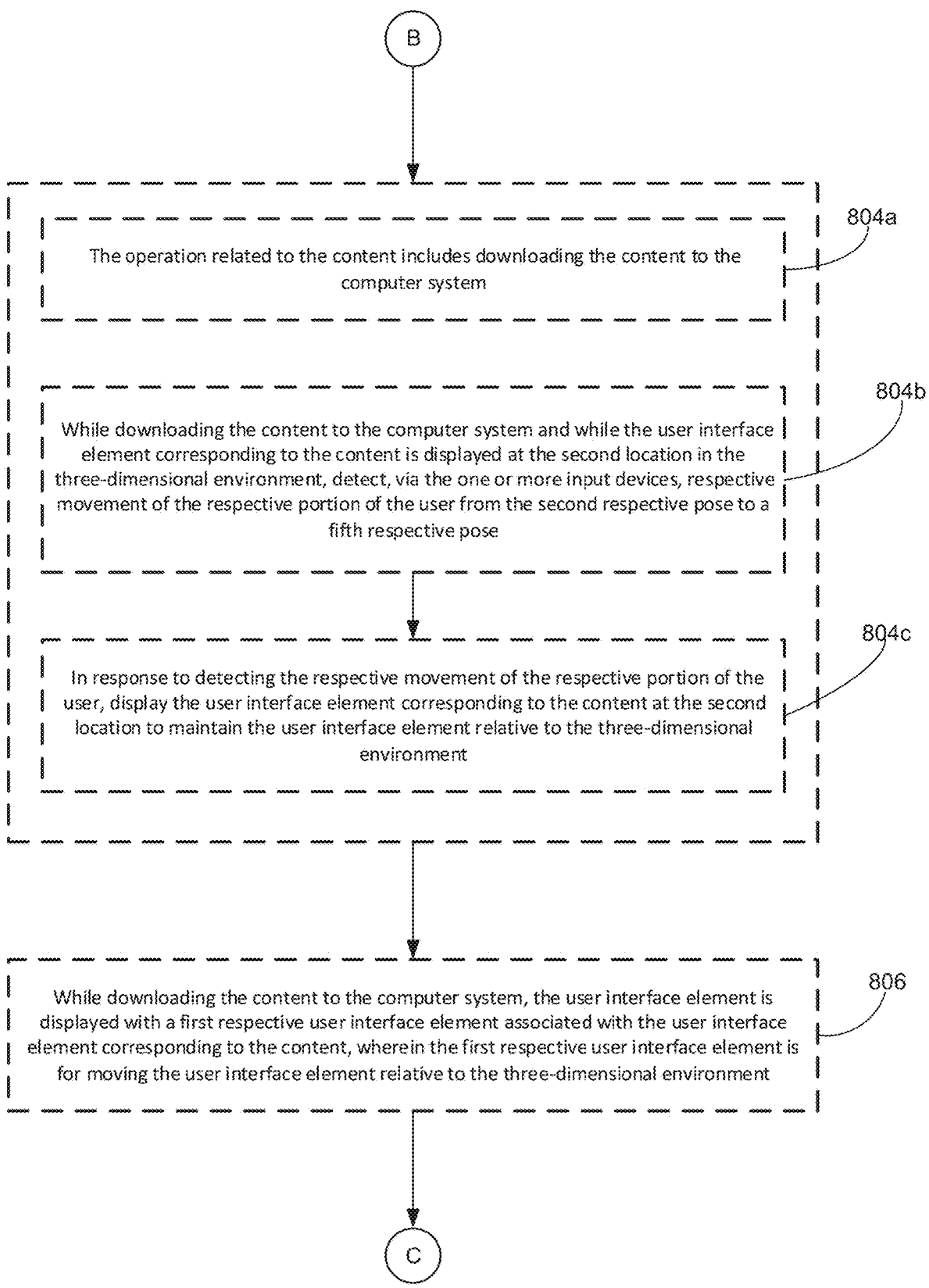
Figure 8D:
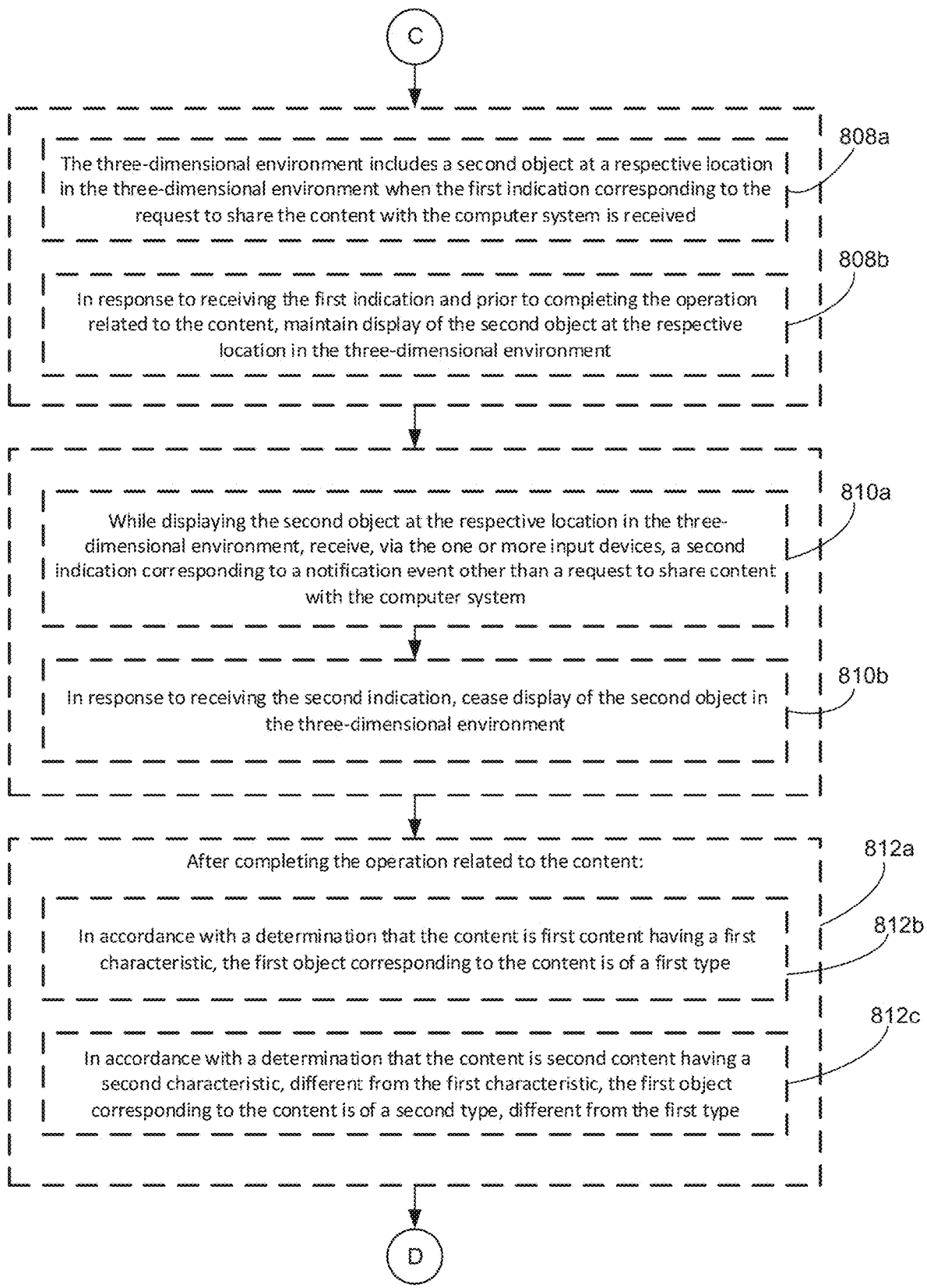
Figure 8E:
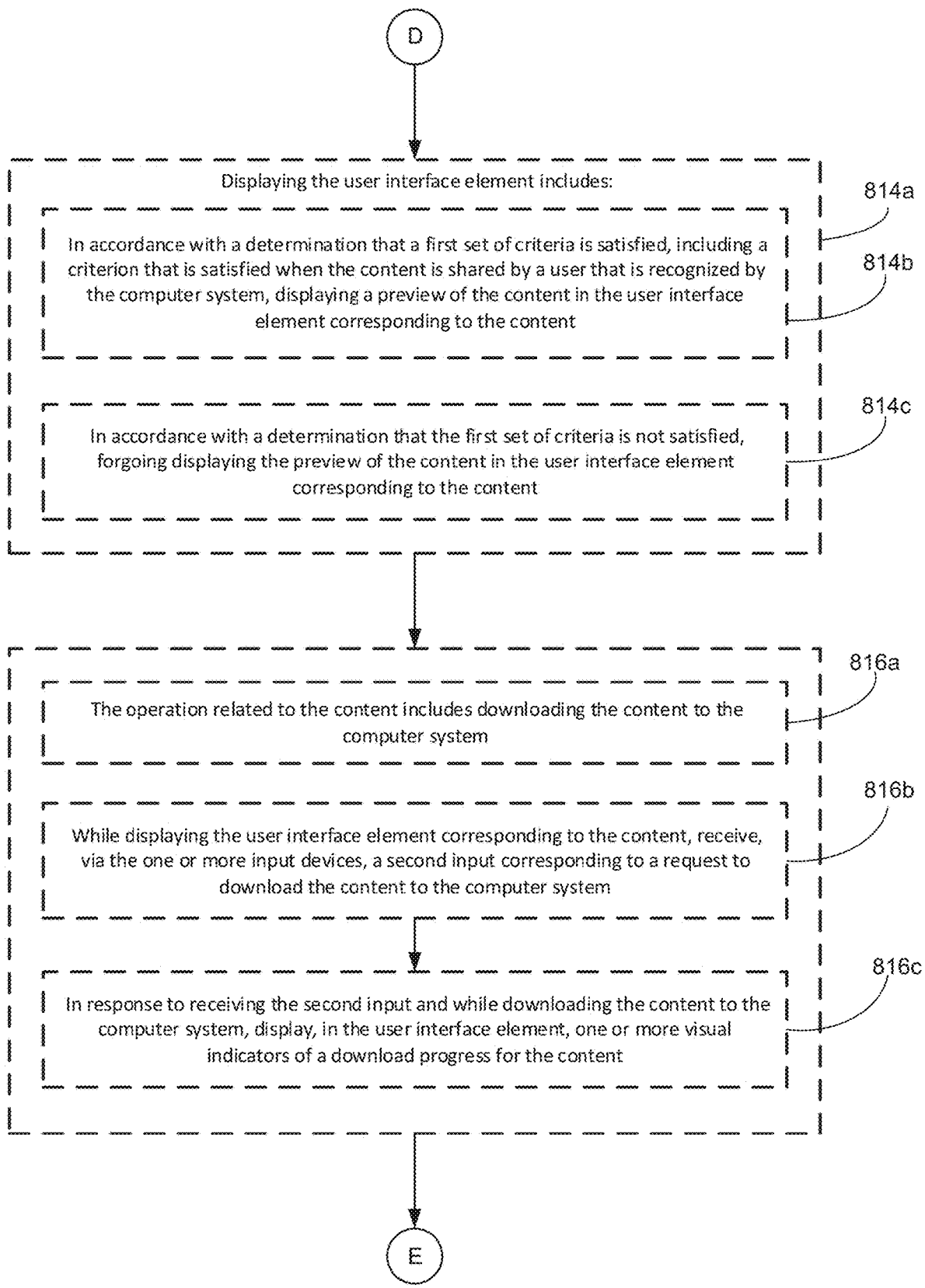
Figure 8F:
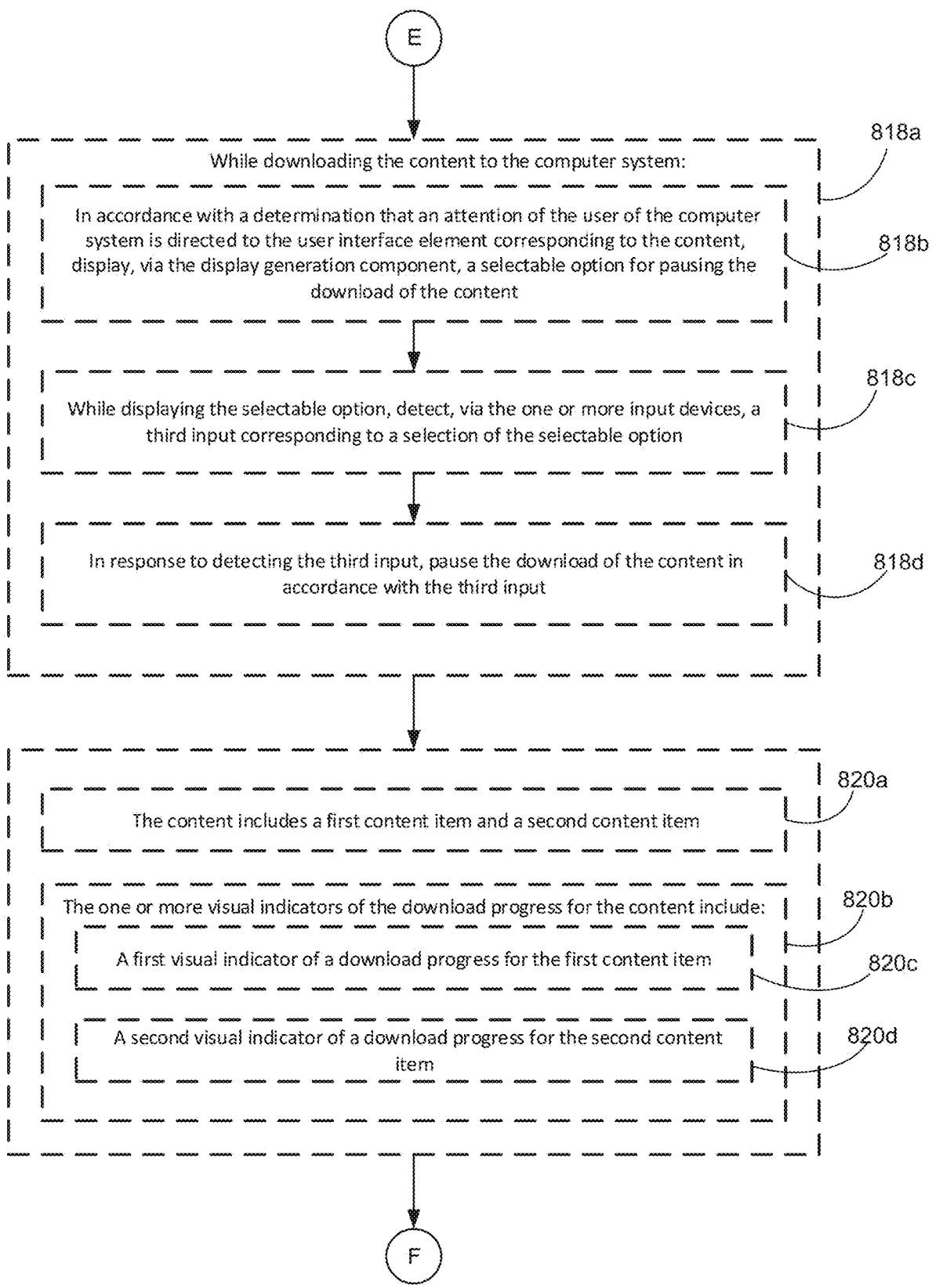
Figure 8G:
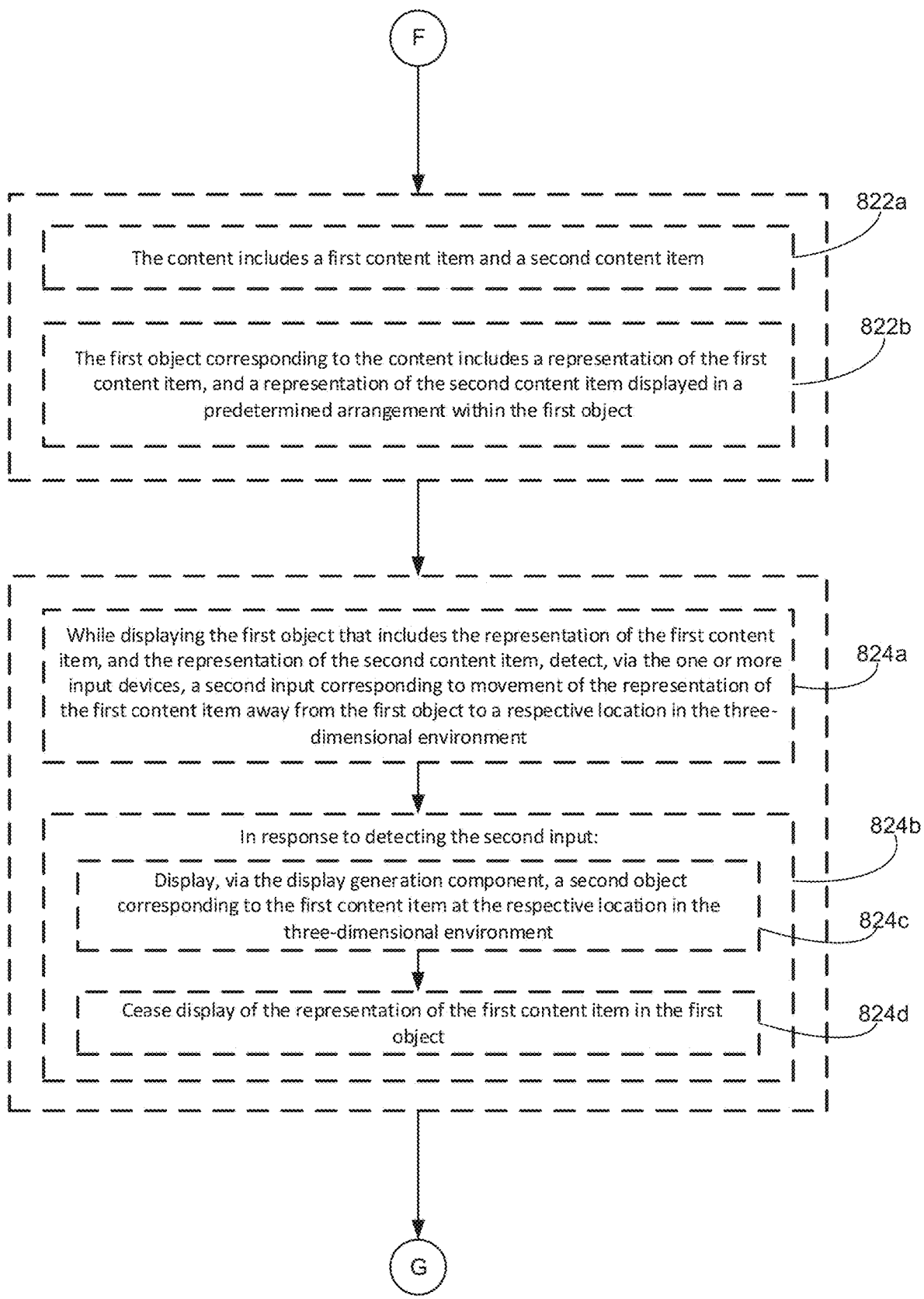
Figure 8H:
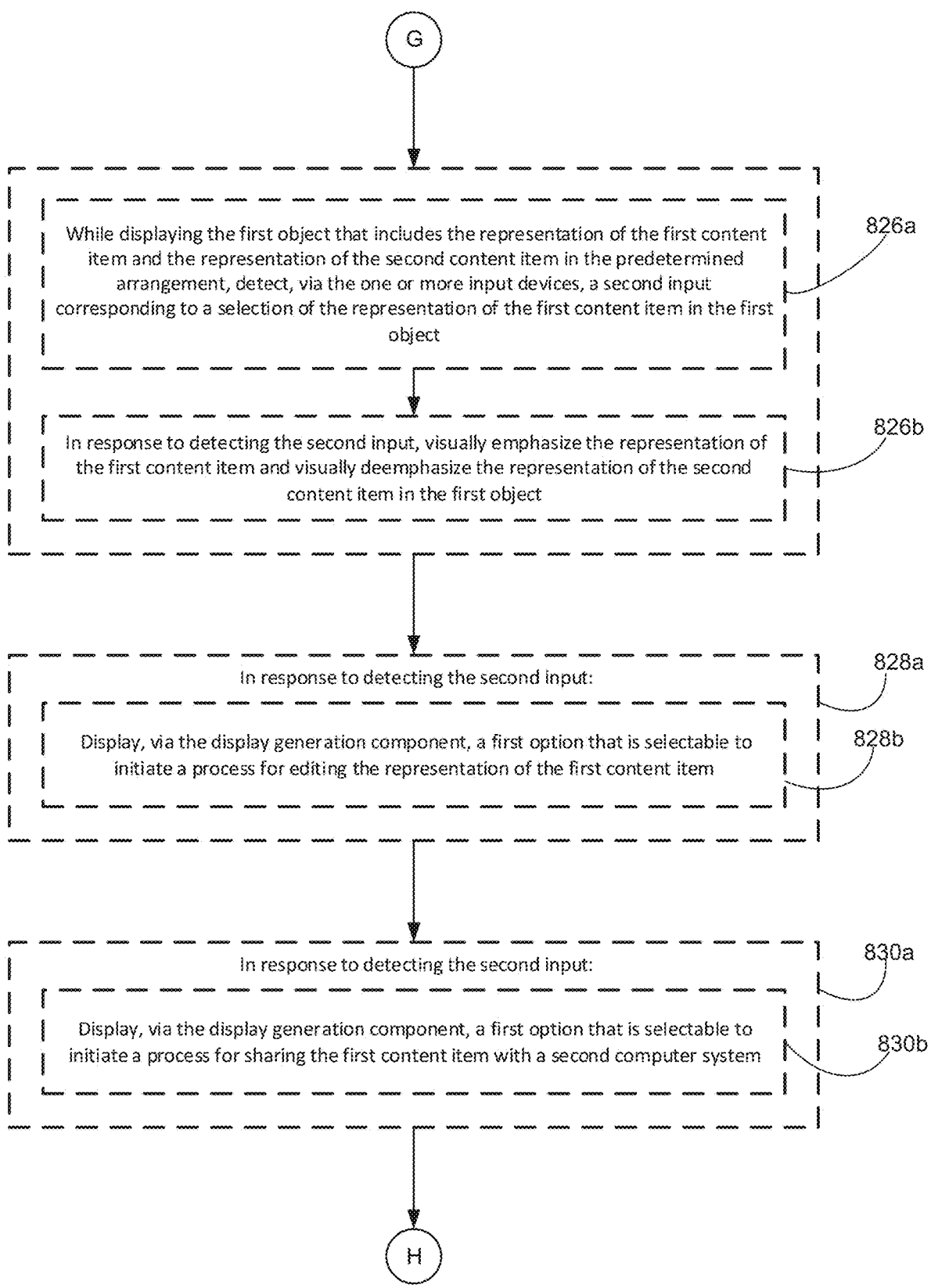
Figure 8I:
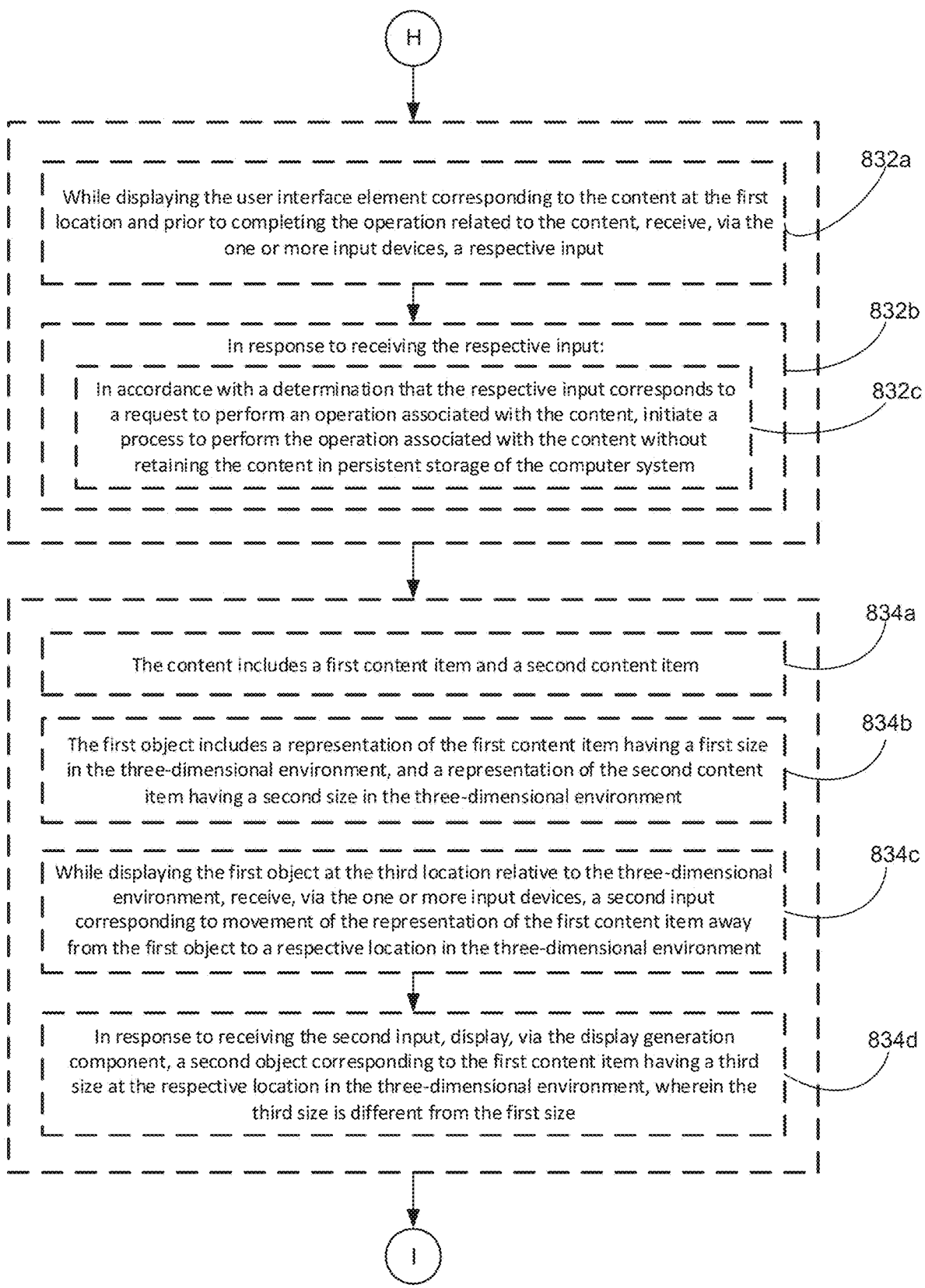
Figure 8J:
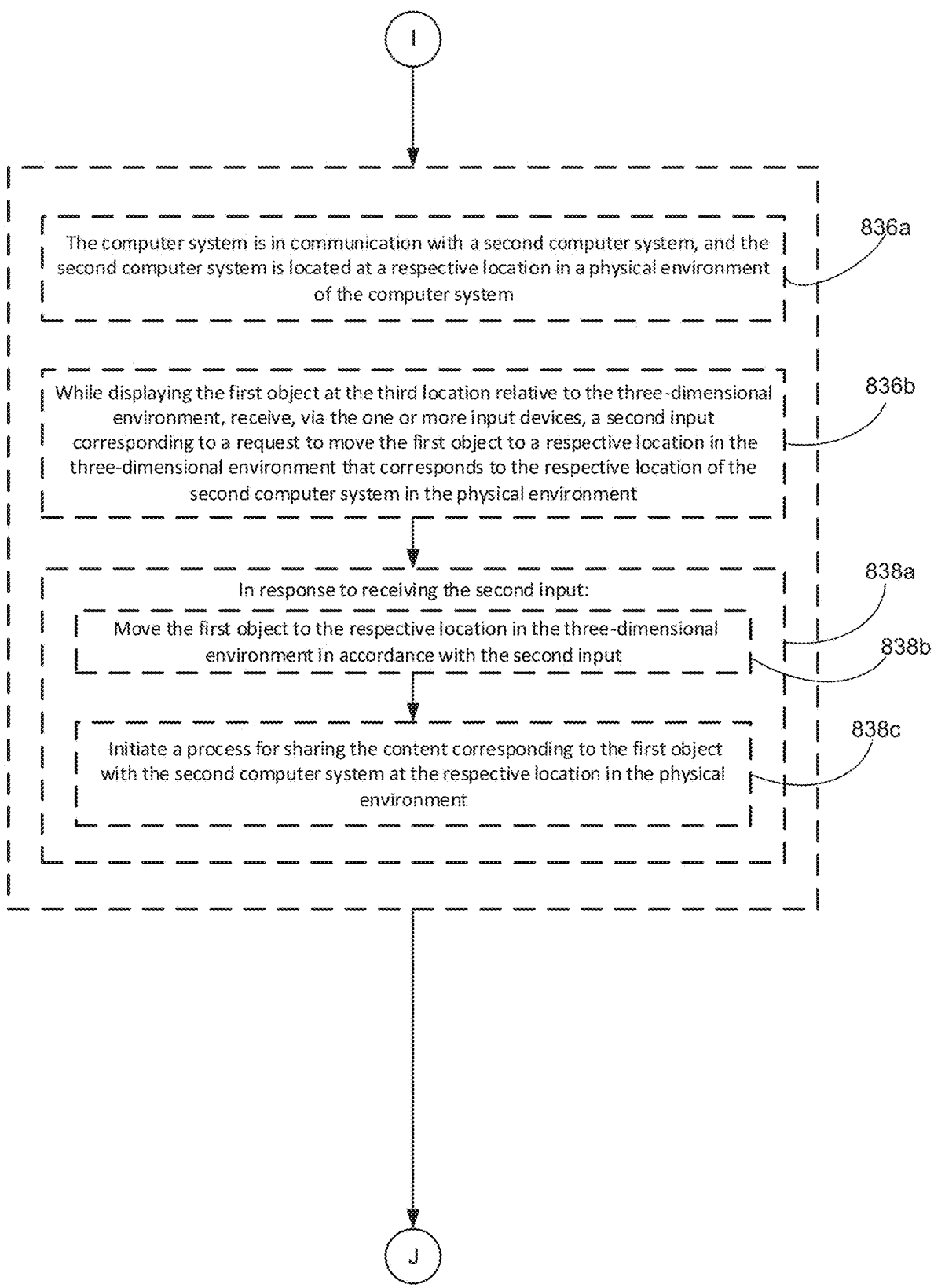
Figure 8K:
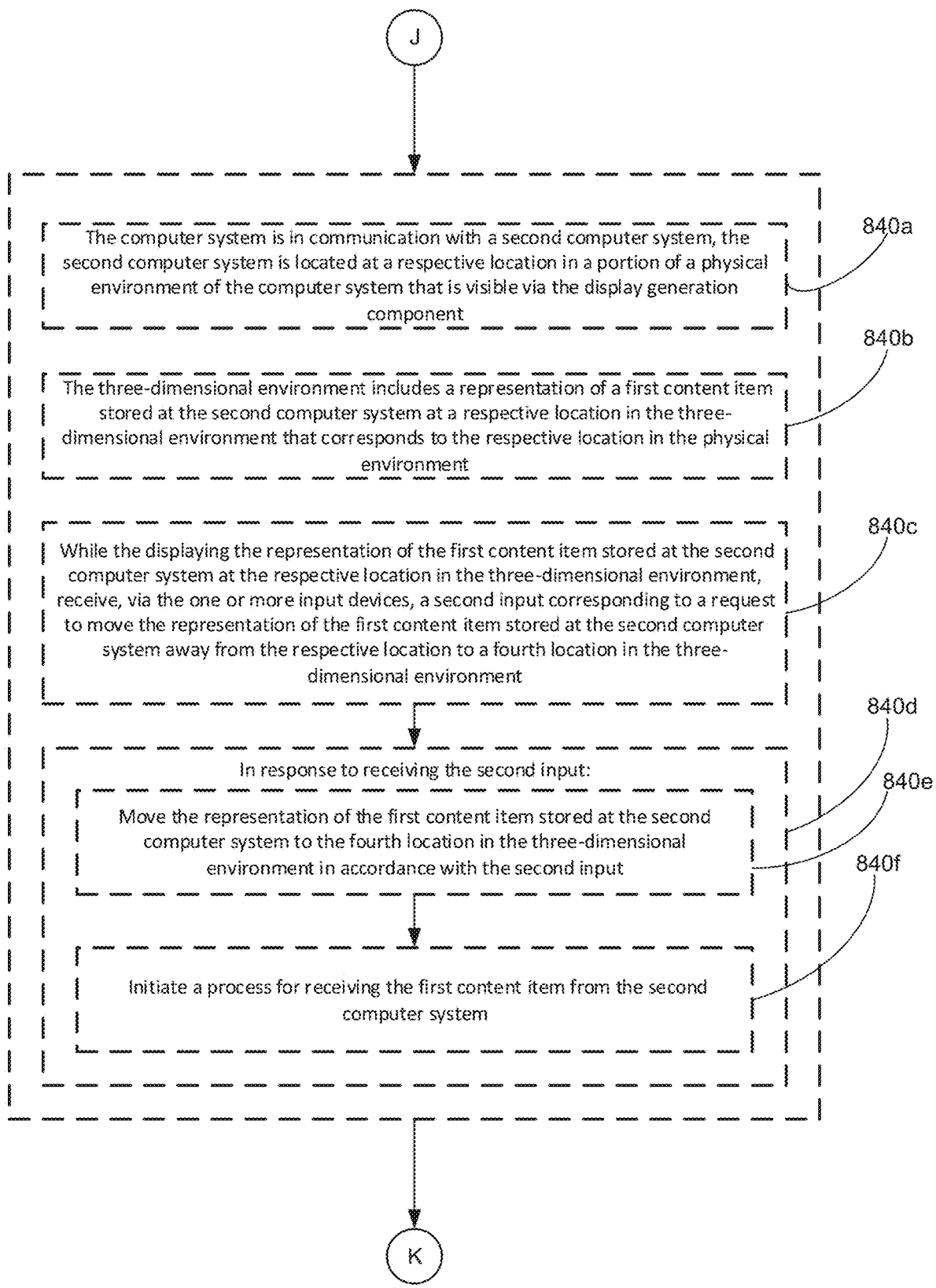
Figure 8L:
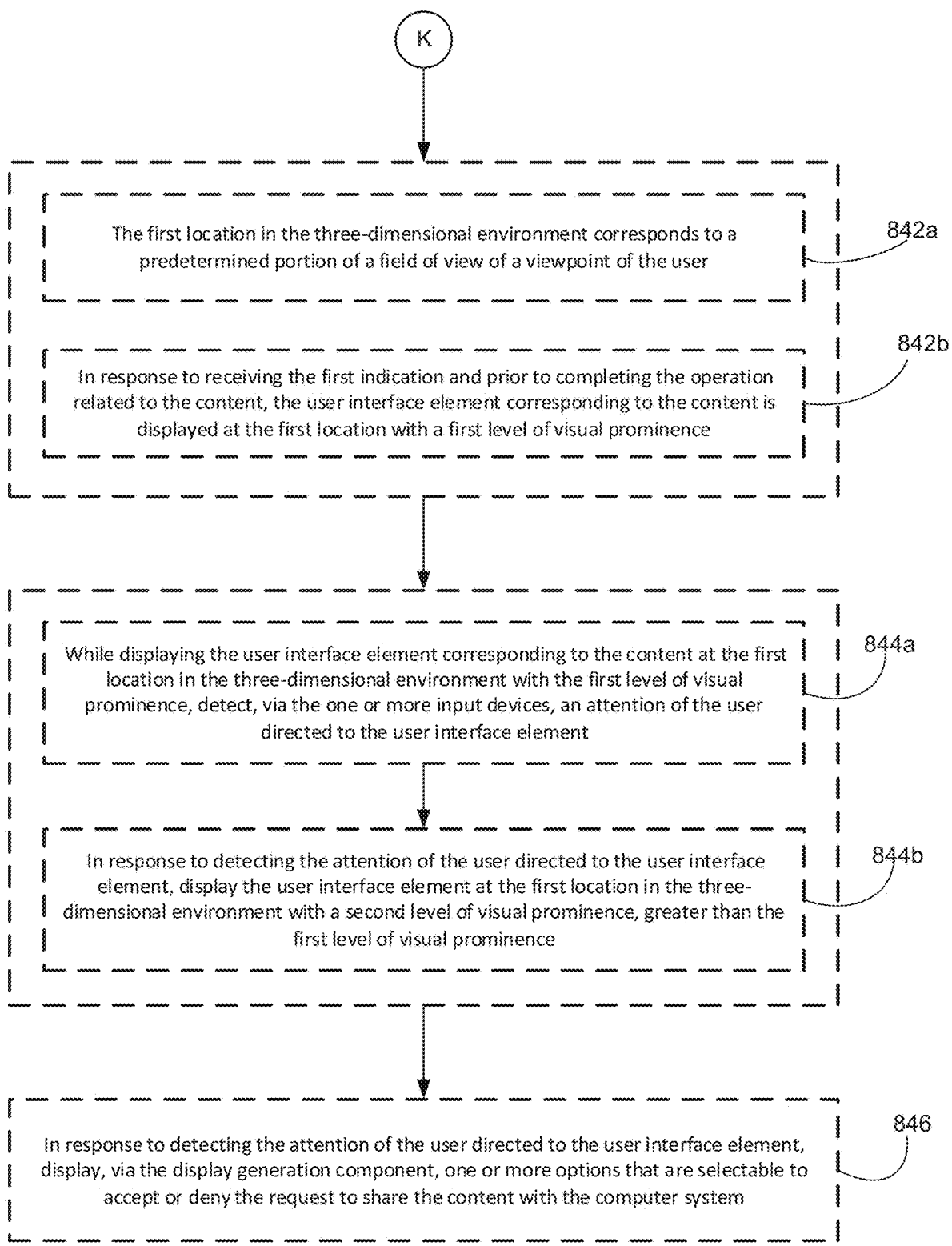

In FIG. 7F, in response to detecting movement of the representation of the first content item 711 away from the virtual object 734a in three-dimensional environment 702, computer system 101 optionally displays a new object 711a corresponding to the first content item in three-dimensional environment 702. In some embodiments, after displaying the new object 711a corresponding to the first content item in three-dimensional environment 702, the representation of the first content item (e.g., 711) is no longer displayed in virtual object 734a. For example, as shown in FIG. 7F, computer system 101 ceases display of the representation of the first content item in virtual object 734a, and the representation of the second content item 713 and the representation of the third content item 715 are displayed in a new predetermined arrangement (e.g., new grid-like arrangement) in virtual object 734a. As shown, the representation of the second content item 713 and the representation of the third content item 715 are optionally displayed side-by-side in virtual object 734a at a larger size (e.g., larger than the second size and/or equal to the first size discussed above with reference to FIG. 7D). In some embodiments, as similarly discussed above, the first content item is or includes a contact, and thus is a second type of content (e.g., different from the first type of content discussed above (e.g., photographs)). Accordingly, virtual object 711a (e.g., corresponding to object 711b in the overhead view) is optionally of a second type that corresponds to the second type of content. For example, the virtual object 711a is a contact card of a contacts or phone calling application that is displaying the contact information in three-dimensional environment 702. In some embodiments, computer system 101 displays virtual object 711a with a grabber or handlebar that is selectable to initiate movement of the virtual object 711a in three-dimensional environment 702. In some embodiments, virtual objects 734a and 711a are independently movable in three-dimensional environment 702.

In some embodiments, in response to detecting the movement of the representation of the first content item 711 away from virtual object 734a in three-dimensional environment 702, computer system 101 displays virtual object 711a corresponding to the first content item at a size that is different from the size of the representation of the first content item 711 in virtual object 734a in three-dimensional environment 702. For example, referring back to FIG. 7D, the representation of the first content item 711 is displayed in virtual object 734a at the first size in three-dimensional environment 702. In FIG. 7F, the computer system 101 displays virtual object 711a at a third size, larger than the first size, and different from the second size of each of the representations of the second content item 713 and the third content item 715, in three-dimensional environment 702. Additionally or alternatively, in some embodiments, the content items are displayed at a respective size in three-dimensional environment 702 based on the type of content of the content items. For example, as mentioned above, virtual object 711a corresponding to the first content item is displayed at the third size in three-dimensional environment 702. In some embodiments, if a movement input were provided to the representation of the third content item 715, which is or includes a song file, to move the representation of the third content item 715 away from the virtual object 734a in three-dimensional environment 702, computer system 101 would display the third content item in a new object, which would optionally have a fourth size in three-dimensional environment 702. In some such embodiments, the fourth size would be different from the third size of the virtual object 711a.

FIGS. 8A-8L is a flowchart illustrating an exemplary method 800 of receiving content that is shared with a computer system in a three-dimensional environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., 314). For example, the computer system is or includes a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while a three-dimensional environment, such as three-dimensional environment 702 in FIG. 7A, is visible via the display generation component (e.g., an environment that corresponds to a physical environment surrounding the display generation component and/or the computer system or a virtual environment. In some embodiments, the three-dimensional environment is generated, displayed, or otherwise caused to be viewable by the computer system (e.g., a computer-generated reality (CGR) environment such as a virtual reality (VR) environment, a mixed reality (MR) environment, or an augmented reality (AR) environment, etc.). In some embodiments, the physical environment is visible through a transparent portion of the display generation component (e.g., true or real passthrough). In some embodiments, a representation of the physical environment is displayed in the three-dimensional environment via the display generation component (e.g., virtual or video passthrough)), the computer system receives (802a), via the one or more input devices, a first indication corresponding to a request to share content with the computer system. For example, a request to share one or more images (e.g., photographs), videos (e.g., video/movie/television clips), contacts (e.g., a person's name, phone number, email, etc.), music (e.g., songs, playlists, etc.), applications, files, etc. with the computer system. In some embodiments, the request is optionally received from a second electronic device separate from the computer system. In some embodiments, the request is optionally received in accordance with one or more criteria being satisfied (e.g., the second electronic device is in communication with the electronic device, and/or the second electronic device is less than a threshold distance from the computer system, and/or the second electronic device is authorized to share the content with the computer system, and/or the computer system is authorized to receive the content from the second electronic device, etc.

In some embodiments, in response to receiving the first indication and prior to completing an operation related to the content (e.g., prior to receiving at least a predefined portion or all of the content), the computer system displays (802b), via the display generation component, a user interface element (e.g., a notification) corresponding to the content, such as user interface elements 704a and/or 706a in FIG. 7A, at a first location in the three-dimensional environment (e.g., an icon, a message window, an alert pop-up, etc.

corresponding to the content is displayed at the first location in the three-dimensional environment. In some embodiments, the notification includes a preview of the content being shared with the electronic device (e.g., a portion of the image being shared, a video portion of the video being shared, a contact photograph corresponding to the contact being shared, etc.). In some embodiments, the preview is displayed in accordance with one or more criteria being satisfied (e.g., the second electronic device is a known device to the computer system, and/or the second electronic device is authorized to share content with the electronic device). In some embodiments, the notification optionally includes one or more selectable affordances for accepting/denying the request to share the content with the electronic device. For example, the notification includes an "accept" button which when selected accepts the content from the second electronic device (e.g., begins downloading, to the electronic device, content being shared by the second electronic device). In some embodiments, the notification is displayed until one or more criteria are satisfied (e.g., until the content is downloaded to the computer system, and/or until input is received selecting, tapping, and/or moving the notification).), wherein the first location is based on a first respective pose (e.g., location and/or orientation in the physical environment) of a respective portion of a user (e.g., user 726 in FIG. 7A) of the computer system. For example, based on a portion of a user's head (e.g., irrespective of a relative position of the user's gaze) with respect to a field of view of the three-dimensional environment from the viewpoint on the three-dimensional environment of the user of the electronic device. For example, the notification is optionally displayed along a normal to the viewpoint of the user, which is optionally defined by the pose of the user's head. In some embodiments, the first location in the three-dimensional environment is defined to be a predefined location (e.g., a center) of the user's field of view (e.g., the notification is displayed based on a center of the user's head, irrespective of the current location of the user's gaze).

In some embodiments, while displaying the user interface element corresponding to the content at the first location and prior to completing the operation related to the content (e.g., prior to receiving at least a predefined portion or all of the content), the computer system detects (802c) movement of the respective portion of the user from the first respective pose to a second respective pose, different from the first respective pose, such as movement of the hand 703a as shown in FIG. 7A. For example, or movement of the user's head to a new position/orientation, such that the user's viewpoint of the three-dimensional environment changes. In some embodiments, detection of the movement of the user's head does not necessarily correspond to detection of movement of the user's gaze in the three-dimensional environment. For example, the user's head moves to the new position/orientation while the user's gaze is maintained at the same location in the three-dimensional environment prior to detecting the movement. In some embodiments, the movement of the user's head is detected before the content is received.

In some embodiments, in response to detecting the movement of the respective portion of the user and prior to completing the operation related to the content (e.g., prior to receiving at least a predefined portion or all of the content), the computer system displays 802d, via the display generation component, the user interface element corresponding to the content at a second location, different from the first location, in the three-dimensional environment, such as display of user interface elements 704a and/or 706a as shown in FIG. 7B (e.g., the icon, the message window, the alert pop-up, etc. corresponding to the content is moved to and/or is displayed at the second location in the three-dimensional environment. In some embodiments, the notification is displayed at the second location in the three-dimensional environment in accordance with a determination that the user's gaze is not directed toward the notification. For example, the user's gaze is directed toward a respective location different from the second location. In some embodiments, the notification corresponding to the content is displayed at the second location before the content is received.), wherein the second location is based on the second respective pose of the respective portion of the user. For example, based on a portion of the user's head (e.g., irrespective of a relative position of the user's gaze) with respect to a field of view of the three-dimensional environment from the new viewpoint of the user. In some embodiments, the user interface element is displayed at the second location to maintain an orientation and/or location of the user interface element relative to the second respective pose of the respective portion of the user. In some embodiments, the orientation and/or location of the user interface element relative to the respective pose of the respective portion of the user at the first location and at the second location are the same. For example, the location and/or orientation of the notification in the three-dimensional environment changes in accordance with movement and/or rotation of the user's head (e.g., movement and/or rotation of the electronic device and/or display generation component), but the location and/or orientation of the notification are the same relative to the respective pose of the respective portion of the user (e.g., the notification is displayed in the center of the user's field of view of the three-dimensional environment in the first location and in the second location).

In some embodiments, after completing the operation relative to the content (802e) (e.g., after detecting an input directed to the notification to accept or download the shared content, as will be described in more detail below), the computer system receives (8020, via the one or more input devices, a first input corresponding to a request to move a first object corresponding to the content, such as movement of object 736a as shown in FIG. 7D (e.g., after detecting the input directed to the notification to accept or download the shared content, the content is downloaded, saved, or otherwise made available for viewing via the computer system. In some embodiments, the first object corresponding to the content is displayed at the location of the notification corresponding to the content (e.g., the notification corresponding to the content ceases to be displayed in the three-dimensional environment, and the first object, which corresponds to the content, is displayed in the three-dimensional environment)), to a third location in the three-dimensional environment. For example, a pinch gesture of an index finger and thumb of a hand of the user (e.g., the index finger and thumb coming together and touching, forming a pinch hand shape while remaining in contact with each other) followed by movement of the hand in the pinch hand shape while the gaze of the user is directed to the first object while the hand of the user is greater than a threshold distance (e.g., 0.2, 0.5, 1, 2, 3, 5, 10, 12, 24 or 26 cm from the first object, or a pinch gesture of the index finger and thumb of the hand of the user directed to the first object followed by movement of the hand in the pinch hand shape irrespective of the location of the gaze of the user when the hand of the user is less than the threshold distance from the first object. In some embodiments, the first input is or includes an air gesture. In some embodiments, the first object is optionally a representation of the content shared by the second electronic device and is optionally displayed by an application configured to support the content. For example, the first object is a photograph displayed in a window, a video displayed in a playback window of a video player application, contact information displayed in a contact card of a contacts application, etc. In some embodiments, the content optionally includes multiple (e.g., individual) pieces and/or types of content, which are each optionally displayed in one or more supporting application windows in the three-dimensional environment, as will be described in more detail below.

In some embodiments, in response to receiving the first input, the computer system displays (802g) the first object at the third location in the three-dimensional environment in accordance with the first input, such as display of object 736a as shown in FIG. 7E (e.g., the first object is moved to the third location in the three-dimensional environment in accordance with the movement of the pinch gesture of the hand of the user).

In some embodiments, while displaying the first object at the third location in the three-dimensional environment, the computer system detects (802h) second movement of the respective portion of the user, such as movement of hand 703a as shown in FIG. 7A, from a third respective pose (e.g., the pose of the respective portion of the user while the first input was received) to a fourth respective pose (e.g., movement of the user's head to a new position/orientation (e.g., the fourth respective pose), such that the user's viewpoint of the three-dimensional environment changes). In some embodiments, detection of the movement of the user's head does not necessarily correspond to detection of movement of the user's gaze in the three-dimensional environment. For example, the user's head moves to the new position/orientation while the user's gaze is maintained at the same location in the three-dimensional environment prior to detecting the second movement. In some embodiments, detection of the movement of the user's head coincides with movement of the user's gaze to a new location in the three-dimensional environment (e.g., to a location away from the first object at the third location in the three-dimensional environment).

In some embodiments, in response to detecting the second movement of the respective portion of the user, the computer system displays (802i) the first object at the third location to maintain the first object relative to the three-dimensional environment, such as display of objects 734a and/or 736a as shown in FIG. 7D. For example, the first object does not move to a new location (e.g., a fourth location) in the three-dimensional environment in response to movement of the user's head and/or movement of the user's gaze. After the content has been accepted and/or received by the computer system, the location of the first object in the three-dimensional environment is optionally no longer dependent on the location of the user's head. For example, movement of the first object requires separate input (e.g., a pinch gesture of the user's hand directed toward the first object) corresponding to a request to move the first object for the first object to be moved to a new location in the three-dimensional environment. Displaying a notification of shared content at a location in the three-dimensional environment that is determined based on a location of a respective portion of the user facilitates user input for interacting with the notification and/or facilitates discovery that the content is being shared with the computer system, thereby improving user-device interaction.

In some embodiments, the operation related to the content includes downloading the content to the computer system (804a) (e.g., saving and/or storing the content to a memory or storage of the computer system. In some embodiments, as described below, the content is available for use without downloading the content to the computer system.). In some embodiments, while downloading the content to the computer system and while the user interface element corresponding to the content is displayed at the second location in the three-dimensional environment, the computer system detects (804b), via the one or more input devices, respective movement of the respective portion of the user, such as movement of hand 703a in FIG. 7A, from the second respective pose to a fifth respective pose (e.g., movement of the user's head to a new position/orientation, such that the user's viewpoint of the three-dimensional environment changes, as discussed above).

In some embodiments, in response to detecting the respective movement of the respective portion of the user, the computer system displays (804c) the user interface element (e.g., the notification) corresponding to the content at the second location to maintain the user interface element relative to the three-dimensional environment, such as display of objects 704a and/or 706a in FIG. 7C. For example, the user interface element becomes world locked in response to an input to download the content and while the content is downloading. In some embodiments, the computer system actively maintains the user interface element as world locked in response to detecting the movement of the user's head. In some embodiments, display of the notification is no longer based on a portion of the user's head (e.g., irrespective of a relative position of the user's gaze) with respect to a field of view of the three-dimensional environment from the new viewpoint of the user (e.g., the notification is no longer viewpoint locked). For example, display of the notification in the three-dimensional environment is based on (e.g., tied to or anchored to) the second location in the three-dimensional environment (e.g., the physical environment or the virtual environment visible via the display generation component). Displaying a notification of shared content at a location in the three-dimensional environment that is determined based on a location in the three-dimensional environment allows the user's viewpoint to become unobstructed by the notification of the shared content, thereby improving user-device interaction.

In some embodiments, while downloading the content to the computer system, the user interface element is displayed with a first respective user interface element associated with the user interface element corresponding to the content, such as display of grabber or handlebar 738 associated with user interface elements 704a and/or 706a as shown in FIG. 7C, wherein the first respective user interface element is for moving the user interface element relative to the three-dimensional environment (806). For example, the first respective user interface element is a grabber or handlebar configured to be selectable for moving the user interface element (e.g., the notification) to a respective location in the three-dimensional environment. In some embodiments, the grabber or handlebar is displayed below the notification. In some embodiments, the grabber or handlebar is displayed atop/above, or to a side of, the notification. In some embodiments, a pinch gesture of an index finger and thumb of a hand of the user directed to/toward the grabber or handlebar, subsequently followed by movement of the hand in the pinched hand shape toward a respective location in the three-dimensional environment, optionally moves the notification toward the respective location in the three-dimensional environment. Displaying a grabber for a notification of shared content facilitates user input for moving the notification within the three-dimensional environment, and/or facilitates discovery that the notification can be moved within the three-dimensional environment, thereby improving user-device interaction.

In some embodiments, the three-dimensional environment includes a second object, such as object 708*a* in FIG. 7A, at a respective location in the three-dimensional environment when the first indication corresponding to the request to share the content with the computer system is received (808*a*) (e.g., the second object is optionally a user interface of an application running on the computer system. In some embodiments, the user was interacting with (e.g., viewing or providing input to/toward) the second object when the request to share one or more images (e.g., photographs), videos (e.g., video/movie/television clips), contacts (e.g., a person's name, phone number, email, etc.), music (e.g., songs, playlists, etc.), applications, files, etc. with the computer system was received.). In some embodiments, in response to receiving the first indication and prior to completing the operation related to the content, the computer system maintains (808*b*) display of the second object at the respective location in the three-dimensional environment, such as display of object 708*a* as shown in FIG. 7B. For example, the request to share content with the computer system does not cause the second object to cease being displayed in the three-dimensional environment. In some embodiments, the user interface element corresponding to the content (e.g., the notification) is displayed in the three-dimensional environment without causing the second object to cease display in the three-dimensional environment. For example, the notification corresponding to the content and the second object are concurrently displayed in the three-dimensional environment (e.g., in a multi-tasking mode). Maintaining display of an object when a content sharing request is received allows for interactions involving the object to be performed while receiving the content corresponding to the share request, thereby improving user-device interaction.

In some embodiments, while displaying the second object at the respective location in the three-dimensional environment, the computer system receives (810*a*), via the one or more input devices, a second indication corresponding to a notification event other than a request to share content with the computer system (e.g., a notification corresponding to receipt of a message in a messenger application, an email in an email application, an incoming call in a phone application, and the like. In some embodiments, the second indication is not a request to share content with the electronic device.).

In some embodiments, in response to receiving the second indication, the computer system ceases (810*b*) display of the second object in the three-dimensional environment. For example, receipt of the notification event causes the second object (e.g., the user interface of the application displayed in the three-dimensional environment) to cease being displayed at the respective location in the three-dimensional environment. In some embodiments, the user interface element corresponding to the content (e.g., the notification corresponding to the shared content) does not cease to be displayed in the three-dimensional environment in response to receiving the second indication. In some embodiments, a notification corresponding to the second indication is displayed in the three-dimensional environment in response to receiving the second indication. For example, an object corresponding to a message notification, an email notification, an incoming phone call notification, etc. Maintaining display of the notification of shared content when a secondary notification event is received and ceasing display of other objects when the secondary notification event is received facilitates user input for interacting with the notification of shared content, thereby improving user-device interaction.

In some embodiments, after completing the operation related to the content (812*a*) (e.g., after detecting an input directed to the notification to accept or download the shared content, as discussed below), in accordance with a determination that the content is first content having a first characteristic (e.g., the content is a hyperlink), such as content item 711 in FIG. 7B, the first object corresponding to the content is of a first type (812*b*). For example, content associated with and/or opened in a first application. In some embodiments, the first object is a window of a web browsing application displaying content (e.g., text, images, or video) corresponding to the link. In some embodiments, the first object is displayed in the three-dimensional environment automatically in response to the downloading of the first content having the first characteristic being completed.

In some embodiments, in accordance with a determination that the content is second content having a second characteristic, different from the first characteristic (e.g., the content is a contact), such as content item 713 in FIG. 7B, the first object corresponding to the content is of a second type, different from the first type (812*c*). For example, content associated with and/or opened in a second application that is different from the first application. In some embodiments, the first object is a contact card in a contacts application displaying contact information (e.g., phone number, email address, mailing address, birthday, etc.) corresponding to the contact. In some embodiments, the first object is a photograph or a video clip, and the first object is a quick look window displaying the photograph or the video clip. In some embodiments, the first object is based on (e.g., selected using) the type of content shared with the computer system. Displaying shared content in an object configured to display the shared content enables the shared content to be displayed and thus interacted with without displaying additional controls, thereby improving user-device interaction.

In some embodiments, displaying the user interface element includes (814*a*), in accordance with a determination that a first set of criteria is satisfied, including a criterion that is satisfied when the content is shared by a user that is recognized by the computer system (e.g., the first set of criteria is satisfied when the content is shared by a user who is trusted or known by the computer system. For example, the user is a contact of the user of the computer system. In some embodiments, the first set of criteria is not satisfied when the content is shared by an unrecognized user.), displaying a preview of the content, such as preview 710 shown in FIG. 7B, in the user interface element corresponding to the content (814*b*). For example, the user interface element (e.g., the notification) includes a portion or portions of the content shared by the recognized user. In some embodiments, the notification includes a still image corresponding to the content shared by the recognized user. For example, when the content shared by the recognized user is a photograph, the notification includes a portion or portions of the photograph. When the content shared by the recognized user is a video, the notification optionally includes a portion or portions of a frame within the video. When the content shared by the recognized user is a contact, the notification optionally includes a contact photograph, a name of the contact, and/or a portion or portions of the contact phone number, email address, home address, etc. When the content shared by the recognized user is a song, the notification optionally includes a portion or portions of the song cover art, a name of the song, an artist of the song, an album name of which the song is a part, etc.

In some embodiments, displaying the user interface element includes, in accordance with a determination that the first set of criteria is not satisfied (e.g., because the content was shared by an unrecognized user), forgoing displaying the preview of the content in the user interface element corresponding to the content (814*c*), such as forgoing display of a preview in user interface element 706*a* as shown in FIG. 7B. For example, the user interface element does not include a portion or portions of the content shared by the unrecognized user. In some embodiments, irrespective of whether the sender sharing the content is recognized by the computer system, the user interface element includes an identifier of the sender. For example, the user interface element includes a name of the sender, a phone number of the sender, an email address of the sender, and/or a contact photograph of the sender. Displaying a preview of shared content in a notification of the shared content facilitates decision of whether to accept or deny the request to share the content, thereby improving user-device interaction.

In some embodiments, the operation related to the content includes downloading the content to the computer system (816*a*) (e.g., saving and/or storing the content to a memory or storage of the computer system. In some embodiments, as described below, the content is available for use without downloading the content to the computer system.). In some embodiments, while displaying the user interface element corresponding to the content, the computer system receives (816*b*), via the one or more input devices, a second input corresponding to a request to download the content to the computer system, such as selection of accept option 717 as shown in FIG. 7B (e.g., an air gesture, such as a tap or selection gesture (e.g., provided by an index finger of a hand of a user) or a pinch gesture (e.g., provided by an index finger and thumb of a hand of the user), directed to the user interface element). In some embodiments, the user interface element includes one or more selectable options for accepting and/or denying the request to share the content with the computer system. The second input optionally corresponds to a selection of the one or more selectable options for accepting the request to share the content with the computer system.

In some embodiments, in response to receiving the second input and while downloading the content to the computer system, the computer system displays (816*c*), in the user interface element, one or more visual indicators of a download progress for the content, such as download progress bars 728*a*-728*d* shown in FIG. 7C. For example, the user interface element (e.g., the notification) includes a download progress bar or other status indicator (e.g., a percentage, a circular indicator, etc.) indicating a progress of downloading the content to the computer system. In some embodiments, the one or more visual indicators of the download progress are displayed with a preview of the content being downloaded. For example, the one or more visual indicators are displayed below, above, to a side of, or partially within the preview of the content being downloaded. In some embodiments, the one or more visual indicators of the download progress cease displaying in the user interface element once download of the content is complete. Displaying an indicator of download progress for shared content in a notification of the shared content facilitates discovery that the content is being downloaded to the computer system and/or provides feedback about a state of the computer system, thereby improving user-device interaction.

In some embodiments, while downloading the content to the computer system (818*a*) (e.g., while saving and/or storing the content to a memory of the computer system, as described above), in accordance with a determination that an attention (e.g., a gaze) of the user of the computer system, such as gaze point 723 in FIG. 7C, is directed to the user interface element corresponding to the content (e.g., the gaze of the user is directed to a portion of the user interface element (e.g., the notification) corresponding to the content. In some embodiments, the gaze is directed to the one or more indicators of the download progress for the content (e.g., the download progress bar) displayed in the notification.), the computer system displays (818*b*), via the display generation component, a selectable option for pausing the download of the content, such as pause option 727 in FIG. 7C (e.g., a pause button, slider, or other element that is selectable to pause the download of the content). In some embodiments, the pause option is displayed in the user interface element. In some embodiments, the pause option is displayed adjacent to, above, below, or within a portion of the one or more indicators of the download progress for the content. In some embodiments, the selectable option ceases to be displayed when the gaze of the user is no longer directed to the user interface element corresponding to the content.

In some embodiments, while displaying the selectable option, the computer system detects (818*c*), via the one or more input devices, a third input corresponding to a selection of the selectable option, such as a selection of pause option 727 in FIG. 7C (e.g., an air gesture or pinch gesture, as described above, directed to the selectable option).

In some embodiments, in response to detecting the third input, the computer system pauses (818*d*) the download of the content in accordance with the third input. For example, the content (e.g., temporarily) ceases to download when the pause button is selected. In some embodiments, an appearance of the selectable option changes in response to the selection of the selectable option. For example, the pause button changes shape, size, color, opacity, thickness, etc. In some embodiments, the selectable option changes appearance from a first icon type to a second icon type. For example, the selectable option changes from a pause icon to a play icon. In some embodiments, an appearance of the one or more indicators of the download progress for the content changes in response to the selection of the selectable option. For example, a progress indicator within the download progress bar ceases to move within (e.g., fill a length of) the download progress bar. In some embodiments, a subsequent selection of the selectable option causes the download of the content to resume. Providing a selectable option for pausing download of the shared content upon detection of gaze directed to the notification of the shared content reduces the number of inputs needed to pause the downloading of the shared content, thereby improving user-device interaction.

In some embodiments, the content includes a first content item and a second content item (820*a*), such as content items 711 and 713 in FIG. 7B (e.g., the content shared with the computer system includes multiple files, such as photos, videos, hyperlinks, music files, and the like. In some embodiments, the first content item and the second content item are of the same type. For example, the first content item and the second content item are both photographs. In some embodiments, the first content item is of a different type than the second content item. For example, the first content item is a video and the second content item is a contact.). In some embodiments, the one or more visual indicators of the download progress (e.g., the download progress bar) for the content include (820*b*) a first visual indicator of a download progress for the first content item (820*c*) (e.g., a first download progress bar or other element indicating a download progress of the first content item), such as download progress bar 728*a* in FIG. 7C, and a second visual indicator of a download progress for the second content item (820*d*), such as download progress bar 728*b* in FIG. 7C. For example, a second download progress bar or other element indicating a download progress of the second content item. In some embodiments, the first visual indicator and the second visual indicator are displayed in the user interface element corresponding to the content (e.g., the notification). In some embodiments, the first visual indicator is displayed above, below, to a side of, or within a portion of the first content item in the user interface element, and the second visual indicator is displayed above, below, to a side of, or within a portion of the second content item in the user interface element. Displaying indicators of download progress for multiple shared content items in a notification of the shared content items facilitates discovery that the content items are being individually downloaded to the computer system and/or provides feedback about a state of the computer system, thereby improving user-device interaction.

In some embodiments, the content includes a first content item and a second content item (822*a*) (e.g., the content shared with the computer system includes multiple files, such as photos, videos, hyperlinks, music files, and the like. In some embodiments, the first content item and the second content item are of the same type, as discussed above. In some embodiments, the first content item is of a different type than the second content item, as discussed above.), such as content items 711 and 713 in FIG. 7B.

In some embodiments, the first object corresponding to the content includes a representation of the first content item, and a representation of the second content item displayed in a predetermined arrangement within the first object (822*b*), such as display of the first content item 711 and the second content item 713 in a predetermined arrangement within preview 710 as shown in FIG. 7B. For example, the first object includes all or a portion of each of the first content item and the second item. In some embodiment, the representation of the first content item and the representation of the second content item are displayed at a same size in the first object. For example, the representation of the first content item and the representation of the second content item are displayed side by side (e.g., adjacently in a portrait orientation) in the first object, or the representation of the first content item and the representation of the second content item are displayed one on top of the other (e.g., in a landscape orientation) in the first object. In some embodiments, the representation of the first content item and the representation of the second content item are displayed at different sizes in the first object. In some embodiments, a content type of the first content and the second content determines the sizes of the representation of the first content item and the representation of the second content item in the first object. In some embodiments, the predetermined arrangement is based on a number of items being shared concurrently. For example, when two content items are shared with the computer system, the representation of the first content item and the representation of the second content item are displayed in the predetermined arrangement described above. When three content items are shared with the computer system, the representation of the first content item and the representation of the second content item are optionally displayed at a first size, and the representation of the third content item is optionally displayed at a second size, different from the first size, in the predetermined arrangement within the first object. In some embodiments, the representations of the first, second, and third content items are displayed at different sizes in the predetermined arrangement within the first object. Displaying representations of multiple content items in an object in the three-dimensional environment enables viewing of at least portions of the multiple content items to be performed without displaying additional controls, thereby improving user-device interaction.

In some embodiments, while displaying the first object that includes the representation of the first content item, and the representation of the second content item, the computer system detects (824*a*), via the one or more input devices, a second input corresponding to movement of the representation of the first content item away from the first object to a respective location in the three-dimensional environment (e.g., a pinch gesture of an index finger and thumb of a hand of the user (e.g., the index finger and thumb coming together and touching, forming a pinch hand shape while remaining in contact with each other) followed by movement of the hand in the pinch hand shape away from the first object while the gaze of the user is directed to the representation of the first content item while the hand of the user is greater than a threshold distance (e.g., 0.2, 0.5, 1, 2, 3, 5, 10, 12, 24 or 26 cm) from the representation of the first content item, or a pinch gesture of the index finger and thumb of the hand of the user directed to the representation of the first content item followed by movement of the hand in the pinch hand shape away from the first object irrespective of the location of the gaze of the user when the hand of the user is less than the threshold distance from the representation of the first content item. In some embodiments, the respective location in the three-dimensional environment is a location different from a location of the first object.), such as movement of the content item 711 away from the object 734*a* as shown in FIG. 7E.

In some embodiments, in response to detecting the second input (824*b*), the computer system displays (824*c*), via the display generation component, a second object corresponding to the first content item at the respective location in the three-dimensional environment (e.g., the representation of the first content item is displayed as a new object at the respective location in the three-dimensional environment, where the new object displays the representation of the first content item. In some embodiments, a size of the second object corresponding to the representation of the first content item is larger than the size of the representation of the first content item in the first object in the three-dimensional environment.), such as display of object 711*a* corresponding to content item 711 as shown in FIG. 7F. In some embodiments, the computer system ceases (824*d*) display of the representation of the first content item in the first object (e.g., after generating the second object corresponding to the first content item and displaying the second object corresponding to the first content item at the respective location, the representation of the first content item ceases to be displayed in the first object. In some embodiments, as a result of the representation of the first content item in the first object ceasing to be displayed in the first object, the representation of the second content item in the first object is displayed at a larger size in the first object. For example, the representation of the second content item expands in the first object to correspond to (e.g., or closely correspond to) a size of the first object in the three-dimensional environment. In some embodiments, as a result of the representation of the first content item in the first object ceasing to be displayed in the first object, the predetermined arrangement of the content items within the first object changes to a different predetermined arrangement within the first object. For example, when the content includes a third content item, the predetermined arrangement within the first object changes to display the representation of the second content item and the representation of the third content item each at a larger size in the first object.), such as cease of display of the content item 711 in object 734a as shown in FIG. 7F. Dragging a representation of a content item out from a first object in the three-dimensional environment causes the computer system to automatically perform object generation for the representation of the content item, thereby improving user-device interaction.

In some embodiments, while displaying the first object that includes the representation of the first content item and the representation of the second content item in the predetermined arrangement, the computer system detects (826a), via the one or more input devices, a second input corresponding to a selection of the representation of the first content item in the first object (e.g., an air gesture or pinch gesture, as described above, directed to the representation of the first content item), such as selection of content item 711 as shown in FIG. 7D.

In some embodiments, in response to detecting the second input, the computer system visually emphasizes (826b) the representation of the first content item (e.g., displaying the representation of the first content item at a larger size in the first object. In some embodiments, visually emphasizing the representation of the first content item includes expanding the representation of the first content item in the first object to a size that corresponds to that of the first object. In some embodiments, additional details corresponding to the first content item (e.g., additional portions of a photograph, additional information of a contact, etc.) are revealed in response to visually emphasizing the representation of the first content item.), such as expanded display of content item 711 as shown in FIG. 7E, and visually deemphasizes the representation of the second content item in the first object, such as cease of display of the second content item as shown in FIG. 7E. For example, ceasing display of the representation of the second content item in the first object. In some embodiments, the representation of the second content item is displayed at a smaller size than the representation of the first content item. In some embodiments, respective details corresponding to the second content item (e.g., portions of a photograph, information of a contact, etc.) are hidden and/or cease to be displayed in response to visually deemphasizing the representation of the second content item in the second object. Additionally or alternatively, in some embodiments, a selection of the representation of the second content item causes the computer system to visually emphasize the representation of the second content item and to visually deemphasize the representation of the first content item in the first object. Emphasizing a representation of a content item displayed in an object in the three-dimensional environment reduces the number of inputs needed to display additional details corresponding to the content item in the three-dimensional environment, thereby improving user-device interaction.

In some embodiments, in response to detecting the second input (828a), the computer system displays (828b), via the display generation component, a first option that is selectable to initiate a process for editing the representation of the first content item, such as markup option 731 in FIG. 7E. For example, while the representation of the first content item is visually emphasized in the first object in the three-dimensional environment, a markup option is displayed in the three-dimensional environment. In some examples, the markup option is displayed within a menu, list, toolbar, etc. including a plurality of options corresponding to the representation of the first content item. In some embodiments, the first option is displayed at, near, or within a portion of the first object. In some embodiments, selection of the first option causes display of additional options and/or tools for editing the representation of the first content item (e.g., tools for performing editing operations such as cropping, cutting, erasing, copying, and/or filtering, the representation of the first content item). In some embodiments, selection of the first option initiates a process to markup the (e.g., representation of the) first content item, and not the (e.g., representation of the) second content item, irrespective of whether the representation of the first content item and the representation of the second content item are both displayed. Likewise, in some embodiments, in response to detecting an input selecting the representation of the second content item, the first option is selectable to initiate a process to markup the (e.g., representation of the) second content item, and not the (e.g., representation of the) first content item. Displaying a markup option when the representation of a content item displayed in an object is selected reduces the number of inputs needed to edit the representation of the content item, thereby improving user-device interaction.

In some embodiments, in response to detecting the second input (830a), the computer system displays (830b), via the display generation component, a first option that is selectable to initiate a process for sharing the first content item with a second computer system, such as share option 733 in FIG. 7E. For example, while the representation of the first content item is visually emphasized in the first object in the three-dimensional environment, a share option is displayed in the three-dimensional environment. In some examples, the share option is displayed within a menu, list, toolbar, etc. including a plurality of options corresponding to the representation of the first content item. In some embodiments, the first option is displayed at, near, or within a portion of the first object. In some embodiments, selection of the first option causes display of additional options and/or tools for sharing the first content item (e.g., tools for performing editing operations such as messaging, emailing, and/or transferring a copy of the first content item to a second computer system). In some embodiments, selection of the first option initiates a process to share the (e.g., representation of the) first content item, and not the (e.g., representation of the) second content item, with the second computer system, irrespective of whether the representation of the first content item and the representation of the second content item are both displayed. Likewise, in some embodiments, in response to detecting an input selecting the representation of the second content item, the first option is selectable to initiate a process to share the (e.g., representation of the) second content item, and not the (e.g., representation of the) first content item, with the second computer system. Displaying a share option when the representation of a content item displayed in an object is selected reduces the number of inputs needed to share the representation of the content item with a second computer system, thereby improving user-device interaction.

In some embodiments, while displaying the user interface element corresponding to the content at the first location and prior to completing the operation related to the content, the computer system receives (832a), via the one or more input devices, a respective input (e.g., an air gesture or pinch gesture, as described above, directed to the user interface element (e.g., the notification) corresponding to the content. In some embodiments, the respective input corresponds to a request to perform a respective operation associated with the content.).

In some embodiments, in response to receiving the respective input (832b), in accordance with a determination that the respective input corresponds to a request to perform an operation associated with the content, the computer system initiates (832c) a process to perform the operation associated with the content without retaining the content in persistent storage of the computer system. For example, displaying the content shared with the computer system, such as viewing a full or expanded view of a photograph, viewing all or a portion of a video clip, viewing all or a portion of the details of a contact, or navigating to a web page associated with a hyperlink, without saving the content to the computer system (e.g., without storing the content in a memory/storage of the computer system). In some embodiments, the shared content can be used while downloading the content to the computer system. Enabling shared content to be used by a computer system without downloading the shared content to the computer system reduces the number of inputs needed to interact with the shared content, thereby improving user-device interaction.

In some embodiments, the content includes a first content item and a second content item (834a) (e.g., the content shared with the computer system includes multiple files, such as photos, videos, hyperlinks, music files, and the like. In some embodiments, the first content item and the second content item are of the same type, as discussed above. In some embodiments, the first content item is of a different type than the second content item, as discussed above.), such as content items 711 and 713 in FIG. 7B. In some embodiments, the first object includes a representation of the first content item having a first size in the three-dimensional environment, such as display of content item 711 at a first size as shown in FIG. 7B, and a representation of the second content item having a second size in the three-dimensional environment (834b), such as display of content item 713 at a second size, smaller than the first size, as shown in FIG. 7B (e.g., the first object includes all or a portion of each of the first content item and the second item). In some embodiments, the representation of the first content item and the representation of the second content item are displayed at a same size in the first object. In some embodiments, the representation of the first content item and the representation of the second content item are displayed at different sizes in the first object.

In some embodiments, while displaying the first object at the third location relative to the three-dimensional environment, the computer system receives (834c), via the one or more input devices, a second input corresponding to movement of the representation of the first content item away from the first object to a respective location in the three-dimensional environment, such as movement of content item 711 as shown in FIG. 7E (e.g., a pinch gesture of an index finger and thumb of a hand of the user followed by movement of the hand in the pinch hand shape, as discussed above). In some embodiments, the respective location in the three-dimensional environment is a location different from a location of the first object.

In some embodiments, in response to receiving the second input, the computer system displays (834d), via the display generation component, a second object corresponding to the first content item having a third size at the respective location in the three-dimensional environment, wherein the third size is different from the first size, such as display of object 711a corresponding to the content item 711 at a larger size as shown in FIG. 7F. For example, the representation of the first content item is displayed as a new object (e.g., the second object) at the respective location in the three-dimensional environment. In some embodiments, a size of the second object corresponding to the representation of the first content item is larger than the size of the representation of the first content item in the first object in the three-dimensional environment. In some embodiments, a size of the second object corresponding to the first content item is determined based on a content type of the first content item. In some embodiments, the size of the second object is determined based on the size of the first content item. Additionally or alternatively, in some embodiments, in response to receiving an input removing the representation of the second content item from the first object, the representation of the second content item is displayed in a third object in the three-dimensional environment. In some embodiments, the third object has a different size than the second object. In some embodiments, the size of the third object is determined based on the size of the second content item. Changing a size of a content item when the content item is dragged out from an object in the three-dimensional environment reduces the number of inputs needed to enlarge the size of the content item in the three-dimensional environment, thereby improving user-device interaction.

In some embodiments, the computer system is in communication with a second computer system, such as computer system 730a in FIG. 7D (e.g., the second computer system is or includes a mobile device (e.g., a tablet, a smartphone, a media player, or a wearable device), or a computer), and the second computer system is located at a respective location in a physical environment of the computer system (836a) (e.g., a physical environment surrounding the display generation component and/or the computer system). In some embodiments, the physical environment is visible through a transparent portion of the display generation component (e.g., true or real passthrough). In some embodiments, a representation of the physical environment is displayed in the three-dimensional environment via the display generation component (e.g., virtual or video passthrough).

In some embodiments, while displaying the first object at the third location relative to the three-dimensional environment, the computer system receives (836b), via the one or more input devices, a second input corresponding to a request to move the first object to a respective location in the three-dimensional environment that corresponds to the respective location of the second computer system in the physical environment, such as movement of object 736a to a representation of the second computer system 730a as shown in FIG. 7D (e.g., a pinch gesture of an index finger and thumb of a hand of the user followed by movement of the hand in the pinch hand shape, as discussed above). In some embodiments, the respective location in the three-dimensional environment corresponds to a location at which the second computer system is located in the physical environment. In some embodiments, the second computer system (e.g., or a representation of the second computer system) is visible in the three-dimensional environment at the respective location in the three-dimensional environment.

In some embodiments, in response to receiving the second input (838a), the computer system moves (838b) the first object to the respective location in the three-dimensional environment in accordance with the second input, such as display of object 736a as shown in FIG. 7E (e.g., the first object is displayed as moving towards and/or at the respective location in the three-dimensional environment in accordance with the second input, which corresponds to the location of the second computer system in the physical environment). In some embodiments, the computer system initiates (838c) a process for sharing the content corresponding to the first object with the second computer system at the respective location in the physical environment. For example, a copy of the content corresponding to the first object, or metadata corresponding to the content is shared with/transferred to the second computer system. In some embodiments, the second computer system receives an indication of a request to share the content corresponding to the first object with the second computer system. In some embodiments, the content corresponding to the first object is downloaded to the second computer system in response to an acceptance of the request to share the content corresponding to the first object with the second computer system. In some embodiments, the first object is displayed on a display in communication with the second computer system in response to the sharing. For example, the first object is no longer displayed in the three-dimensional environment. In some embodiments, the first object is displayed both on the display in communication with the second computer system and in the respective location in the three-dimensional environment. In some embodiments, an appearance of the first object at the respective location in the three-dimensional environment changes to indicate that the content corresponding to the first object has been shared with the second computer system. Dragging an object corresponding to content in the three-dimensional environment to a second computer system that is visible in the three-dimensional environment causes the computer system to perform content sharing with the second computer system, thereby improving user-device interaction.

In some embodiments, the computer system is in communication with a second computer system, such as computer system 730a in FIG. 7D (e.g., the second computer system is or includes a mobile device (e.g., a tablet, a smartphone, a media player, or a wearable device), or a computer), the second computer system is located at a respective location in a portion of a physical environment of the computer system that is visible via the display generation component (840a) (e.g., a physical environment surrounding the display generation component and/or the computer system, as described above). In some embodiments, the three-dimensional environment includes a representation of a first content item stored at the second computer system, such as content item 732a in FIG. 7D, (e.g., and is not stored at the computer system) at a respective location in the three-dimensional environment that corresponds to the respective location in the physical environment (840b) (e.g., the representation of the first content item is displayed via a display in communication with the second computer system). In some embodiments, the representation of the first content item is displayed at the respective location, such that the representation of the first content item is displayed relative to the second computer system. For example, the first content item is displayed around a perimeter of the second computer system.

In some embodiments, while the displaying the representation of the first content item stored at the second computer system at the respective location in the three-dimensional environment, the computer system receives (840c), via the one or more input devices, a second input corresponding to a request to move the representation of the first content item stored at the second computer system away from the respective location to a fourth location in the three-dimensional environment, such as movement of the representation of the content item 732a as shown in FIG. 7D (e.g., a pinch gesture of an index finger and thumb of a hand of the user followed by movement of the hand in the pinch hand shape, as described above).

In some embodiments, in response to receiving the second input (840d), the computer system moves (840e) the representation of the first content item stored at the second computer system to the fourth location in the three-dimensional environment in accordance with the second input, such as display of object 732a as shown in FIG. 7E (e.g., the representation of the first content item is displayed as moving towards and/or at the fourth location in the three-dimensional environment in accordance with the second input). In some embodiments, the computer system initiates (840f) a process for receiving the first content item from the second computer system. For example, a copy of the first content item corresponding to the representation of the first content item, or metadata corresponding to the first content item is shared with/transferred from the second computer system to the computer system. In some embodiments, the computer system receives an indication of a request to share the first content item with the computer system. In some embodiments, the first content item is downloaded to the computer system in response to an acceptance of the request to share the first content item with the computer system. In some embodiments, the representation of the first content item is displayed both on the display in communication with the second computer system, and/or at the respective location in the three-dimensional environment, and in the fourth location in the three-dimensional environment. In some embodiments, the representation of the first content item ceases to be displayed at the respective location in the three-dimensional environment. In some embodiments, an appearance of the representation of the first content item at the respective location in the three-dimensional environment changes to indicate that the first content item has been shared with the computer system. Dragging an object corresponding to content stored at a second computer system to a respective location in the three-dimensional environment visible via the computer system causes the second computer system to perform content sharing with the computer system, thereby improving user-device interaction.

In some embodiments, the first location in the three-dimensional environment corresponds to a predetermined portion (e.g., center) of a field of view of a viewpoint of the user (842a) (e.g., the first location in the three-dimensional environment is defined to be a predefined location (e.g., a center, upper left, or upper right) of the user's field of view of the three-dimensional environment from the user's current viewpoint into the three-dimensional environment.). In some embodiments, in response to receiving the first indication and prior to completing the operation related to the content, the user interface element corresponding to the content is displayed at the first location with a first level of visual prominence (842b), such as display of user interface elements 704a and/or 706a as shown in FIG. 7A. For example, the notification is optionally displayed along a normal to the viewpoint of the user, which is optionally defined by the pose of the user's head. In some embodiments, the notification is displayed based on a center of the user's head, irrespective of the current location of the user's gaze. In some embodiments, the user interface element corresponding to the content is displayed at a first size, a first clarity/sharpness, a first orientation, etc. at the first location. Displaying the notification of shared content at a center of a field of view of a viewpoint of the user facilitates discovery that content is being shared with the computer system and/or facilitates input for interacting with the shared content, thereby improving user-device interaction.

In some embodiments, while displaying the user interface element corresponding to the content at the first location in the three-dimensional environment with the first level of visual prominence, the computer system detects (844a), via the one or more input devices, an attention of the user directed to the user interface element, such as gaze points 721 and/or 723 in FIG. 7A (e.g., the gaze of the user is directed to a portion of the user interface element (e.g., the notification) corresponding to the content).

In some embodiments, in response to detecting the attention of the user directed to the user interface element, the computer system displays (844b) the user interface element at the first location in the three-dimensional environment with a second level of visual prominence, greater than the first level of visual prominence, such as display of user interface elements 704a and/or 706a as shown in FIG. 7B. For example, the notification is optionally displayed at the first location at a second size, a second clarity/sharpness, a second orientation, etc., greater than before the attention of the user was directed to the user interface element. In some embodiments, the user interface element corresponding to the content is again displayed with the first level of visual prominence in accordance with a determination that the attention of the user is no longer directed to the user interface element. In some embodiments, detection of the attention of the user corresponds to detection of the gaze of the user. In some embodiments, detection of the attention of the user corresponds to detection of the gaze directed to the user interface element for a threshold period of time (e.g., 0.5, 1, 1.5, 2, 3, 3.5, 4, or 5 seconds). In some embodiments, detection of the attention of the user corresponds to detection of the gaze of the user and a ready state of at least one hand of the user. Displaying the notification of shared content at a center of a field of view of a viewpoint of the user with an enhanced prominence in response to detecting gaze directed to the notification reduces the number of inputs needed to interact with the notification, thereby improving user-device interaction.

In some embodiments, in response to detecting the attention of the user directed to the user interface element, the computer system displays (846), via the display generation component, one or more options that are selectable to accept or deny the request to share the content with the computer system, such as accept option 717 and decline option 719 in FIG. 7B. For example, while the user interface element is displayed with the second level of visual prominence, the computer system also displays one or more options for accepting or denying the share request. In some embodiments, the one or more options are displayed above, below, to a side of, or within a portion of the user interface element. In some embodiments, a selection of a first option of the one or more options to accept the share request causes the content to download to the computer system. In some embodiments, a selection of a second option of the one or more options to deny the share request causes the user interface element corresponding to the content to cease displaying in the three-dimensional environment. In some embodiments, the one or more options are displayed before the attention was directed to the user interface element. For example, the user interface element is generated and displayed at the first location in the three-dimensional environment with the one or more options prior to the computer system detecting the attention. Displaying one or more options for accepting or denying a request to share content with a computer system reduces the number of inputs needed to accept or deny the request to share the content with the computer system, thereby improving user-device interaction.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9E illustrate examples of a computer system facilitating interaction with virtual controls associated with physical devices that are displayed in a three-dimensional environment in accordance with some embodiments.

Figure 9A:
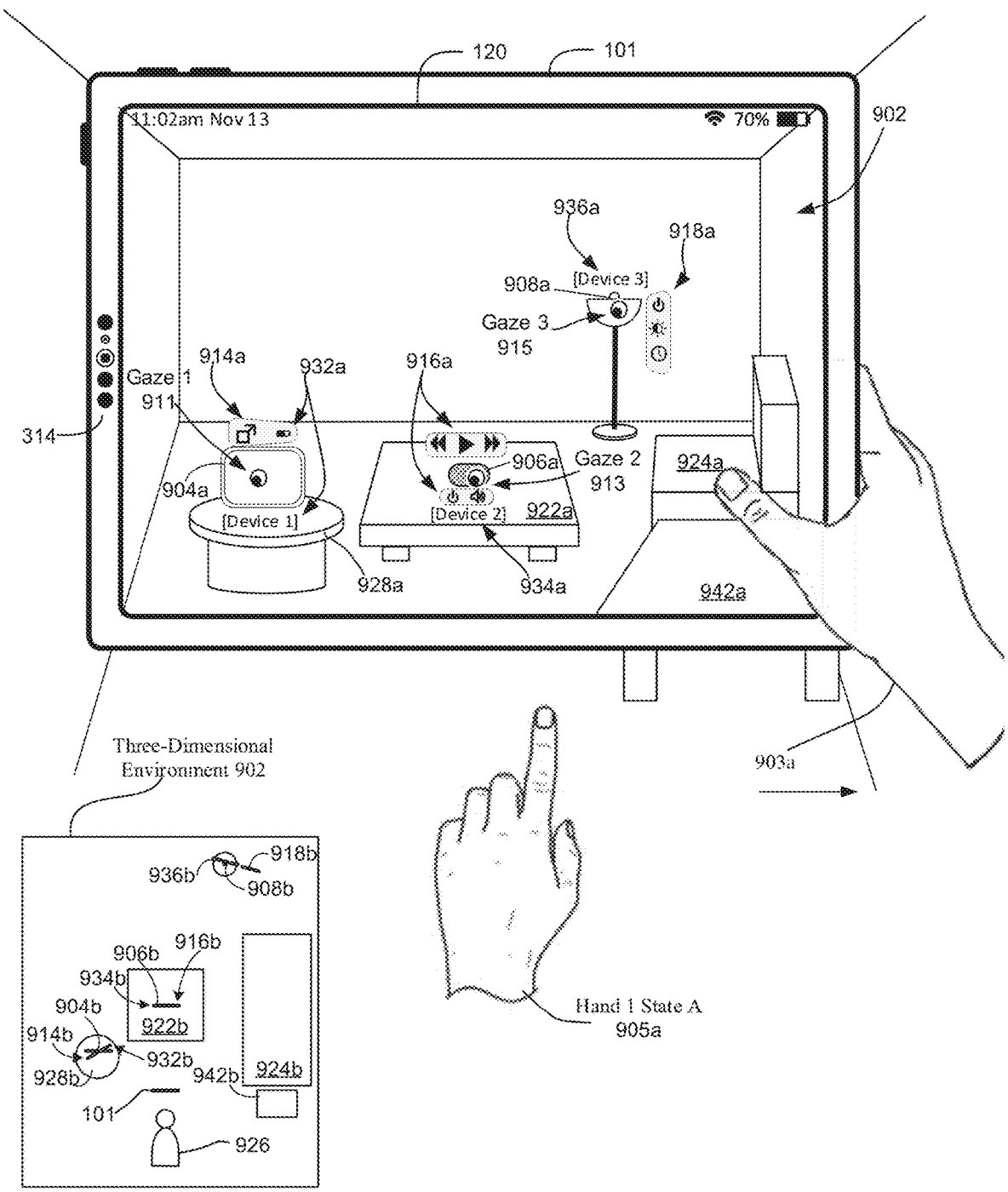
FIGS. 9A-9E illustrate examples of a computer system facilitating interaction with virtual controls associated with physical devices that are displayed in a three-dimensional environment in accordance with some embodiments.

FIG. 9A illustrates a computer system (e.g., an electronic device) 101 displaying, via a display generation component (e.g., display generation component 120 of FIG. 1), a three-dimensional environment 902 from a viewpoint of the user 926 illustrated in the overhead view (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 9A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 902. For example, three-dimensional environment 902 includes a representation 922a of a coffee table (corresponding to table 922b in the overhead view), which is optionally a representation of a physical coffee table in the physical environment, and three-dimensional environment 902 includes a representation 924a of sofa (corresponding to sofa 924b in the overhead view), which is optionally a representation of a physical sofa in the physical environment. Additionally, three-dimensional environment 902 includes a representation 928a of a round table (corresponding to table 928b in the overhead view), which is optionally a representation of a physical round table in the physical environment, and three-dimensional environment 902 includes a representation 942a of a side table (corresponding to table 942b in the overhead view), which is optionally a representation of a physical side table in the physical environment. Representations of physical objects that are displayed and/or visible in three-dimensional environment 902 described herein optionally correspond to renders (e.g., photorealistic or otherwise) of those physical objects displayed by computer system 101 or optionally correspond to those objects being visible via visual passthrough of those objects through transparent or translucent portion(s) of display generation component 120.

In FIG. 9A, the physical environment surrounding the computer system 101 optionally includes one or more physical devices (e.g., second computer systems) that are configured to communicate with computer system 101. In some embodiments, representations of the one or more physical devices are displayed in three-dimensional environment 902 or are otherwise visible via display generation component 120 of the computer system 101. For example, in FIG. 9A, the three-dimensional environment 902 includes a representation 904a of a first device (corresponding to device 904b in the overhead view), which is optionally a representation of a physical computer device in the physical environment, and three-dimensional environment 902 includes a representation 906a of a second device (corresponding to device 906b in the overhead view), which is optionally a representation of a physical speaker device in the physical environment. Additionally, the three-dimensional environment 902 optionally includes a representation 908a of a third device (corresponding to device 908b in the overhead view), which is optionally a representation of a physical light-emitting device in the physical environment.

Additionally, in FIG. 9A, attention (e.g., a gaze) of the user 926 is alternatively directed to the representations of the physical devices, respectively, in three-dimensional environment 902. For example, as shown in FIG. 9A, a first gaze point ("Gaze 1") 911 is directed to the representation of the first device 904a, a second gaze point ("Gaze 2") 913 is directed to the representation of the second device 906a, and a third gaze point ("Gaze 3") 915 is directed to the representation of the third device 908a. It should be understood that while multiple gaze points are illustrated in FIGS. 9A-9E, such gaze points need not be detected by computer system 101 concurrently; rather, in some embodiments, computer system 101 independently responds to the gaze points illustrated and described in response to detecting such gaze points independently.

In some embodiments, in response to detecting the attention of the user directed to a representation of a physical device in three-dimensional environment 902, computer system 101 displays, in the three-dimensional environment, one or more virtual control elements associated with the physical device. In some embodiments, the one or more virtual control elements associated with the physical device are selectable to cause one or more corresponding operations involving the physical device to be performed. For example, in FIG. 9A, in response to detecting the gaze 911 directed to the representation of the first device 904a in three-dimensional environment 902, computer system 101 displays one or more virtual control elements 914a (corresponding to elements 914b in the overhead view) associated with the first device in three-dimensional environment 902. In response to detecting the gaze 913 directed to the representation of the second device 906a in three-dimensional environment 902, computer system 101 optionally displays one or more virtual control elements 916a (corresponding to elements 916b in the overhead view) associated with the second device in three-dimensional environment 902. In response to detecting the gaze 915 directed to the representation of the third device 908a in three-dimensional environment 902, computer system 101 optionally displays one or more virtual control elements 918a (corresponding to elements 918b in the overhead view) associated with the third device in three-dimensional environment 902.

In some embodiments, as mentioned above, the one or more virtual control elements associated with a physical device are selectable in the three-dimensional environment 902 to cause one or more corresponding operations involving the physical device to be performed. For example, the first device is a computer device, and the one or more virtual control elements 914a associated with the first device are optionally selectable to cause the computer system 101 to display a workspace (e.g., a virtual desktop) corresponding to a user interface of the first device in three-dimensional environment 902, as discussed in more detail later. The second device is optionally a speaker device, and the one or more virtual control elements 916a associated with the second device are optionally selectable to control one or more playback operations of the second device (e.g., playing audio), as discussed in more detail later. The third device is optionally a light-emitting device, and the one or more virtual control elements 918a associated with the third device are optionally selectable to control one or more light emission operations of the third device (e.g., controlling brightness), as discussed in more detail below.

In some embodiments, in response to detecting the attention of the user directed to a representation of a physical device in three-dimensional environment 902, computer system 101 displays, in three-dimensional environment 902, status information corresponding to the physical device. For example, in FIG. 9A, in response to detecting gaze 911 directed to the representation of the first device 904a in three-dimensional environment 902, computer system 101 displays status information 932a (corresponding to information 932b in the overhead view) corresponding to the first device in three-dimensional environment 902. In some embodiments, the status information 932a corresponding to the first device includes information indicating a battery level (e.g., indication of battery percentage or amount) of the first device and/or a name of the first device (e.g., "Device 1"). In response to detecting gaze 913 directed to the representation of the second device 906a, computer system 101 optionally displays status information 934a (corresponding to information 934b in the overhead view) corresponding to the second device in three-dimensional environment 902. In some embodiments, the status information 934a corresponding to the second device includes information indicating a current volume output of the second device (e.g., a volume level of audio being emitted from the second device) and/or a name of the second device (e.g., "Device 2"). In response to detecting gaze 915 directed to the representation of the third device 908a in three-dimensional environment 902, computer system 101 optionally displays status information 936a (corresponding to status information 936b in the overhead view) corresponding to the third device in three-dimensional environment 902. In some embodiments, the status information 936a corresponding to the third device includes information indicating a current light output of the third device (e.g., an amount or intensity of light being emitted from the third device) and/or a name of the third device (e.g., "Device 3").

In some embodiments, the one or more virtual control elements associated with a physical device and/or the status information corresponding to the physical device are world locked in three-dimensional environment 902. For example, in response to detecting the attention directed to the representation of the physical device in three-dimensional environment 902, computer system 101 displays the one or more virtual control elements associated with the physical device and/or the status information corresponding to the physical device in three-dimensional environment 902 relative to a portion of the representation of the physical device in three-dimensional environment 902. In some embodiments, the portion of the representation of the physical device in three-dimensional environment 902 includes a top and/or bottom portion, or a side and/or an edge of the representation of the physical device. For example, in FIG. 9A, the one or more virtual control elements 914*a* and the status information 932*a* are displayed around/along a perimeter (e.g., top and bottom edges) of the representation of the first device 904*a* in three-dimensional environment 902. Likewise, in FIG. 9A, the one or more virtual control elements 916*a* and the status information 934*a* are displayed around/along a perimeter (e.g., top and bottom edges) of the representation of the second device 906*a*, and the one or more virtual control elements 918*a* and the status information 936*a* are displayed around/along a perimeter (e.g., top edge and side portion) of the representation of the third device 908*a* in three-dimensional environment 902.

In some embodiments, the virtual control elements associated with a physical device and/or the status information corresponding to the physical device are displayed in three-dimensional environment 902 with respective orientations that are based on a viewpoint of user 926 (e.g., while the gaze of the user is directed to the representation of the physical device in three-dimensional environment 902). For example, the virtual control elements associated with the physical device and/or the status information corresponding to the physical device are displayed with respective orientations that face the viewpoint of the user 926. As shown in FIG. 9A, the virtual control elements 914*a* and/or the status information 932*a* displayed with the representation of the first device 904*a* have first orientations (e.g., the front-facing surfaces of the virtual control elements 914*a* and/or the status information 932*a* that face the viewpoint of user 926 are tilted/slightly angled rightward relative to the viewpoint of user 926 to be oriented towards the viewpoint of user 926, as shown by 914*b* and/or 932*b* in the overhead view). The virtual control elements 916*a* and/or the status information 934*a* displayed with the representation of the second device 906*a* have second orientations, different from the first orientations (e.g., the front-facing surfaces of the virtual control elements 916*a* and/or the status information 934*a* that face the viewpoint of user 926 are substantially (e.g., within 1, 2, 5, 10, 12, or 15 degrees of being) perpendicular relative to the viewpoint of user 926, as shown by 934*b* and/or 916*b* in the overhead view). The virtual control elements 918*a* and/or the status information 936*a* displayed with the representation of the third device 908*a* have third orientations, different from the first orientations and the second orientations (e.g., the front-facing surfaces of the virtual control elements 918*a* and/or the status information 936*a* that face the viewpoint of user 926 are tilted/slightly angled leftward relative to the viewpoint of user 926 to be oriented towards the viewpoint of user 926, as shown by 918*b* and/or 936*b* in the overhead view). It should be understood that the orientations of the control elements and/or status information in FIG. 9A are merely exemplary given the exemplary spatial locations of the representations of the physical devices in three-dimensional environment 902, and that for different spatial locations of the representations of the physical devices in three-dimensional environment 902, other orientations would optionally be provided.

In some embodiments, the respective orientations of the one or more virtual control elements associated with a physical device and/or the status information corresponding to the physical device in three-dimensional environment 902 change in response to detecting a change of the user's viewpoint of the three-dimensional environment 902. For example, as discussed below, a change of the user's viewpoint of the three-dimensional environment 902 causes the computer system 101 to display the virtual control elements associated with a respective physical device and/or the status information corresponding to the respective physical device with new orientations in the three-dimensional environment 902 that are based on the new viewpoint of user 926. In some embodiments, when the computer system 101 detects a change in the viewpoint of the user 926, the computer system 101 maintains display of the one or more virtual control elements and/or status information displayed with the representation of the respective physical device, as discussed below.

In FIG. 9A, hand 903*a* is moving computer system 101 corresponding to a change of the user's viewpoint of three-dimensional environment 902 (e.g., and/or a change of the viewpoint of a portion of the physical environment that is visible via display generation component 120 of computer system 101). From FIGS. 9A-9B, hand 903*a* is optionally moving computer system 101 rightward in the physical environment surrounding the computer system 101. In some embodiments, the input for changing the viewpoint of the user 926 corresponds to a movement of the head of the user 926 in the physical environment (e.g., a movement of the head-mounted display worn by the user 926 in the physical environment). In some embodiments, computer system 101 detects hand 903*a* move computer system 101 (e.g., and display generation component 120) to a new respective location in the physical environment. Additionally, in FIG. 9A, hand 905*a* (e.g., in Hand State A) is moving the first device (e.g., Device 1) corresponding to a change of a location of the first device in the physical environment. From FIGS. 9A-9B, hand 905*a* is optionally moving the first device 904*a* closer to the viewpoint 1126 of user 926. In some embodiments, such movement input includes the hand of the user moving the first device toward the body of user 926 while the hand holds the first device. It should be understood that while multiple hands and corresponding inputs are illustrated in FIGS. 9A-9E, such hands and inputs need not be detected by computer system 101 concurrently; rather, in some embodiments, computer system 101 independently responds to the hands and/or inputs illustrated and described in response to detecting such hands and/or inputs independently.

Figure 9B:
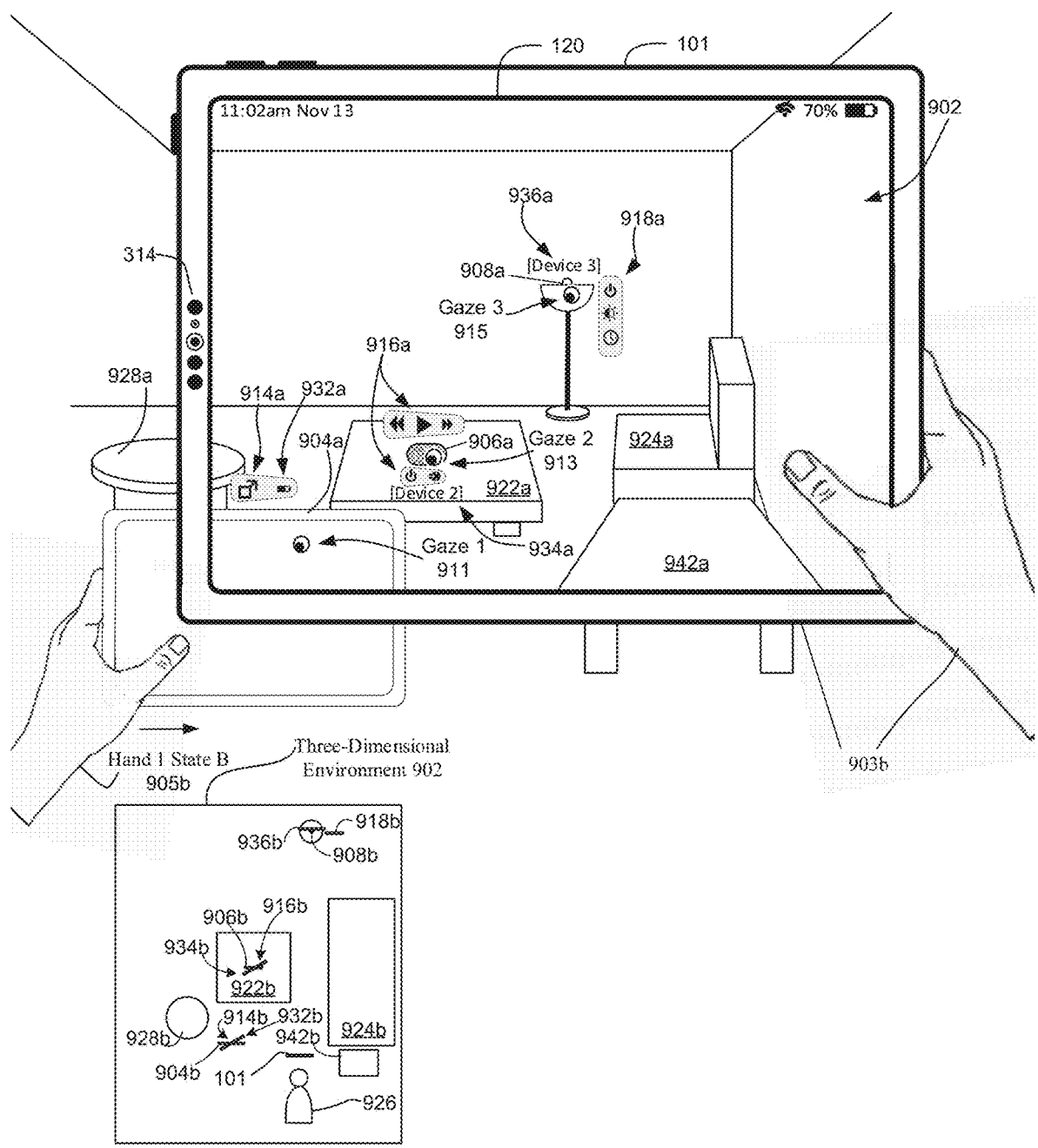

In response to the movement of the first device closer to the body of user 926, the computer system 101 optionally displays (e.g., a portion of) the representation of the first device 904*a* at a location in three-dimensional environment 902 that is closer to the viewpoint of user 926, as shown in FIG. 9B. As shown, the gaze 911 of the user is directed to the representation of the first device 904*a*, which optionally causes the computer system 101 to maintain display of the one or more virtual control elements 914*a* and/or the status information 932*a* at the new location of the representation of the first device 904*a* in three-dimensional environment 902. In some embodiments, computer system 101 continually updates display of the representation of the first device 904*a* such that the representation of the first device 904*a* moves in three-dimensional environment 902 as the first device is moved in the physical environment. Additionally or alternatively, in some embodiments, the movement of the first device in the physical environment is visible via the display generation component 120. Additionally, in response to the change of the user's viewpoint of three-dimensional environment 902 detected in FIG. 9A, computer system 101 optionally changes respective orientations of the virtual control elements associated with the physical devices and/or the status information corresponding to the physical devices in three-dimensional environment 902 accordingly, as discussed below.

As shown in FIG. 9B, the virtual control elements associated with the physical devices and/or the status information corresponding to the physical devices are displayed in three-dimensional environment 902 with new/updated orientations that are based on the new viewpoint of user 926 in accordance with the movement of the hand 903b. For example, the virtual control elements associated with a respective physical device and/or the status information corresponding to the respective physical device are displayed with new respective orientations that face the new viewpoint of the user 926. As shown in FIG. 9B, the virtual control elements 914a and/or the status information 932a displayed with the representation of the first device 904a have new first orientations (e.g., the front-facing surfaces of the virtual control elements 914a and/or the status information 932a that face the viewpoint of user 926 are tilted/slightly angled rightward relative to the viewpoint of user 926 to be oriented towards the viewpoint of user 926, as shown by 914b and/or 932b in the overhead view). The virtual control elements 916a and/or the status information 934a displayed with the representation of the second device 906a optionally have new second orientations, different from the previous second orientations (e.g., the front-facing surfaces of the virtual control elements 916a and/or the status information 934a that face the viewpoint of user 926 are tilted/slightly angled rightward relative to the viewpoint of user 926 to be oriented towards the viewpoint of user 926, as shown by 934b and/or 916b in the overhead view). The virtual control elements 918a and/or the status information 936a displayed with the representation of the third device 908a optionally have new third orientations, different from the previous third orientations (e.g., the front-facing surfaces of the virtual control elements 918a and/or the status information 936a that face the viewpoint of user 926 are substantially (e.g., within 1, 2, 5, 10, 12, or 15 degrees of being) perpendicular relative to the viewpoint of user 926, as shown by 918b and/or 936b in the overhead view).

As described above, the one or more virtual control elements associated with a physical device and/or the status information corresponding to the physical device are optionally displayed in three-dimensional environment 902 in response to computer system 101 detecting attention (e.g., gaze) directed to the representation of the physical device in three-dimensional environment 902. For example, as shown in FIG. 9B, gaze 911 is directed to the representation of the first device 904a, gaze 913 is directed to the representation of the second device 906a, and gaze 915 is directed to the representation of the third device 908a, which causes computer system 101 to maintain display of the virtual control elements and/or status information corresponding to each of the first device, the second device, and the third device in three-dimensional environment 902. In some embodiments, while a respective physical device is moved in the physical environment, and thus while a location of the representation of the respective physical device is updated in the three-dimensional environment 902 (e.g., and/or while the location of the respective physical device in the physical environment is visible via display generation component 120), computer system 101 ceases display of the one or more virtual control elements and/or the status information in three-dimensional environment 902 irrespective of whether the attention of the user 926 is directed to the representation of the respective physical device in three-dimensional environment 902. In FIG. 9B, hand 905b (e.g., in Hand State B) is moving the first device in the physical environment. For example, in Hand State B, the hand 905b of the user is moving rightward in the physical environment while the hand clutches (e.g., the fingers of the hand grasp) the first device. In some embodiments, the portion of the first device that is visible in three-dimensional environment 902 (i.e., the portion of the representation of the first device 904a) moves in three-dimensional environment 902 as computer system 101 detects the movement of hand 905b.

Figure 9C:
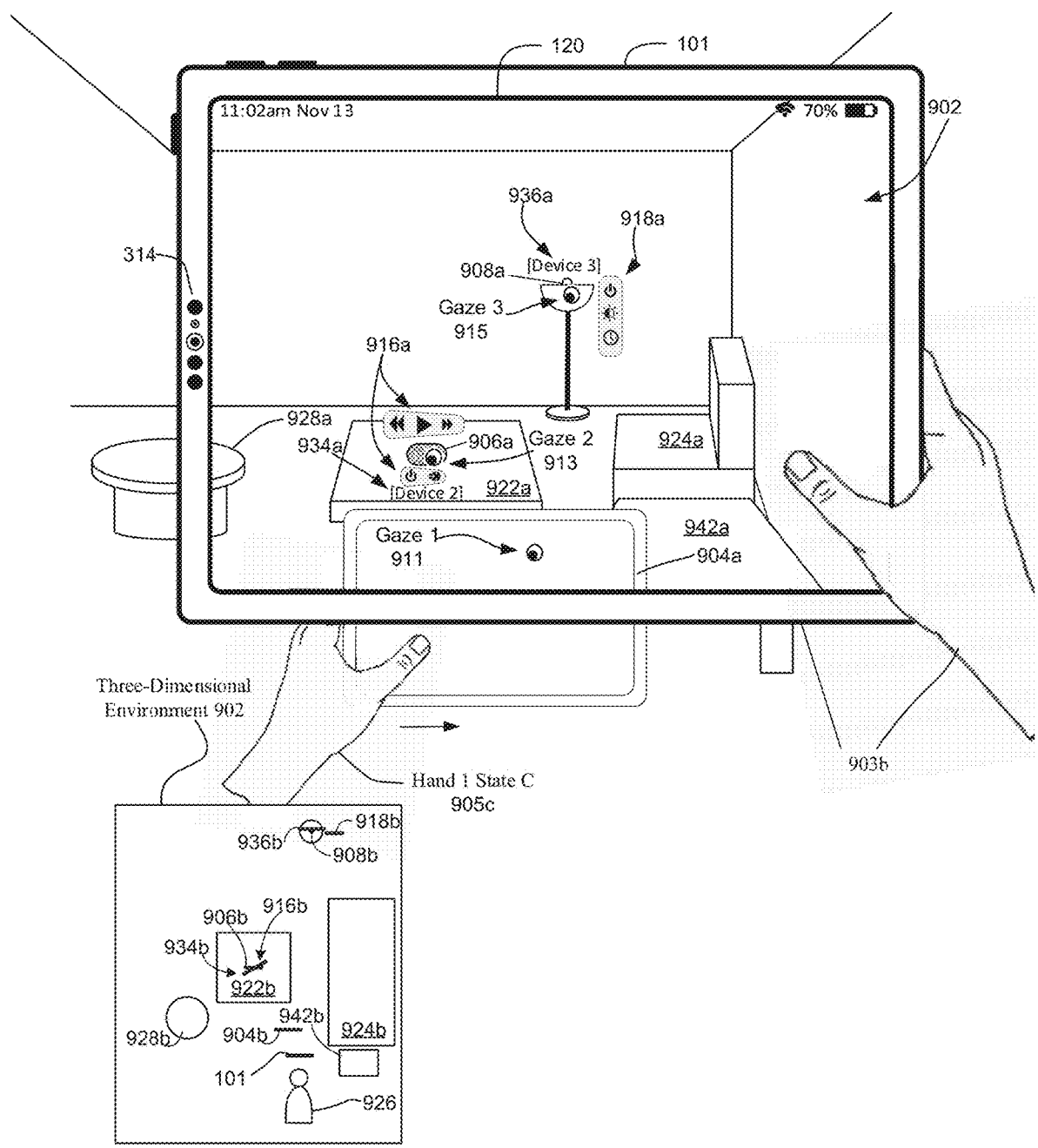

While the hand 905b moves the first device in the physical environment, as shown in FIG. 9C, the computer system 101 optionally updates display of the representation of the first device 904a to correspond to a current location of the first device in the physical environment. Additionally or alternatively, in some embodiments, while the hand 905b moves the first device in the physical environment, the movement of the first device is visible via the display generation component 120. In FIG. 9C, the gaze points 913 and 915 are directed to the representations of the second device 906a and the third device 908a, respectively, which causes computer system 101 to display corresponding virtual control elements and/or status information in three-dimensional environment 902, as discussed above. Additionally, gaze 911 is directed to the representation of the first device 904a in three-dimensional environment 902 while the hand 905c moves the first device in the physical environment. However, because the computer system 101 detects that the first device is actively being moved in the physical environment, the computer system optionally forgoes displaying the virtual control elements 914a and/or status information 932a with the representation of the first device 904a in three-dimensional environment 902. In FIG. 9C, hand 905c (e.g., in Hand State C) continues moving the first device in the physical environment. For example, hand 905c is moving the first device to the side table (e.g., representation 942a thereof) that is visible via display generation component 120.

Figure 9D:
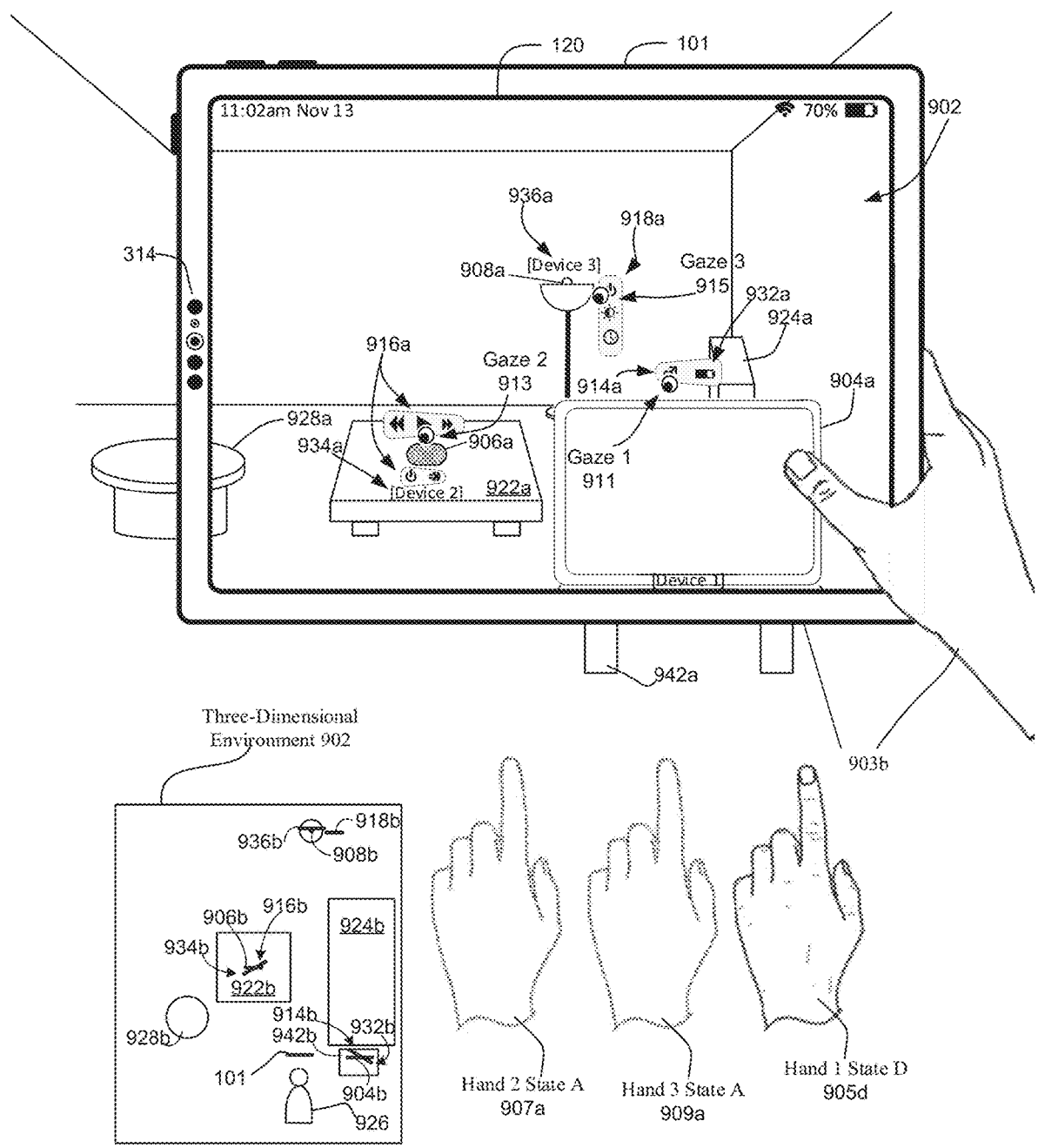

In response to detecting the movement of the first device to the side table in the physical environment, computer system 101 optionally displays the representation of the first device 904a at a location of the representation of the side table 942a (e.g., atop the representation of the side table 942a) in three-dimensional environment 902, as shown in FIG. 9D. In FIG. 9D, the gaze 911 of the user 926 is directed to the representation of the first device 904a in three-dimensional environment 902. Because the computer system 101 has detected that movement of the first device (e.g., by hand 905c) in the physical environment has ceased, computer system 101 redisplays the one or more virtual control elements 914a associated with the first device and/or the status information 932a corresponding to the first device in three-dimensional environment 902. For example, in FIG. 9D, the representation of the first electronic device 904a is displayed with the one or more virtual control elements 914a and the status information 932a in three-dimensional environment 902.

As mentioned above with reference to FIG. 9A, in some embodiments, the one or more virtual control elements associated with a respective physical device in three-dimensional environment 902 are selectable to cause one or more corresponding operations involving the respective physical device to be performed. In FIG. 9D, hand 905d (e.g., in Hand State D) is providing a selection input directed to the one or more virtual control elements 914a associated with the first device, hand 907a (e.g., in Hand State A) is providing a selection input directed to the one or more virtual control elements 916a associated with the second device, and hand 909a (e.g., in Hand State A) is providing a selection input directed to the one or more virtual control elements 918a associated with the third device in three-dimensional environment 902. In Hand State D (e.g., before the hand is in a pinch hand shape (e.g., while the thumb and tip of the index finger of the hand are not touching)), hand 905d is optionally providing input for activating a first virtual control element of the one or more virtual control elements 914a in three-dimensional environment 902. In Hand State A (e.g., before the hand is in a pinch hand shape (e.g., while the thumb and tip of the index finger of the hand are not touching)), hands 907a and 909a are optionally providing input for activating a first virtual control element of the one or more virtual control elements 916a and a first virtual control element of the one or more virtual control elements 918a, respectively, in three-dimensional environment 902. For example, computer system 101 detects hands 905d, 907a, and 909a moving away from the body of the user 926 and subsequently providing a pinch gesture directed to each of their respective targets (e.g., as indicated by gaze points 911, 913, and 915, respectively). Additional or alternative details about such selection inputs are described with reference to method 1000. In some embodiments, the inputs provided by hands 905d, 907a, and/or 909a are air gesture inputs.

Figure 9E:
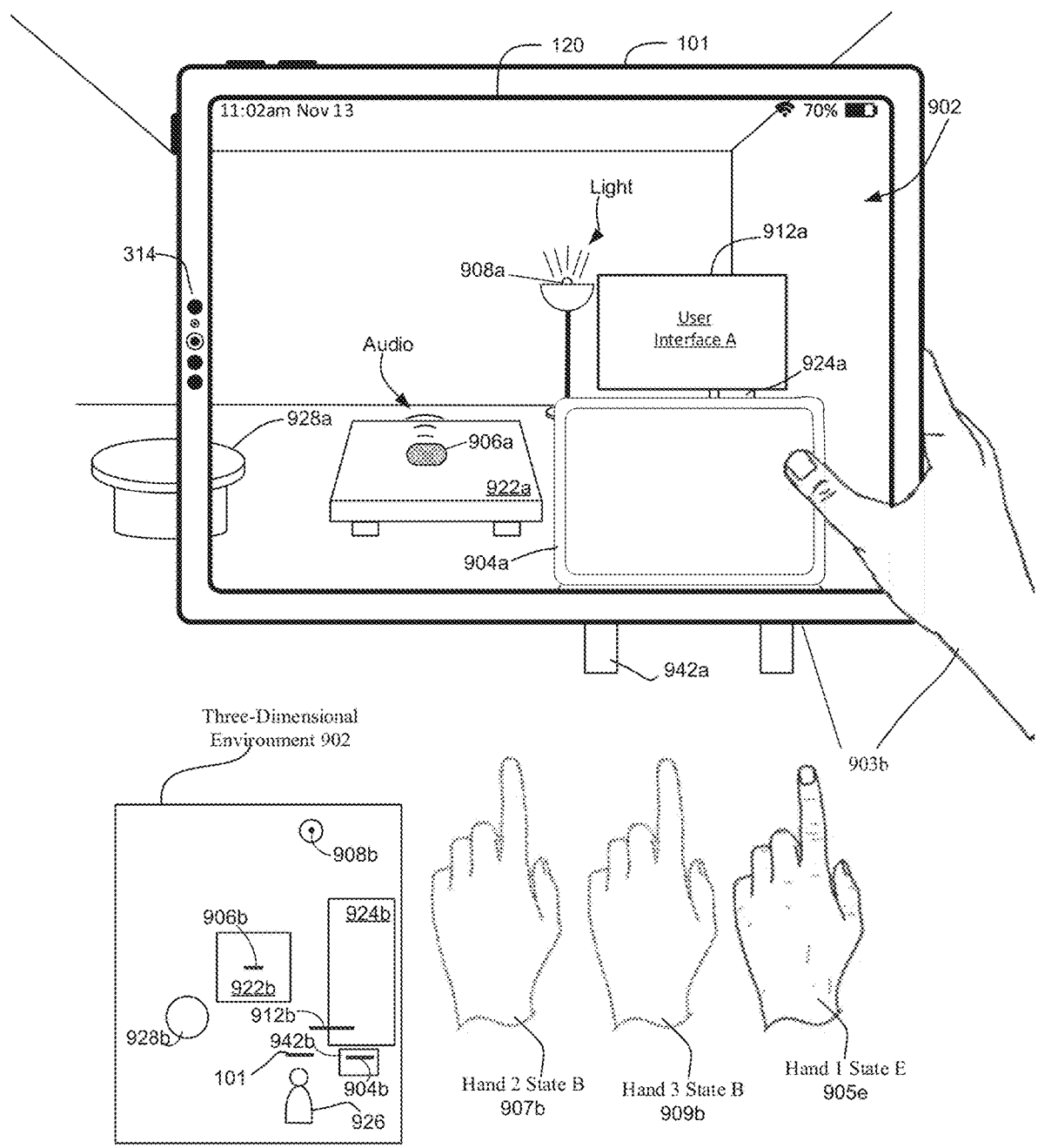
Figure 10A:
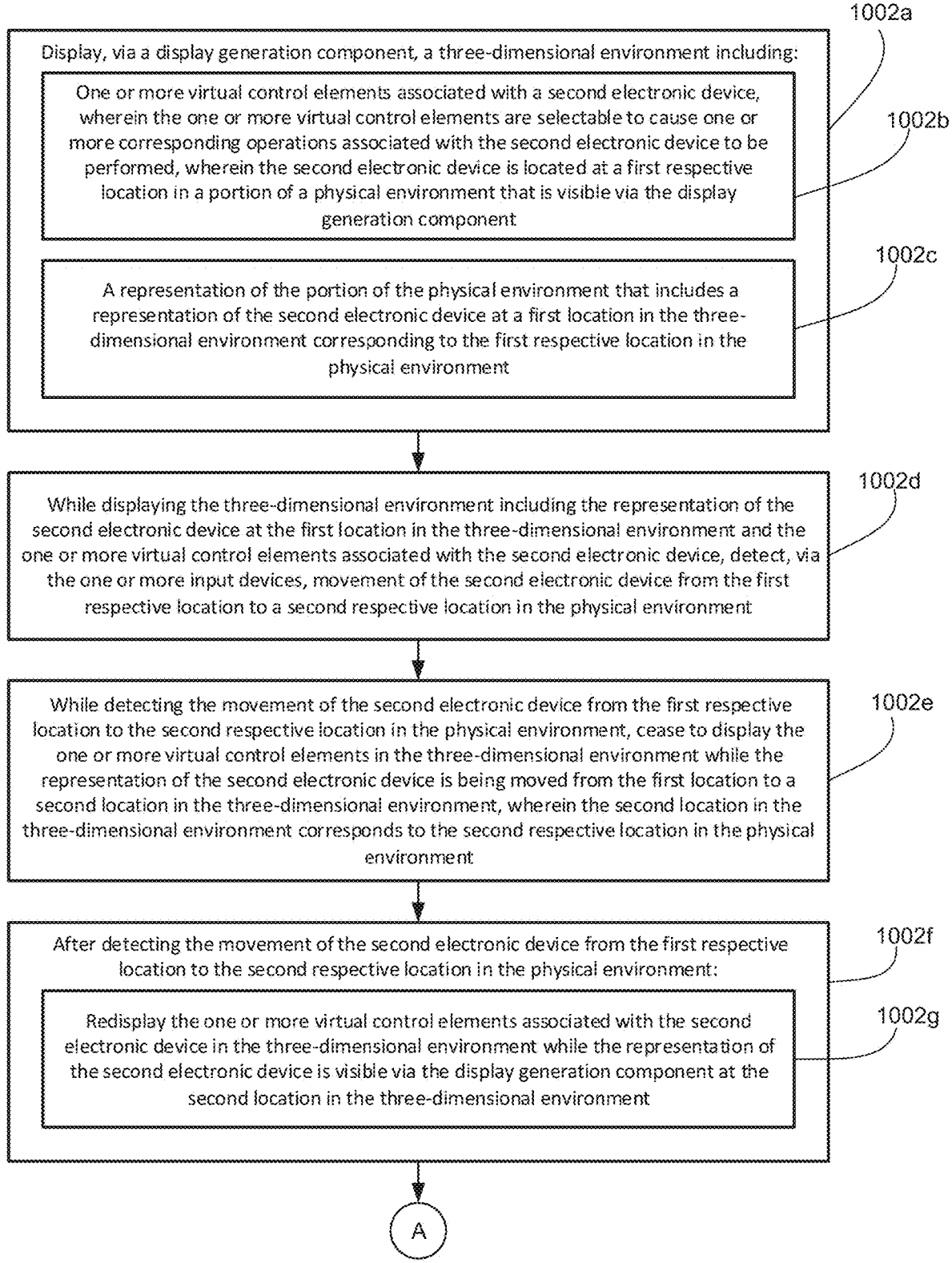
FIGS. 10A-10F is a flowchart illustrating a method of facilitating interaction with virtual controls associated with physical devices that are displayed in a three-dimensional environment in accordance with some embodiments.
Figure 10B:
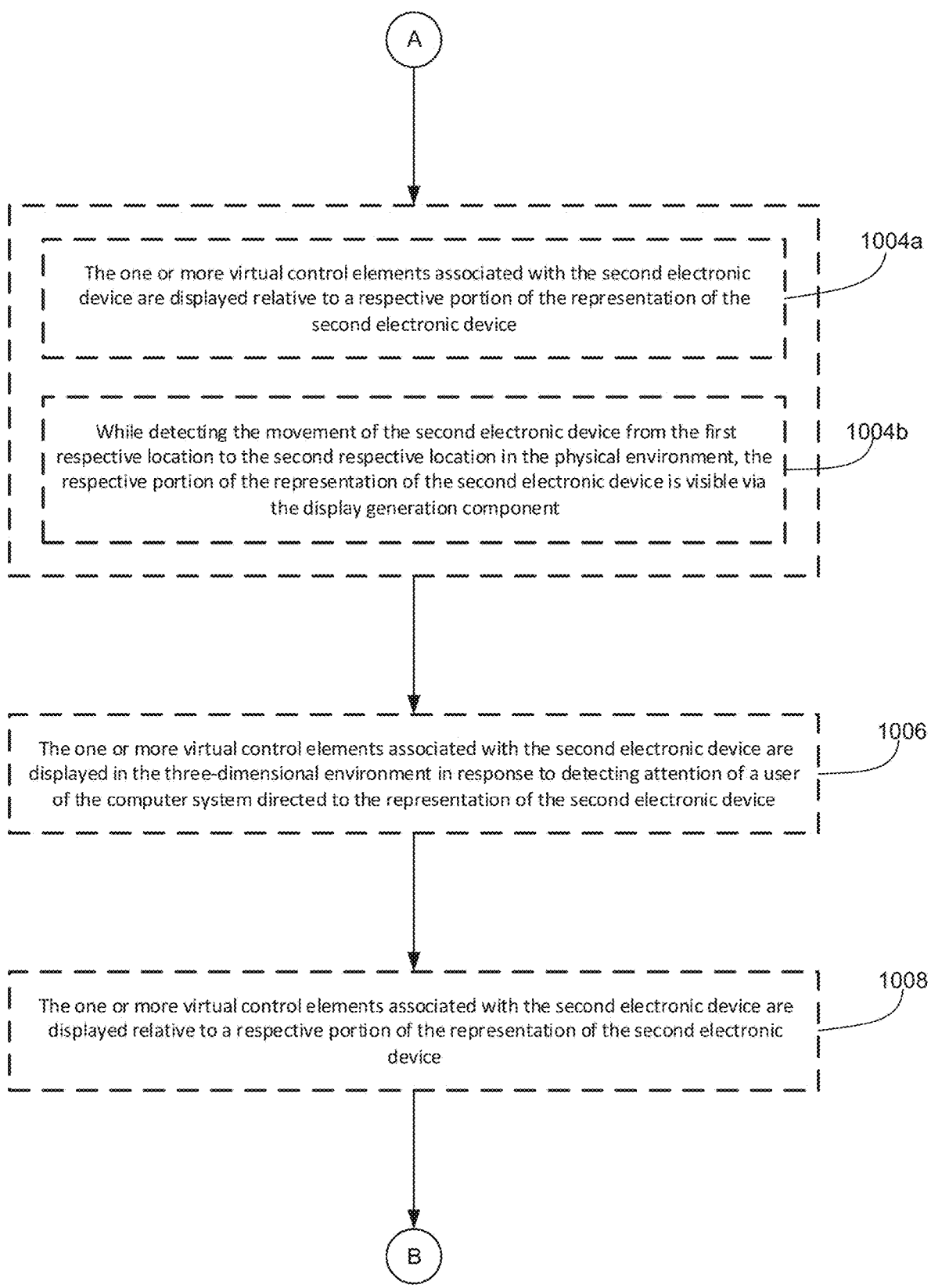
Figure 10C:
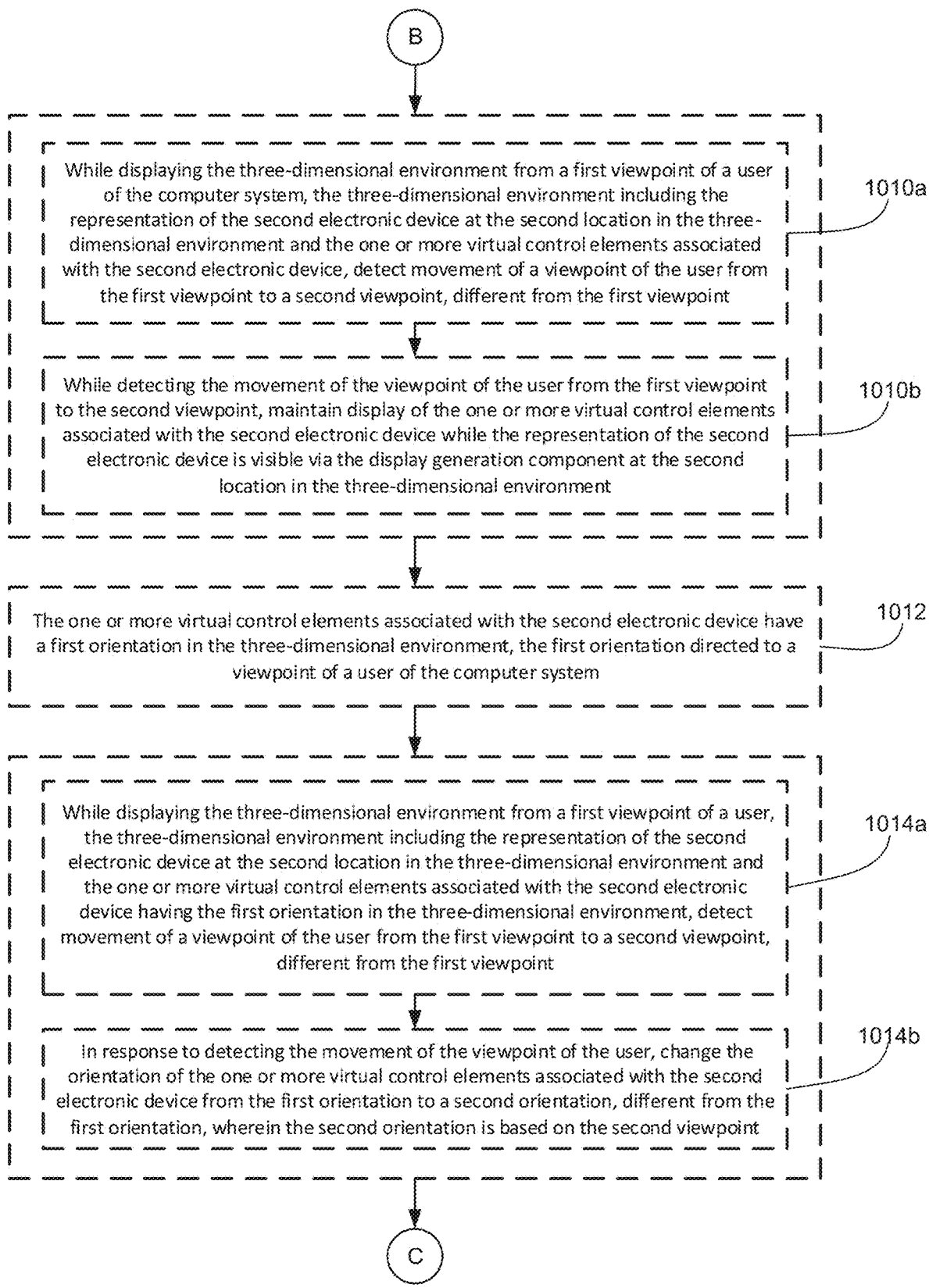
Figure 10D:
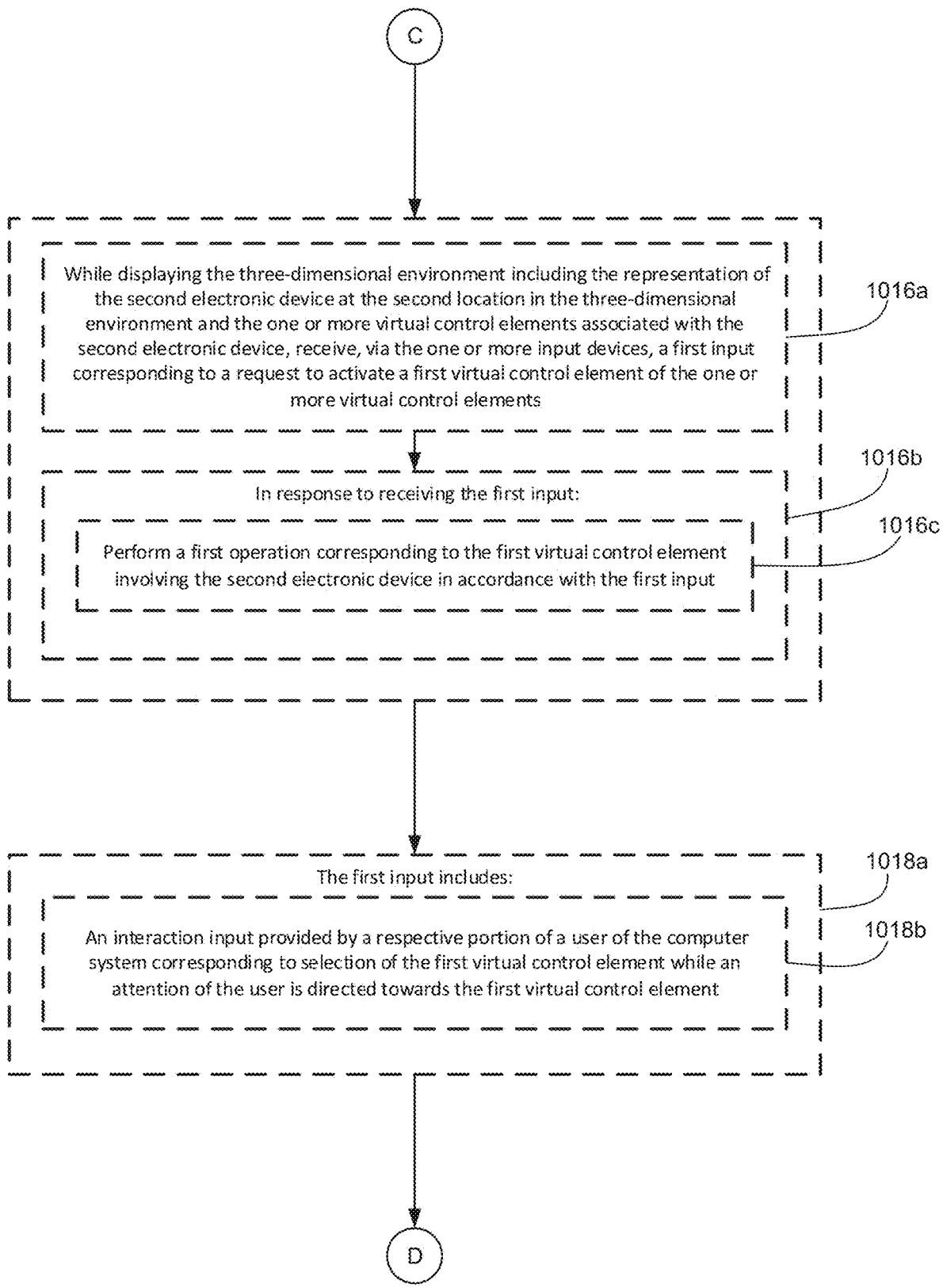
Figure 10E:
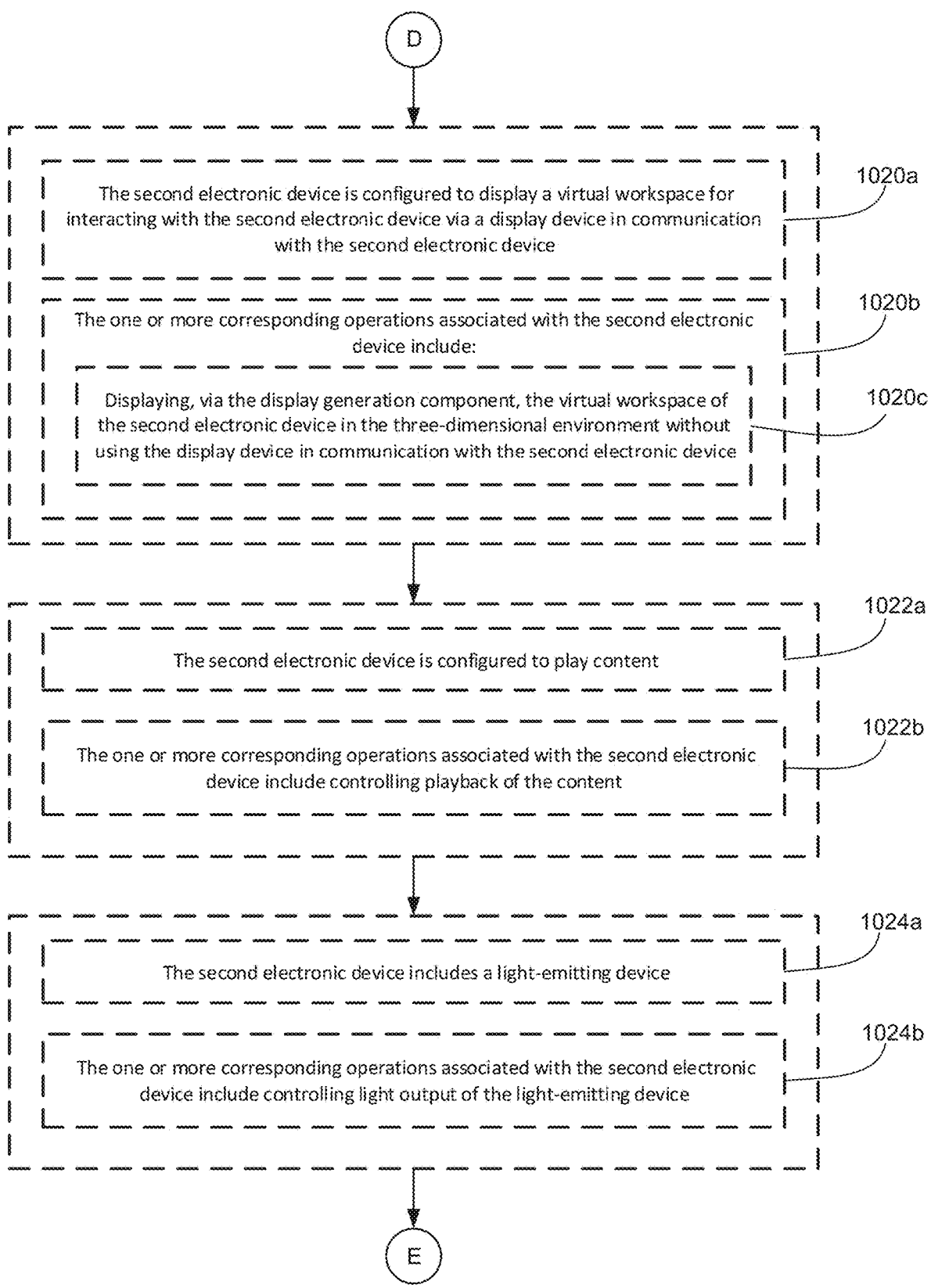
Figure 10F:
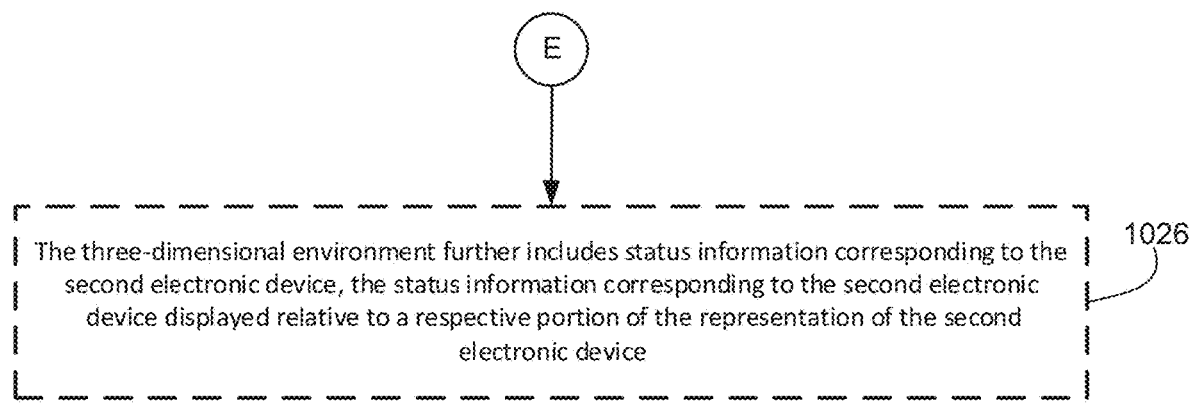

In response to detecting selection of a respective virtual control element of the one or more virtual control elements associated with a physical device in three-dimensional environment 902, a corresponding action involving the physical device is performed, as shown in FIG. 9E. For example, in response to detecting selection of the first virtual control element of the one or more virtual control elements 914a associated with the first device in FIG. 9D, provided by hand 905d, computer system 101 displays a virtual workspace 912a (corresponding to workspace 912b in the overhead view) in three-dimensional environment 902, as shown in FIG. 9E. In some embodiments, the virtual workspace 912a includes a user interface (e.g., User Interface A) corresponding to a user interface configured to be displayed via (e.g., on a display of) the first device in the physical environment. In some embodiments, virtual workspace 912a is displayed at a location in the three-dimensional environment 902 that is different from the location at which the (e.g., representation of the) display of the first device is located in the three-dimensional environment 902. Interactions with the user interface of the workspace 912a in three-dimensional environment 902 optionally correspond to interactions with the user interface configured to be displayed via the first device in the physical environment.

In response to detecting selection of the first virtual control element of the one or more virtual control elements 916a in FIG. 9D, provided by hand 907b, the second device optionally emits audio (e.g., Audio) corresponding to content (e.g., a song, a podcast, an audiobook, etc.) in the physical environment, as shown in FIG. 9E. In some embodiments, the audio emitted by the second device in the physical environment is observable (e.g., heard) in three-dimensional environment 902. In response to detecting selection of the first virtual control element of the one or more virtual control elements 918a associated with the third device in FIG. 9D, provided by hand 909b, the third device optionally emits light (e.g., Light) at a respective brightness (e.g., intensity) for a respective duration of time in the physical environment, as shown in FIG. 9E. In some embodiments, the light emitted by the third device in the physical environment is observable (e.g., visible) in three-dimensional environment 902.

In some embodiments, computer system 101 ceases display of the one or more virtual control elements and/or the status information associated with a respective physical device in accordance with a determination that attention of the user 926 is no longer directed to the representation of the respective physical device in three-dimensional environment 902. As shown in FIG. 9E, the gaze points are no longer directed to the representations of the physical devices in three-dimensional environment 902. For example, gaze 911 of the user 926 is no longer directed to the representation of the first device 904a, gaze 913 is no longer directed to the representation of the second device 906a, and gaze 915 is no longer directed to the representation of the third device 908a. In response detecting that the gaze points are no longer directed to the representations of the physical devices in three-dimensional environment 902, the computer system 101 ceases display of the one or more virtual control elements and/or the status information in three-dimensional environment 902. For example, in FIG. 9E, computer system 101 no longer displays the one or more virtual control elements 914a and/or the status information 932a with the representation of the first device 904a, the one or more virtual control elements 916a and/or the status information 934a with the representation of the second device 906a, and the one or more virtual control elements 918a and/or the status information 936a with the representation of the third device 908a. It should be understood that, as discussed above with reference to FIG. 9A, if the attention (e.g., the gaze) of the user 926 is redirected to a representation of a respective physical device in three-dimensional environment 902, computer system 101 would optionally redisplay the one or more virtual control elements associated with the respective physical device and/or the status information corresponding to the respective physical device.

FIGS. 10A-10F is a flowchart illustrating a method 1000 of facilitating interaction with virtual controls associated with physical devices that are displayed in a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system (e.g., computer system 101) in communication with a display generation component (e.g., 120), one or more input devices (e.g., 314), and a second electronic device. In some embodiments, the computer system has one or more of the characteristics of the electronic device in method 800. In some embodiments, the display generation component has one or more of the characteristics of the display generation component in method 800. In some embodiments, the one or more input devices have one or more of the characteristics of the one or more input devices in method 800. In some embodiments, the second electronic device is an electronic device or component capable of exchanging information with the electronic device. For example, the second electronic device is controllable by the computer system (e.g., via input received, detected, captured, etc. at the electronic device). Examples of the second electronic device include a smart speaker, a light-emitting device (e.g., a lamp), a mobile device, or a computer, etc. In some embodiments, the second electronic device is an accessory for providing input to the computer system, such as a trackpad for providing touch input to the electronic device.

In some embodiments, the computer system displays (1002*a*), via the display generation component, a three-dimensional environment (e.g., three-dimensional environment 902 in FIG. 9A) including one or more virtual control elements (e.g., virtual control elements 914*a*, 916*a*, and/or 918*a* in FIG. 9A) associated with the second electronic device (e.g., device 904*a*, 906*a*, and/or 908*a* in FIG. 9A), wherein the one or more virtual control elements are selectable to cause one or more corresponding operations associated with the second electronic device to be performed (e.g., one or more virtual buttons that are configured to control the second electronic device. In some embodiments, the one or more virtual control elements are displayed at or near a location of the representation of the second electronic device. For example, the one or more virtual control elements are displayed above the representation of the second electronic device, or a top a surface of the representation of the second electronic device in the three-dimensional environment. In some embodiments, the one or more corresponding operations are specific to the second electronic device in the physical environment. For example, if the second electronic device is a speaker, the one or more virtual buttons in the three-dimensional environment are selectable to adjust a volume of audio emitted by the speaker in the physical environment. If the second electronic device is a light-emitting device, the one or more virtual buttons are optionally selectable to adjust an amount of light emitted by the light-emitting device in the physical environment.), wherein the second electronic device is located at a first respective location in a portion of a physical environment that is visible via the display generation component (1002*b*) (e.g., the environment surrounding the display generation component and/or the computer system includes the second electronic device (e.g., the second electronic device is positioned on a table, chair, shelf, etc. in the portion of the physical environment)).

In some embodiments, the three-dimensional environment includes a representation of the portion of the physical environment that includes a representation of the second electronic device, such as representation of device 904*a*, 906*a*, and/or 908*a* in FIG. 9A (e.g., a three-dimensional rendering of the second electronic device, a captured image of the second electronic device, or passthrough visibility of the second electronic device. In some embodiments, the representation of the portion of the physical environment and/or physical objects included in the portion of the physical environment are displayed in the three-dimensional environment via the display generation component (e.g., virtual or video passthrough). In some embodiments, the representation of the portion of the physical environment and/or physical objects included in the portion of the physical environment are views of the physical environment of the electronic device visible through a transparent portion of the display generation component (e.g., true or real passthrough). In some embodiments, the three-dimensional environment has one or more of the characteristics of the three-dimensional environment in method 800) at a first location in the three-dimensional environment corresponding to the first respective location in the physical environment (1002*c*) (e.g., the representation of the second electronic device is displayed at the same or corresponding location in the three-dimensional environment that the second electronic device is located in the physical environment). In some embodiments, when the second electronic device is not located at the first respective location in the portion of the physical environment that is visible via the display generation component, the one or more virtual control elements are not displayed in the three-dimensional environment.

In some embodiments, while displaying the three-dimensional environment including the representation of the second electronic device at the first location in the three-dimensional environment and the one or more virtual control elements associated with the second electronic device, the computer system detects (1002*d*), via the one or more input devices, movement of the second electronic device from the first respective location to a second respective location in the physical environment, such as movement of the first device 904*a* as shown in FIG. 9B (e.g., movement of the second electronic device to a new location in the physical environment (e.g., to a new location on the table, to a different chair, to a new location on the shelf, etc.), or reorientation of the second electronic device in the physical environment (e.g., rotation of the second electronic device from a first orientation to a second orientation, different from the first orientation)). In some embodiments, the movement of the second electronic device corresponds to movement of one or both hands of a user of the electronic device carrying/holding/pushing/etc. the second electronic device in the physical environment.

In some embodiments, while detecting the movement of the second electronic device from the first respective location to the second respective location in the physical environment, the computer system ceases (1002*e*) to display the one or more virtual control elements in the three-dimensional environment while the representation of the second electronic device is being moved from the first location to a second location in the three-dimensional environment, such as cease display of the virtual control element 914*a* in FIG. 9C (e.g., the representation of the second electronic device in the three-dimensional environment is moved in accordance with the movement of the second electronic device in the physical environment. In some embodiments, the movement of the second electronic device is visible via the display generation component. In some embodiments, the movement is displayed and updated in the three-dimensional environment in real-time (e.g., 1 ms, 2 ms, 3 ms, 5 ms, 9 ms, 10 ms, 15 ms, 20 ms, or 30 ms) after a respective movement of the second electronic device in the real-world environment. In some embodiments, during the movement of the second electronic device, the one or more virtual control elements cease to be displayed in the three-dimensional environment.), wherein the second location in the three-dimensional environment corresponds to the second respective location in the physical environment (e.g., the representation of the second electronic device is displayed at the same or corresponding new location in the three-dimensional environment at which the second electronic device is located in the physical environment).

In some embodiments, after detecting the movement of the second electronic device from the first respective location to the second respective location in the physical environment (10020 (e.g., in response to detecting an end of the movement of the second electronic device), the computer system redisplays (1002g) the one or more virtual control elements associated with the second electronic device in the three-dimensional environment while the representation of the second electronic device is visible via the display generation component at the second location in the three-dimensional environment, such as redisplay of the virtual control element 914a as shown in FIG. 9D (e.g., the representation of the second electronic device has been moved to the second location in the three-dimensional environment in accordance with the movement of the second electronic device by the hand(s) of the user in the physical environment). In some embodiments, the one or more virtual control elements are redisplayed in the three-dimensional environment after movement of the second electronic device concludes. In some embodiments, the one or more virtual control elements are displayed at or near the new location of the representation of the second electronic device in the three-dimensional environment. Ceasing display of virtual control elements in the three-dimensional environment that are associated with a physical device in the physical environment during a movement of the physical device in the physical environment avoids obstruction of portions of the three-dimensional environment by the virtual control elements during the movement of the physical device, thereby improving user-device interaction.

In some embodiments, the one or more virtual control elements associated with the second electronic device are displayed relative to a respective portion of the representation of the second electronic device (1004a), such as display of virtual control element 914a relative to the representation of device 904a as shown in FIG. 9A (e.g., the one or more virtual control elements associated with the second electronic device are displayed in the three-dimensional environment at or along a portion of a perimeter of the representation of the second electronic device). In some embodiments, the one or more virtual control elements are displayed above, below, to a side of, and/or partially in front of the representation of the second electronic device.

In some embodiments, while detecting the movement of the second electronic device from the first respective location to the second respective location in the physical environment (e.g., and while the one or more virtual control elements cease displaying in the three-dimensional environment, as discussed above), the respective portion of the representation of the second electronic device is visible via the display generation component (1004b), such as the top portion of the representation of device 904a in FIG. 9B. For example, while the second electronic device is moved in the physical environment, the portion of the representation of the second electronic device at which the one or more virtual control elements were displayed (e.g., prior to detecting the movement) is visible in the three-dimensional environment. Ceasing display of virtual control elements in the three-dimensional environment that are associated with a physical device in the physical environment during a movement of the physical device in the physical environment avoids obstruction of portions of the three-dimensional environment by the virtual control elements during the movement of the physical device, thereby improving user-device interaction.

In some embodiments, the one or more virtual control elements associated with the second electronic device are displayed in the three-dimensional environment in response to detecting attention of a user of the computer system, such as gaze point 911, 913, and/or 915 in FIG. 9A, directed to the representation of the second electronic device (1006). For example, the one or more virtual control elements associated with the second electronic device are displayed in the three-dimensional environment when a gaze of the user is directed to at least a portion of the representation of the second electronic device. In some embodiments, the one or more virtual control elements cease to be displayed in the three-dimensional environment when the gaze of the user is no longer directed to at least a portion of the representation of the second electronic device. Displaying virtual control elements in the three-dimensional environment that are associated with a physical device in the physical environment when a gaze of the user is directed to a representation of the physical device reduces the number of inputs needed to initiate interaction with the virtual control elements, thereby improving user-device interaction.

In some embodiments, the one or more virtual control elements associated with the second electronic device are displayed relative to a respective portion of the representation of the second electronic device (1008), such as display of virtual control elements 916a relative to the representation of device 906a as shown in FIG. 9A. For example, the one or more virtual control elements associated with the second electronic device are world locked. In some embodiments, the one or more virtual control elements are displayed in the three-dimensional environment at or along a portion of a perimeter of the representation of the second electronic device. In some embodiments, the one or more virtual control elements are displayed above, below, to a side of, and/or partially in front of the representation of the second electronic device. Displaying virtual control elements that are associated with a physical device in the physical environment relative to a representation of the physical device in the three-dimensional environment facilitates user input for controlling the physical device via the virtual control elements, thereby improving user-device interaction.

In some embodiments, while displaying the three-dimensional environment from a first viewpoint of a user of the computer system, such as the viewpoint of the user 926 as shown in FIG. 9A, the three-dimensional environment including the representation of the second electronic device at the second location in the three-dimensional environment and the one or more virtual control elements associated with the second electronic device, the computer system detects (1010a) movement of a viewpoint of the user from the first viewpoint to a second viewpoint, different from the first viewpoint, such as movement of hand 903a as shown in FIG. 9A (e.g., or movement of a head of the user to a new position/orientation, such that the user's viewpoint of the three-dimensional environment changes). In some embodiments, detection of the movement of the user's head does not necessarily correspond to detection of movement of the user's gaze in the three-dimensional environment. For example, the user's head moves to the new position/orientation while the user's gaze is maintained at the same location in the three-dimensional environment prior to detecting the movement.

In some embodiments, while detecting the movement of the viewpoint of the user from the first viewpoint to the second viewpoint, the computer system maintains (1010b) display of the one or more virtual control elements associated with the second electronic device while the representation of the second electronic device is visible via the display generation component at the second location in the three-dimensional environment, such as maintain display of the virtual control elements 916*a* as shown in FIG. 9B. For example, the gaze of the user remains directed to the representation of the second electronic device as the viewpoint of the three-dimensional environment changes. In some embodiments, the one or more virtual controls associated with the second electronic device remain displayed in the three-dimensional environment (e.g., displayed at, near, or adjacent to a location of the representation of the second electronic device in the three-dimensional environment) because the gaze remained directed to the representation of the second electronic device as the user's viewpoint changed. In some embodiments, display of the one or more virtual control elements is independent of the gaze of the user being directed to the representation of the second electronic device. For example, the one or more virtual control elements associated with the second electronic device remain displayed in the three-dimensional environment when the user's viewpoint of the three-dimensional environment changes, irrespective of the direction of the gaze of the user while the user's viewpoint changes. Maintaining display of virtual control elements that are associated with a physical device in the physical environment when a viewpoint of the three-dimensional environment changes enables interaction with the virtual control elements from the new viewpoint of the three-dimensional environment without displaying additional controls, thereby improving user-device interaction.

In some embodiments, the one or more virtual control elements associated with the second electronic device have a first orientation in the three-dimensional environment, the first orientation directed to a viewpoint of a user of the computer system (1012), such as orientation of the virtual control elements 914*a* and/or 918*a* in FIG. 9A. For example, because the one or more virtual control elements associated with the second electronic device are world locked, the one or more virtual control elements are oriented in the three-dimensional environment to be angled toward the viewpoint of the user of the computer system. In some embodiments, the orientations of the one or more virtual control elements associated with the second electronic device are angled horizontally in the three-dimensional environment (e.g., angled (e.g., in an upward or downward direction) along a horizontal axis intersecting a center of the one or more virtual control elements). In some embodiments, the orientations of the one or more virtual control elements are angled vertically in the three-dimensional environment (e.g., angled along (e.g., in a leftward or rightward direction) along a vertical axis of the one or more virtual control elements). Angling virtual control elements that are associated with a physical device in the physical environment toward the user reduces the number of inputs needed to easily interact with the virtual control elements in the three-dimensional environment, thereby improving user-device interaction.

In some embodiments, while displaying the three-dimensional environment from a first viewpoint of a user, the three-dimensional environment including the representation of the second electronic device at the second location in the three-dimensional environment and the one or more virtual control elements associated with the second electronic device having the first orientation in the three-dimensional environment, the computer system detects (1014*a*) movement of a viewpoint of the user from the first viewpoint to a second viewpoint, different from the first viewpoint, such as movement of hand 903*a* as shown in FIG. 9A (e.g., or movement of a head of the user to a new position/orientation, such that the user's viewpoint of the three-dimensional environment changes). In some embodiments, detection of the movement of the user's head does not necessarily correspond to detection of movement of the user's gaze in the three-dimensional environment. For example, the user's head moves to the new position/orientation while the user's gaze is maintained at the representation of the second electronic device at the second location in the three-dimensional environment prior to detecting the movement.

In some embodiments, in response to detecting the movement of the viewpoint of the user, the computer system changes (1014*b*) the orientation of the one or more virtual control elements associated with the second electronic device from the first orientation to a second orientation (e.g., and without changing a location of the one or more virtual control elements associated with the second electronic device in the three-dimensional environment), different from the first orientation, such as the new orientation of the virtual control elements 914*a* and/or 918*a* as shown in FIG. 9B, wherein the second orientation is based on the second viewpoint, such as the viewpoint of user 926 as shown in FIG. 9B. For example, the one or more virtual control elements associated with the second electronic device are reoriented in the three-dimensional environment to continue to be angled toward the viewpoint of the user of the computer system. In some embodiments, the orientations of the one or more virtual control elements associated with the second electronic device are changed horizontally in the three-dimensional environment (e.g., reangled (e.g., in an upward or downward direction) along a horizontal axis intersecting a center of the one or more virtual control elements). In some embodiments, the orientations of the one or more virtual control elements are changed vertically in the three-dimensional environment (e.g., reangled (e.g., in a leftward or rightward direction) along a vertical axis of the one or more virtual control elements). Changing an angle of virtual control elements that are associated with a physical device in the physical environment to maintain the angle toward the user when a viewpoint of the three-dimensional environment changes reduces the number of inputs needed to easily interact with the virtual control elements in the three-dimensional environment, thereby improving user-device interaction.

In some embodiments, while displaying the three-dimensional environment including the representation of the second electronic device at the second location in the three-dimensional environment and the one or more virtual control elements associated with the second electronic device, the computer system receives (1016*a*), via the one or more input devices, a first input corresponding to a request to activate a first virtual control element of the one or more virtual control elements, such as selection of virtual control element 914*a* as shown in FIG. 9D (e.g., an air gesture, such as a tap or selection gesture (e.g., provided by an index finger of a hand of a user) or a pinch gesture (e.g., provided by an index finger and thumb of a hand of the user), directed to the first virtual control element of the one or more virtual control elements). In some embodiments, the first virtual control element is selectable to cause the second electronic device to perform a respective operation in the physical environment that corresponds to the first virtual control element.

In some embodiments, in response to receiving the first input (1016*b*), the computer system performs (1016*c*) a first operation corresponding to the first virtual control element involving the second electronic device in accordance with the first input, such as display of object 912*a* as shown in FIG. 9E. For example, the second electronic device performs the first operation (e.g., power-on, wake up, emit light, emit sound/audio, display content, etc.) in the physical environment, which is optionally observable (e.g., viewable, able to be heard, feelable, etc.) in the three-dimensional environment (e.g., via the representation of the second electronic device). In some embodiments, an appearance of the first virtual control element of the one or more virtual control elements changes appearance in response to receiving the first input. For example, the first virtual control element changes in shape, size, coloration, opacity, transparency, etc. For example, the first virtual control element is selectable to play a song using the second electronic device, and the first virtual control element is a play icon. In response to receiving the first input, the first virtual control element changes appearance to a pause icon. In some embodiments, subsequent selection of the first virtual control element causes the second electronic device to stop performing the first operation, or to perform a second operation, different from the first operation. Providing a selection of a virtual control element that is associated with a physical device in the physical environment causes the physical device to automatically perform a respective operation corresponding to the virtual control element, thereby improving user-device interaction.

In some embodiments, the first input includes (1018a) an interaction input provided by a respective portion (e.g., hand 905d, 907a, and/or 909a in FIG. 9D) of a user of the computer system corresponding to selection of the first virtual control element while an attention of the user, such as gaze point 911, 913, and/or 915 in FIG. 9D, is directed towards the first virtual control element (1018b). For example, a pinch gesture of an index finger and thumb of a hand of the user (e.g., the index finger and thumb coming together and touching, forming a pinch hand shape while remaining in contact with each other, or coming within a threshold distance of one another (e.g., within 0.1, 0.5, 1, 1.5, 2, 3, 3.5, 4, or 5 cm of one another)), directed to the first virtual control element of the one or more virtual control elements while the gaze of the user is directed to the first virtual control element, and followed by a release of the pinch gesture (e.g., the index finger and thumb moving apart from one another). In some embodiments, the pinch gesture directed to the first virtual control element is not sufficient to activate the first control element (e.g., and cause the first operation to be performed) when the gaze of the user is not directed to the first virtual control element. Requiring gaze be directed to a virtual control element that is associated with a physical device in the physical environment to cause the physical device to perform a respective operation corresponding to the virtual control element prevents unintentional selection of the virtual control element, thereby improving user-device interaction.

In some embodiments, the second electronic device is configured to display a virtual workspace (e.g., a virtual desktop), such as virtual desktop 912a in FIG. 9E, for interacting with the second electronic device via a display device in communication with the second electronic device (1020a) (e.g., a user interface (e.g., a home screen, or an application window) configured to be displayed on the display in communication with the second electronic device. In some embodiments, the second electronic device is a computer device (e.g., desktop computer, tablet computer, laptop, or mobile device) and the display is a screen of the computer device. In some embodiments, the virtual workspace is visible via the display generation component of the computer system in the three-dimensional environment. In some embodiments, the virtual workspace is not visible via the display generation component (e.g., the display in communication with the second electronic device is off (e.g., the second electronic device is in an off state or a sleep or low power state).), such as the display of device 904a in FIG. 9E.

In some embodiments, the one or more corresponding operations associated with the second electronic device include (1020b), displaying, via the display generation component, the virtual workspace of the second electronic device in the three-dimensional environment without using the display device in communication with the second electronic device (1020c), such as display of object 912a as shown in FIG. 9E. For example, a representation of the virtual workspace (e.g., a representation of the home screen or application window) configured to be displayed on the display in communication with the second electronic device is displayed in the three-dimensional environment. In some embodiments, the virtual workspace ceases to be displayed on the display in communication with the second electronic device when the representation of the virtual workspace is displayed in the three-dimensional environment. In some embodiments, the representation of the virtual workspace in the three-dimensional environment can be interacted with to control one or more user interface elements (e.g., applications, content, windows, etc.) associated with operations on the second electronic device (e.g., to cause the second computer system to perform those operations). Displaying a functional representation of a workspace, associated with a physical device in the physical environment, in the three-dimensional environment reduces the number of inputs needed to interact with the workspace associated with the physical device, thereby improving user-device interaction.

In some embodiments, the second electronic device, such as device 906a in FIG. 9A, is configured to play content (1022a) (e.g., the second electronic device is a smart speaker, a display device, a computer device including a display, or other device configured to play content). In some embodiments, the one or more corresponding operations associated with the second electronic device include controlling playback of the content (1022b), such as emitting audio as shown in FIG. 9E. For example, initiating playback of a content item on the display, or causing emission of audio (e.g., a song, podcast, audiobook, etc.) from the smart speaker. In some embodiments, the one or more virtual control elements are selectable to perform respective functions involving the playback of the content. For example, for a content item (e.g., a video clip, television episode, or movie) the one or more virtual controls are selectable to scrub through content, skip to a next content item, or pause the content, and/or, for a song, the one or more virtual controls are selectable to fast forward in the song, rewind the song, skip to a next song, or pause the song. In some embodiments, as similarly described above, the second electronic device plays the content in the physical environment, which is optionally observable (e.g., viewable, able to be heard, feelable, etc.) in the three-dimensional environment (e.g., via the representation of the second electronic device). Providing a selection of a virtual control element that is associated with a physical device configured to play content in the physical environment causes the physical device to automatically control playback of the content in accordance with the selection of the virtual control element, thereby improving user-device interaction.

In some embodiments, the second electronic device includes a light-emitting device (1024a), such as device 908a in FIG. 9A (e.g., the second electronic device is a lamp, light fixture, overhead light, or other device including a smart light or light bulb configured to emit light into the physical environment). In some embodiments, the one or more corresponding operations associated with the second electronic device include controlling light output of the light-emitting device (1024*b*), such as emitting light as shown in FIG. 9E. For example, initiating and/or causing emission of light from the light-emitting device. In some embodiments, the one or more virtual control elements are selectable to perform respective functions involving the emission of the light. For example, the one or more virtual controls are selectable to control an intensity (e.g., brightness) of the light emitted from the light-emitting device, a duration of emission for the light emitted from the light-emitting device, or a trigger for causing light to be emitted from the light-emitting device (e.g., at a certain time of day at the second electronic device or in response to motion detected by the second electronic device). In some embodiments, as similarly described above, the light-emitting device of the second electronic device emits the light in the physical environment, which is optionally observable (e.g., viewable, feelable, etc.) in the three-dimensional environment (e.g., via the representation of the second electronic device). Providing a selection of a virtual control element that is associated with a physical device configured to emit light in the physical environment causes the physical device to automatically control light output in accordance with the selection of the virtual control element, thereby improving user-device interaction.

In some embodiments, the three-dimensional environment further includes status information corresponding to the second electronic device, such as status information 932*a*, 934*a*, and/or 936*a* in FIG. 9A (e.g., information corresponding to a battery level of the second electronic device, a name of the second electronic device, and/or a status (e.g., a progress or completion) of the one or more corresponding operations associated with the second electronic device), the status information corresponding to the second electronic device displayed relative to a respective portion of the representation of the second electronic device (1026), such as display of status information 932*a* relative to the representation of device 904*a* as shown in FIG. 9A. For example, the status information corresponding to the second electronic device is world locked. In some embodiments, the status information is displayed in the three-dimensional environment at or along a portion of a perimeter of the representation of the second electronic device. In some embodiments, the status information is displayed above, below, to a side of, and/or partially in front of the representation of the second electronic device. In some embodiments, the status information corresponding to the second electronic device is displayed with (e.g., in line with, adjacent to, above or below) the one or more virtual control elements. In some embodiments, as similarly described above, the status information corresponding to the second electronic device is displayed when attention (e.g., a gaze) of the user is directed to at least a portion of the representation of the second electronic device. In some embodiments, when the second electronic device is not located at the first respective location in the portion of the physical environment that is visible via the display generation component, the status information corresponding to the second electronic device is not displayed in the three-dimensional environment. Displaying status information corresponding to a physical device in the physical environment provides feedback about a state of the physical device in the three-dimensional environment, thereby improving user-device interaction.

It should be understood that the particular order in which the operations in method 1000 have been described is merely exemplary and is not intended to indicate that the described order is the only order in which the operations could be performed. One of ordinary skill in the art would recognize various ways to reorder the operations described herein. In some embodiments, aspects/operations of methods 800 and/or 1000 may be interchanged, substituted, and/or added between these methods. For example, the three-dimensional environments of methods 800 and/or 1000, the objects being moved in methods 800 and/or 1000, and/or selection of control elements and/or options of methods 800 and/or 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
at a computer system in communication with a display generation component, one or more input devices, and a second electronic device:
displaying, via the display generation component, a three-dimensional environment including:
one or more virtual control elements associated with the second electronic device, wherein the one or more virtual control elements are selectable to cause one or more corresponding operations associated with the second electronic device to be performed, wherein the second electronic device is located at a first respective location in a portion of a physical environment that is visible via the display generation component; and
a representation of the portion of the physical environment that includes a representation of the second electronic device at a first location in the three-dimensional environment corresponding to the first respective location in the physical environment;
while displaying the three-dimensional environment including the representation of the second electronic device at the first location in the three-dimensional environment and the one or more virtual control elements associated with the second electronic device, detecting, via the one or more input devices, movement of the second electronic device from the first respective location to a second respective location in the physical environment;
while detecting the movement of the second electronic device from the first respective location to the second respective location in the physical environment, ceasing to display the one or more virtual control elements in the three-dimensional environment while the representation of the second electronic device is being moved from the first location to a second location in the three-dimensional environment, wherein the second location in the three-dimensional environment corresponds to the second respective location in the physical environment; and
after detecting the movement of the second electronic device from the first respective location to the second respective location in the physical environment:
redisplaying the one or more virtual control elements associated with the second electronic device in the three-dimensional environment while the representation of the second electronic device is visible via the display generation component at the second location in the three-dimensional environment.

2. The method of claim 1, wherein:
the one or more virtual control elements associated with the second electronic device are displayed relative to a respective portion of the representation of the second electronic device; and
while detecting the movement of the second electronic device from the first respective location to the second respective location in the physical environment, the respective portion of the representation of the second electronic device is visible via the display generation component.

3. The method of claim 1, wherein the one or more virtual control elements associated with the second electronic device are displayed in the three-dimensional environment in response to detecting attention of a user of the computer system directed to the representation of the second electronic device.

4. The method of claim 1, wherein the one or more virtual control elements associated with the second electronic device are displayed relative to a respective portion of the representation of the second electronic device.

5. The method of claim 1, further comprising:
while displaying the three-dimensional environment from a first viewpoint of a user of the computer system, the three-dimensional environment including the representation of the second electronic device at the second location in the three-dimensional environment and the one or more virtual control elements associated with the second electronic device, detecting movement of a viewpoint of the user from the first viewpoint to a second viewpoint, different from the first viewpoint; and while detecting the movement of the viewpoint of the user from the first viewpoint to the second viewpoint, maintaining display of the one or more virtual control elements associated with the second electronic device while the representation of the second electronic device is visible via the display generation component at the second location in the three-dimensional environment.

6. The method of claim 1, wherein the one or more virtual control elements associated with the second electronic device have a first orientation in the three-dimensional environment, the first orientation directed to a viewpoint of a user of the computer system.

7. The method of claim 6, further comprising:
while displaying the three-dimensional environment from a first viewpoint of a user, the three-dimensional environment including the representation of the second electronic device at the second location in the three-dimensional environment and the one or more virtual control elements associated with the second electronic device having the first orientation in the three-dimensional environment, detecting movement of a viewpoint of the user from the first viewpoint to a second viewpoint, different from the first viewpoint; and
in response to detecting the movement of the viewpoint of the user, changing the orientation of the one or more virtual control elements associated with the second electronic device from the first orientation to a second orientation, different from the first orientation, wherein the second orientation is based on the second viewpoint.

8. The method of claim 1, further comprising:
while displaying the three-dimensional environment including the representation of the second electronic device at the second location in the three-dimensional environment and the one or more virtual control elements associated with the second electronic device, receiving, via the one or more input devices, a first input corresponding to a request to activate a first virtual control element of the one or more virtual control elements; and
in response to receiving the first input:
performing a first operation corresponding to the first virtual control element involving the second electronic device in accordance with the first input.

9. The method of claim 8, wherein the first input includes:
an interaction input provided by a respective portion of a user of the computer system corresponding to selection of the first virtual control element while an attention of the user is directed towards the first virtual control element.

10. The method of claim 1, wherein:
the second electronic device is configured to display a virtual workspace for interacting with the second electronic device via a display device in communication with the second electronic device; and
the one or more corresponding operations associated with the second electronic device include:
displaying, via the display generation component, the virtual workspace of the second electronic device in the three-dimensional environment without using the display device in communication with the second electronic device.

11. The method of claim 1, wherein:
the second electronic device is configured to play content; and
the one or more corresponding operations associated with the second electronic device include controlling playback of the content.

12. The method of claim 1, wherein:
the second electronic device includes a light-emitting device; and
the one or more corresponding operations associated with the second electronic device include controlling light output of the light-emitting device.

13. The method of claim 1, wherein:
the three-dimensional environment further includes status information corresponding to the second electronic device, the status information corresponding to the second electronic device displayed relative to a respective portion of the representation of the second electronic device.

14. A computer system that is in communication with a display generation component and one or more input devices, the computer system comprising:
one or more processors;
memory; and
one or more programs, wherein the one or more programs are stored in the memory and configured to be executed by the one or more processors, the one or more programs including instructions for:
displaying, via the display generation component, a three-dimensional environment including:
one or more virtual control elements associated with a second electronic device, wherein the one or more virtual control elements are selectable to cause one or more corresponding operations associated with the second electronic device to be performed, wherein the second electronic device is located at a first respective location in a portion of a physical environment that is visible via the display generation component; and
a representation of the portion of the physical environment that includes a representation of the second electronic device at a first location in the three-dimensional environment corresponding to the first respective location in the physical environment;
while displaying the three-dimensional environment including the representation of the second electronic device at the first location in the three-dimensional environment and the one or more virtual control elements associated with the second electronic device, detecting, via the one or more input devices, movement of the second electronic device from the first respective location to a second respective location in the physical environment;
while detecting the movement of the second electronic device from the first respective location to the second respective location in the physical environment, ceasing to display the one or more virtual control elements in the three-dimensional environment while the representation of the second electronic device is being moved from the first location to a second location in the three-dimensional environment, wherein the second location in the three-dimensional environment corresponds to the second respective location in the physical environment; and after detecting the movement of the second electronic device from the first respective location to the second respective location in the physical environment:
redisplaying the one or more virtual control elements associated with the second electronic device in the three-dimensional environment while the representation of the second electronic device is visible via the display generation component at the second location in the three-dimensional environment.

15. The computer system of claim 14, wherein:
the one or more virtual control elements associated with the second electronic device are displayed relative to a respective portion of the representation of the second electronic device; and
while detecting the movement of the second electronic device from the first respective location to the second respective location in the physical environment, the respective portion of the representation of the second electronic device is visible via the display generation component.

16. The computer system of claim 14, wherein the one or more virtual control elements associated with the second electronic device are displayed in the three-dimensional environment in response to detecting attention of a user of the computer system directed to the representation of the second electronic device.

17. The computer system of claim 14, wherein the one or more virtual control elements associated with the second electronic device are displayed relative to a respective portion of the representation of the second electronic device.

18. The computer system of claim 14, wherein the one or more programs further include instructions for:
while displaying the three-dimensional environment from a first viewpoint of a user of the computer system, the three-dimensional environment including the representation of the second electronic device at the second location in the three-dimensional environment and the one or more virtual control elements associated with the second electronic device, detecting movement of a viewpoint of the user from the first viewpoint to a second viewpoint, different from the first viewpoint; and
while detecting the movement of the viewpoint of the user from the first viewpoint to the second viewpoint, maintaining display of the one or more virtual control elements associated with the second electronic device while the representation of the second electronic device is visible via the display generation component at the second location in the three-dimensional environment.

19. The computer system of claim 14, wherein the one or more virtual control elements associated with the second electronic device have a first orientation in the three-dimensional environment, the first orientation directed to a viewpoint of a user of the computer system.

20. The computer system of claim 19, wherein the one or more programs further include instructions for:
while displaying the three-dimensional environment from a first viewpoint of a user, the three-dimensional environment including the representation of the second electronic device at the second location in the three-dimensional environment and the one or more virtual control elements associated with the second electronic device having the first orientation in the three-dimensional environment, detecting movement of a viewpoint of the user from the first viewpoint to a second viewpoint, different from the first viewpoint; and
in response to detecting the movement of the viewpoint of the user, changing the orientation of the one or more virtual control elements associated with the second electronic device from the first orientation to a second orientation, different from the first orientation, wherein the second orientation is based on the second viewpoint.

21. The computer system of claim 14, wherein the one or more programs further include instructions for:
while displaying the three-dimensional environment including the representation of the second electronic device at the second location in the three-dimensional environment and the one or more virtual control elements associated with the second electronic device, receiving, via the one or more input devices, a first input corresponding to a request to activate a first virtual control element of the one or more virtual control elements; and
in response to receiving the first input:
performing a first operation corresponding to the first virtual control element involving the second electronic device in accordance with the first input.

22. The computer system of claim 21, wherein the first input includes:
an interaction input provided by a respective portion of a user of the computer system corresponding to selection of the first virtual control element while an attention of the user is directed towards the first virtual control element.

23. The computer system of claim 14, wherein:
the second electronic device is configured to display a virtual workspace for interacting with the second electronic device via a display device in communication with the second electronic device; and
the one or more corresponding operations associated with the second electronic device include:
displaying, via the display generation component, the virtual workspace of the second electronic device in the three-dimensional environment without using the display device in communication with the second electronic device.

24. The computer system of claim 14, wherein:
the second electronic device is configured to play content; and
the one or more corresponding operations associated with the second electronic device include controlling playback of the content.

25. The computer system of claim 14, wherein:
the second electronic device includes a light-emitting device; and
the one or more corresponding operations associated with the second electronic device include controlling light output of the light-emitting device.

26. The computer system of claim 14, wherein:
the three-dimensional environment further includes status information corresponding to the second electronic device, the status information corresponding to the second electronic device displayed relative to a respective portion of the representation of the second electronic device.

27. A non-transitory computer readable storage medium storing one or more programs, the one or more programs comprising instructions, which when executed by one or more processors of a computer system that is in communication with a display generation component and one or more input devices, cause the computer system to perform a method comprising:

displaying, via the display generation component, a three-dimensional environment including:
> one or more virtual control elements associated with a second electronic device, wherein the one or more virtual control elements are selectable to cause one or more corresponding operations associated with the second electronic device to be performed, wherein the second electronic device is located at a first respective location in a portion of a physical environment that is visible via the display generation component; and
> a representation of the portion of the physical environment that includes a representation of the second electronic device at a first location in the three-dimensional environment corresponding to the first respective location in the physical environment;

while displaying the three-dimensional environment including the representation of the second electronic device at the first location in the three-dimensional environment and the one or more virtual control elements associated with the second electronic device, detecting, via the one or more input devices, movement of the second electronic device from the first respective location to a second respective location in the physical environment;

while detecting the movement of the second electronic device from the first respective location to the second respective location in the physical environment, ceasing to display the one or more virtual control elements in the three-dimensional environment while the representation of the second electronic device is being moved from the first location to a second location in the three-dimensional environment, wherein the second location in the three-dimensional environment corresponds to the second respective location in the physical environment; and after detecting the movement of the second electronic device from the first respective location to the second respective location in the physical environment:
> redisplaying the one or more virtual control elements associated with the second electronic device in the three-dimensional environment while the representation of the second electronic device is visible via the display generation component at the second location in the three-dimensional environment.

28. The non-transitory computer readable storage medium of claim 27, wherein:
the one or more virtual control elements associated with the second electronic device are displayed relative to a respective portion of the representation of the second electronic device; and
while detecting the movement of the second electronic device from the first respective location to the second respective location in the physical environment, the respective portion of the representation of the second electronic device is visible via the display generation component.

29. The non-transitory computer readable storage medium of claim 27, wherein the one or more virtual control elements associated with the second electronic device are displayed in the three-dimensional environment in response to detecting attention of a user of the computer system directed to the representation of the second electronic device.

30. The non-transitory computer readable storage medium of claim 27, wherein the one or more virtual control elements associated with the second electronic device are displayed relative to a respective portion of the representation of the second electronic device.

31. The non-transitory computer readable storage medium of claim 27, wherein the method further comprises:
while displaying the three-dimensional environment from a first viewpoint of a user of the computer system, the three-dimensional environment including the representation of the second electronic device at the second location in the three-dimensional environment and the one or more virtual control elements associated with the second electronic device, detecting movement of a viewpoint of the user from the first viewpoint to a second viewpoint, different from the first viewpoint; and
while detecting the movement of the viewpoint of the user from the first viewpoint to the second viewpoint, maintaining display of the one or more virtual control elements associated with the second electronic device while the representation of the second electronic device is visible via the display generation component at the second location in the three-dimensional environment.

32. The non-transitory computer readable storage medium of claim 27, wherein the one or more virtual control elements associated with the second electronic device have a first orientation in the three-dimensional environment, the first orientation directed to a viewpoint of a user of the computer system.

33. The non-transitory computer readable storage medium of claim 32, wherein the method further comprises:
while displaying the three-dimensional environment from a first viewpoint of a user, the three-dimensional environment including the representation of the second electronic device at the second location in the three-dimensional environment and the one or more virtual control elements associated with the second electronic device having the first orientation in the three-dimensional environment, detecting movement of a viewpoint of the user from the first viewpoint to a second viewpoint, different from the first viewpoint; and
in response to detecting the movement of the viewpoint of the user, changing the orientation of the one or more virtual control elements associated with the second electronic device from the first orientation to a second orientation, different from the first orientation, wherein the second orientation is based on the second viewpoint.

34. The non-transitory computer readable storage medium of claim 27, wherein the method further comprises:
while displaying the three-dimensional environment including the representation of the second electronic device at the second location in the three-dimensional environment and the one or more virtual control elements associated with the second electronic device, receiving, via the one or more input devices, a first input corresponding to a request to activate a first virtual control element of the one or more virtual control elements; and
in response to receiving the first input:
> performing a first operation corresponding to the first virtual control element involving the second electronic device in accordance with the first input.

35. The non-transitory computer readable storage medium of claim 34, wherein the first input includes:
an interaction input provided by a respective portion of a user of the computer system corresponding to selection of the first virtual control element while an attention of the user is directed towards the first virtual control element.

36. The non-transitory computer readable storage medium of claim 27, wherein:
    the second electronic device is configured to display a virtual workspace for interacting with the second electronic device via a display device in communication with the second electronic device; and
    the one or more corresponding operations associated with the second electronic device include:
        displaying, via the display generation component, the virtual workspace of the second electronic device in the three-dimensional environment without using the display device in communication with the second electronic device.

37. The non-transitory computer readable storage medium of claim 27, wherein:
    the second electronic device is configured to play content; and
    the one or more corresponding operations associated with the second electronic device include controlling playback of the content.

38. The non-transitory computer readable storage medium of claim 27, wherein:
    the second electronic device includes a light-emitting device; and
    the one or more corresponding operations associated with the second electronic device include controlling light output of the light-emitting device.

39. The non-transitory computer readable storage medium of claim 27, wherein:
    the three-dimensional environment further includes status information corresponding to the second electronic device, the status information corresponding to the second electronic device displayed relative to a respective portion of the representation of the second electronic device.

* * * * *